United States Patent
Shimizu et al.

(10) Patent No.: US 8,209,547 B2
(45) Date of Patent: Jun. 26, 2012

(54) RECORDING MEDIUM, STORAGE UNIT, INFORMATION PROCESSING APPARATUS, INFORMATION PROCESSING METHOD, INFORMATION PROCESSING PROGRAM AND COMPUTER READABLE MEDIUM

(75) Inventors: Kohji Shimizu, Fukuoka (JP); Kunihiro Akiyoshi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1200 days.

(21) Appl. No.: 10/915,335

(22) Filed: Aug. 11, 2004

(65) Prior Publication Data
US 2005/0071660 A1 Mar. 31, 2005

(30) Foreign Application Priority Data

| Aug. 12, 2003 | (JP) | 2003-292012 |
| Aug. 12, 2003 | (JP) | 2003-292013 |
| Aug. 12, 2003 | (JP) | 2003-292014 |
| Aug. 12, 2003 | (JP) | 2003-292015 |
| Aug. 12, 2003 | (JP) | 2003-292016 |
| Mar. 19, 2004 | (JP) | 2004-081476 |
| Aug. 6, 2004 | (JP) | 2004-230106 |

(51) Int. Cl.
*G06F 12/14* (2006.01)
(52) U.S. Cl. .......................... 713/193; 713/176; 380/44
(58) Field of Classification Search .................. 713/176, 713/193; 380/44
See application file for complete search history.

(56) References Cited

U.S. PATENT DOCUMENTS

| 5,392,351 A | 2/1995 | Hasebe et al. |
| 5,555,304 A * | 9/1996 | Hasebe et al. ................. 705/51 |
| 5,642,199 A | 6/1997 | Ukai et al. |
| 5,673,373 A | 9/1997 | Nosaki et al. |
| 5,857,021 A | 1/1999 | Kataoka et al. |
| 5,999,766 A * | 12/1999 | Hisatomi et al. ................. 399/80 |
| 6,411,941 B1 | 6/2002 | Mullor et al. |
| 6,862,583 B1 * | 3/2005 | Mazzagatte et al. ............ 705/64 |
| 7,010,144 B1 * | 3/2006 | Davis et al. .................... 382/100 |
| 7,188,255 B1 * | 3/2007 | Toh et al. ........................ 713/191 |
| 7,636,843 B1 * | 12/2009 | Asano et al. ................... 713/169 |
| 2002/0112197 A1 * | 8/2002 | Yoshino et al. .................... 714/6 |
| 2002/0152394 A1 | 10/2002 | Kadoya |
| 2002/0169971 A1 * | 11/2002 | Asano et al. ................... 713/193 |
| 2003/0041221 A1 * | 2/2003 | Okada ............................ 711/164 |
| 2003/0084313 A1 * | 5/2003 | Tada ............................. 713/193 |
| 2003/0086111 A1 | 5/2003 | Akiyoshi |

(Continued)

FOREIGN PATENT DOCUMENTS

EP 0 809 244 A2 11/1997

(Continued)

OTHER PUBLICATIONS

U.S. Appl. No. 11/216,013, filed Sep. 1, 2005, Ando et al.

(Continued)

*Primary Examiner* — Kambiz Zand
*Assistant Examiner* — Amare F Tabor
(74) *Attorney, Agent, or Firm* — Oblon, Spivak, McClelland, Maier & Neustadt, L.L.P.

(57) ABSTRACT

A recording medium is provided. The recording medium is used for inputting, into an information processing apparatus, a program for causing the information processing apparatus to perform information processing, wherein the recording medium includes an ID file used for storing an ID of the program in which the ID is encrypted by a key specific to the recording medium or specific to the information processing apparatus.

12 Claims, 35 Drawing Sheets

U.S. PATENT DOCUMENTS

| | | |
|---|---|---|
| 2003/0145218 A1 | 7/2003 | Hutchison |
| 2003/0218765 A1 | 11/2003 | Ohishi et al. |
| 2004/0021890 A1 | 2/2004 | Hirai et al. |
| 2004/0057067 A1 | 3/2004 | Ohishi et al. |
| 2004/0057074 A1 | 3/2004 | Ohishi et al. |
| 2004/0075857 A1 | 4/2004 | Akiyoshi et al. |
| 2004/0109188 A1 | 6/2004 | Akiyoshi et al. |
| 2004/0125414 A1 | 7/2004 | Ohishi et al. |
| 2004/0128532 A1 | 7/2004 | Ohishi et al. |
| 2004/0130747 A1 | 7/2004 | Ohishi et al. |
| 2006/0069925 A1* | 3/2006 | Nakai et al. ............... 713/193 |

FOREIGN PATENT DOCUMENTS

| | | |
|---|---|---|
| EP | 1 014 256 A2 | 6/2000 |
| EP | 1 091 275 A2 | 4/2001 |
| EP | 1 267 515 A2 | 12/2002 |
| JP | 5-257816 | 10/1993 |
| JP | 7-287655 | 10/1995 |
| JP | 09-134330 | 5/1997 |
| JP | 10-255394 | 9/1998 |
| JP | 2000-322254 A | 11/2000 |
| JP | 2001-229018 | 8/2001 |
| JP | 2002-84383 | 3/2002 |
| JP | 2003-5859 | 1/2003 |
| JP | 2003-39770 | 2/2003 |
| JP | 2003-76433 | 3/2003 |
| JP | 2003-87239 A | 3/2003 |
| JP | 2003-122588 | 4/2003 |
| JP | 2003-179707 | 6/2003 |
| JP | 2003-195758 | 7/2003 |
| JP | 2003-223329 A | 8/2003 |

OTHER PUBLICATIONS

U.S. Appl. No. 11/372,073, filed Mar. 10, 2006, Shimizu, et al.
U.S. Appl. No. 11/509,601, filed Aug. 25, 2006, Ando, et al.
U.S. Appl. No. 10/626,608, filed Jul. 25, 2003, Akiyoshi et al.
U.S. Appl. No. 10/756,315, filed Jan. 14, 2004, Hirai et al.
Office Action issued Aug. 31, 2010, in Japanese Patent Application No. 2004-230105, filed Aug. 25, 2010.
European Summons to Oral Proceedings dated Nov. 5, 2010 in corresponding European Application No. 04 254 846.1.
Japanese Office Action dated Nov. 16, 2010 in corresponding Japanese Application No. 2004-230106.
Office Action issued Jan. 10, 2012, in Japanese Patent Application No. 2010-096199.

* cited by examiner

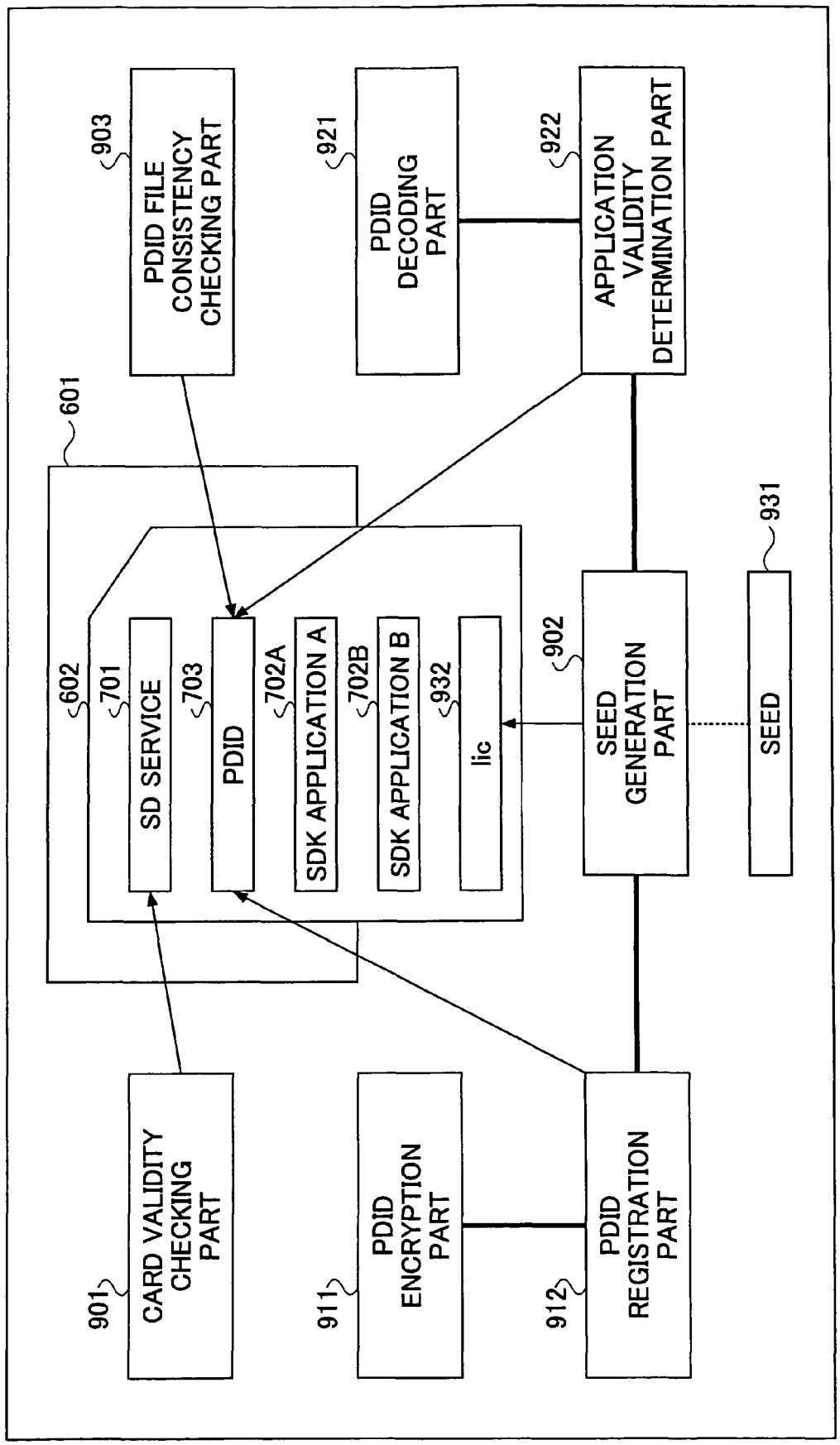

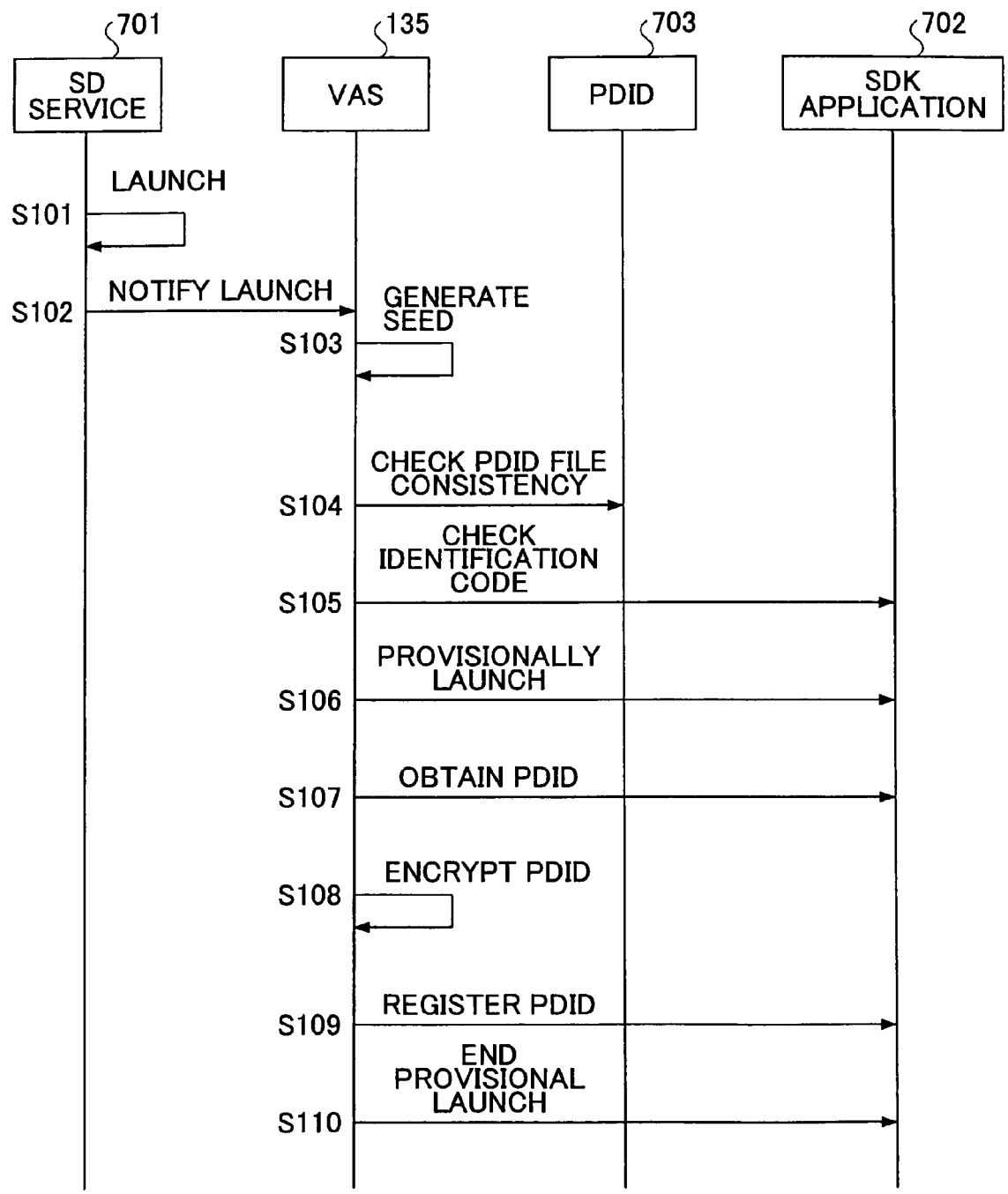

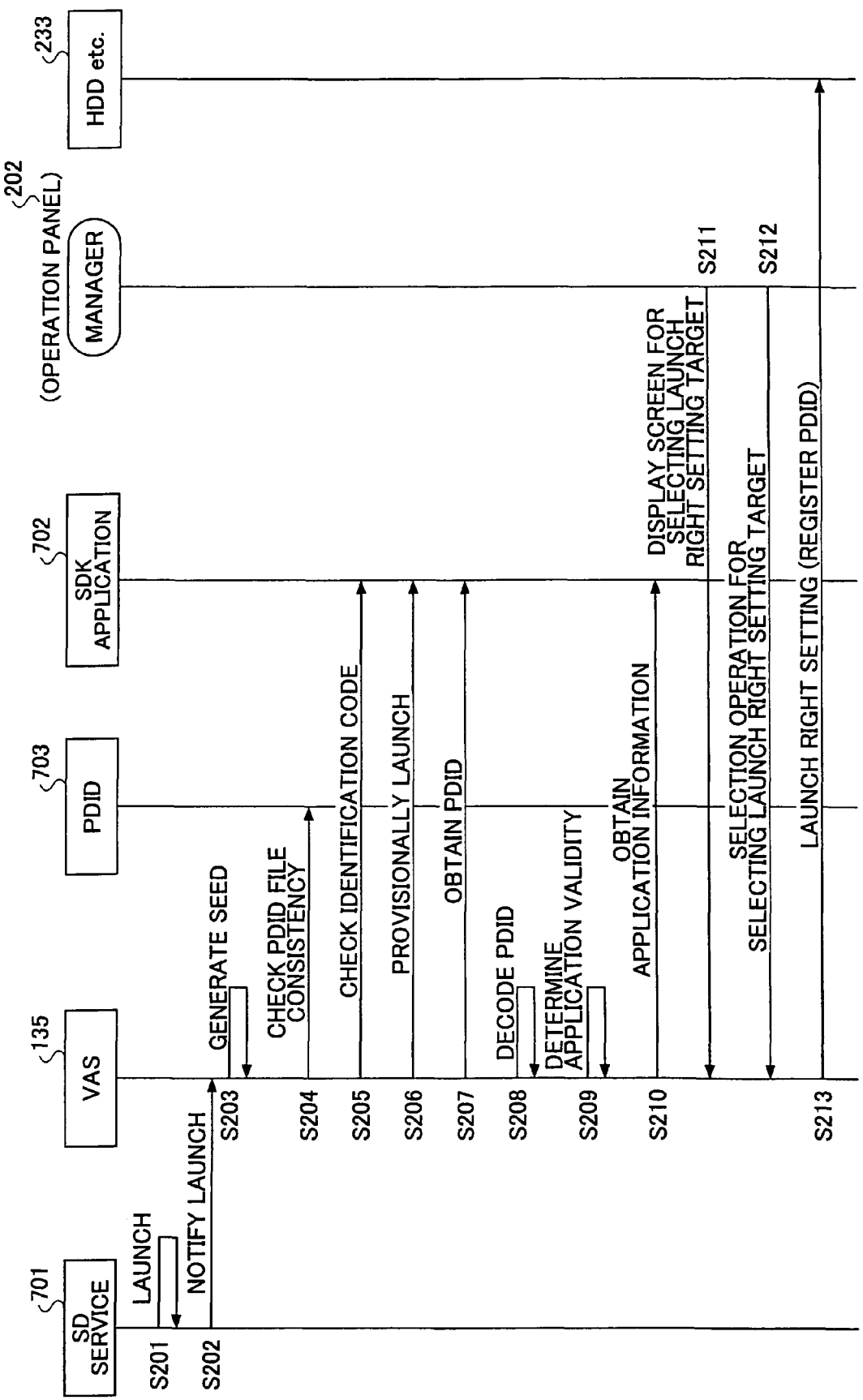

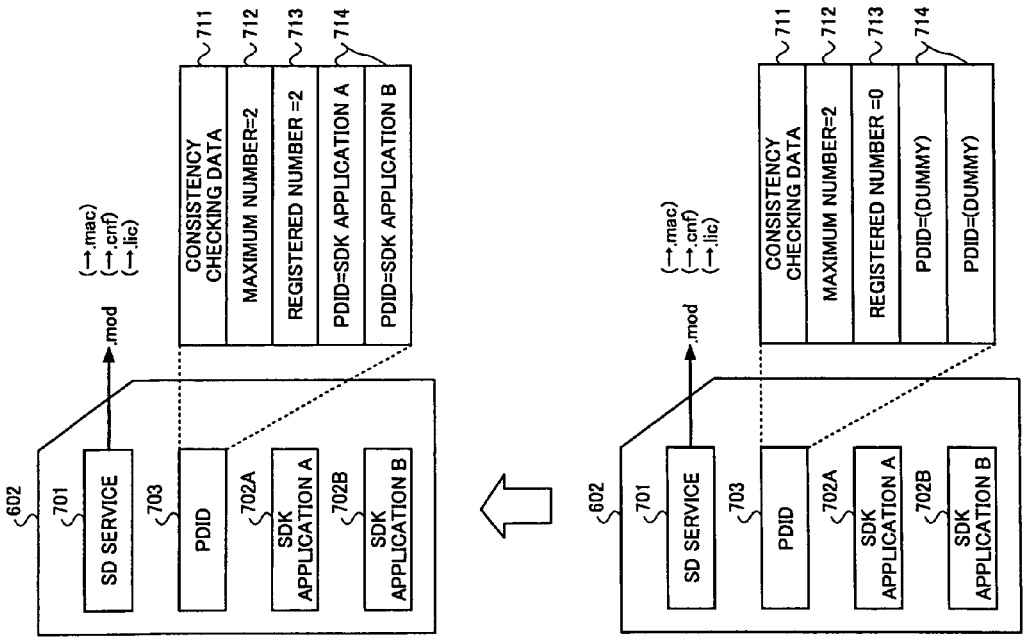
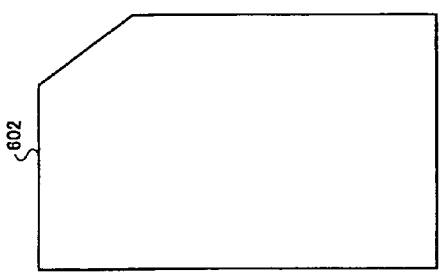
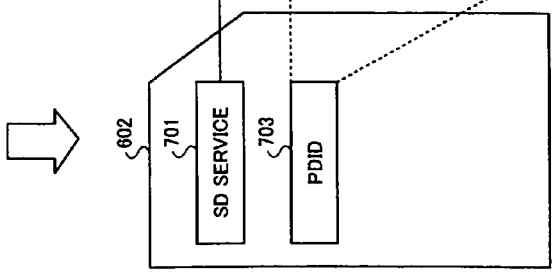
FIG.12A  FIG.12B  FIG.12C  FIG.12D

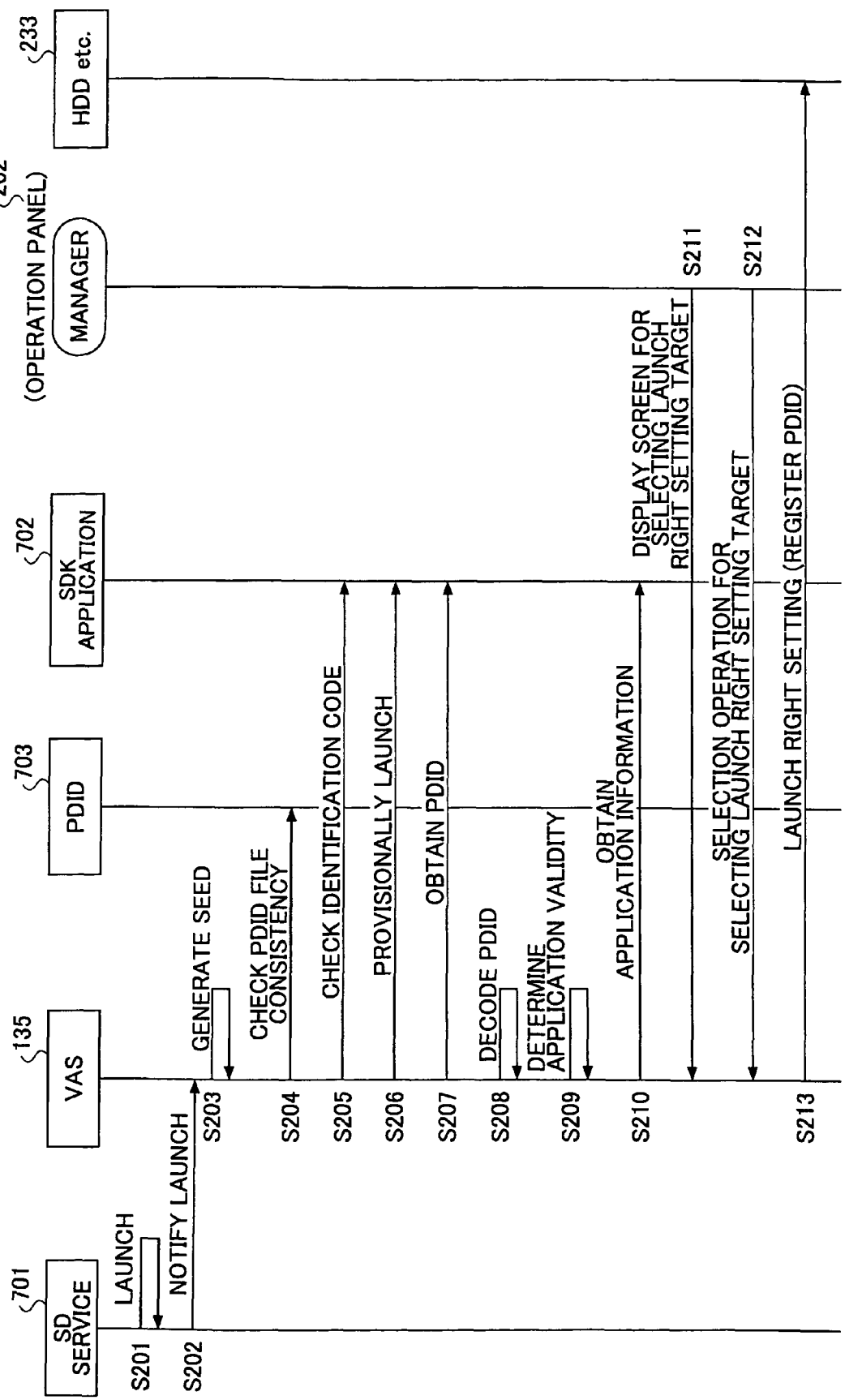

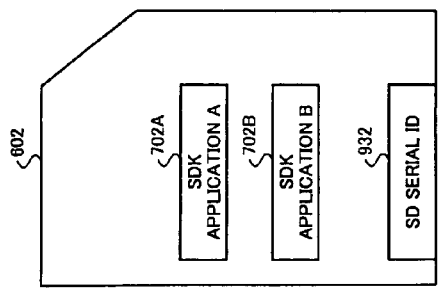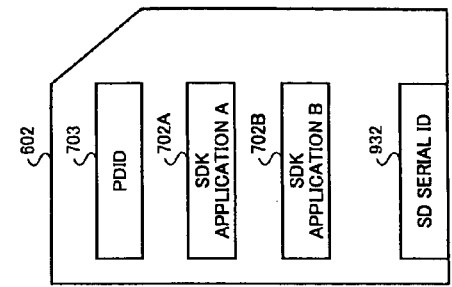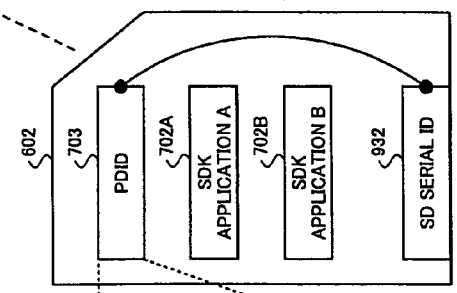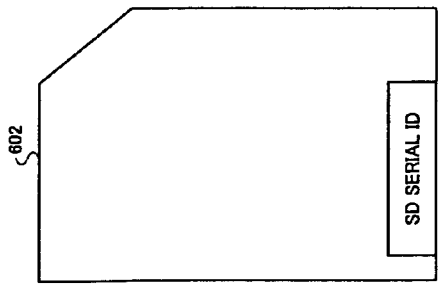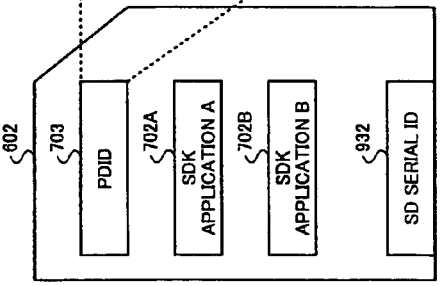

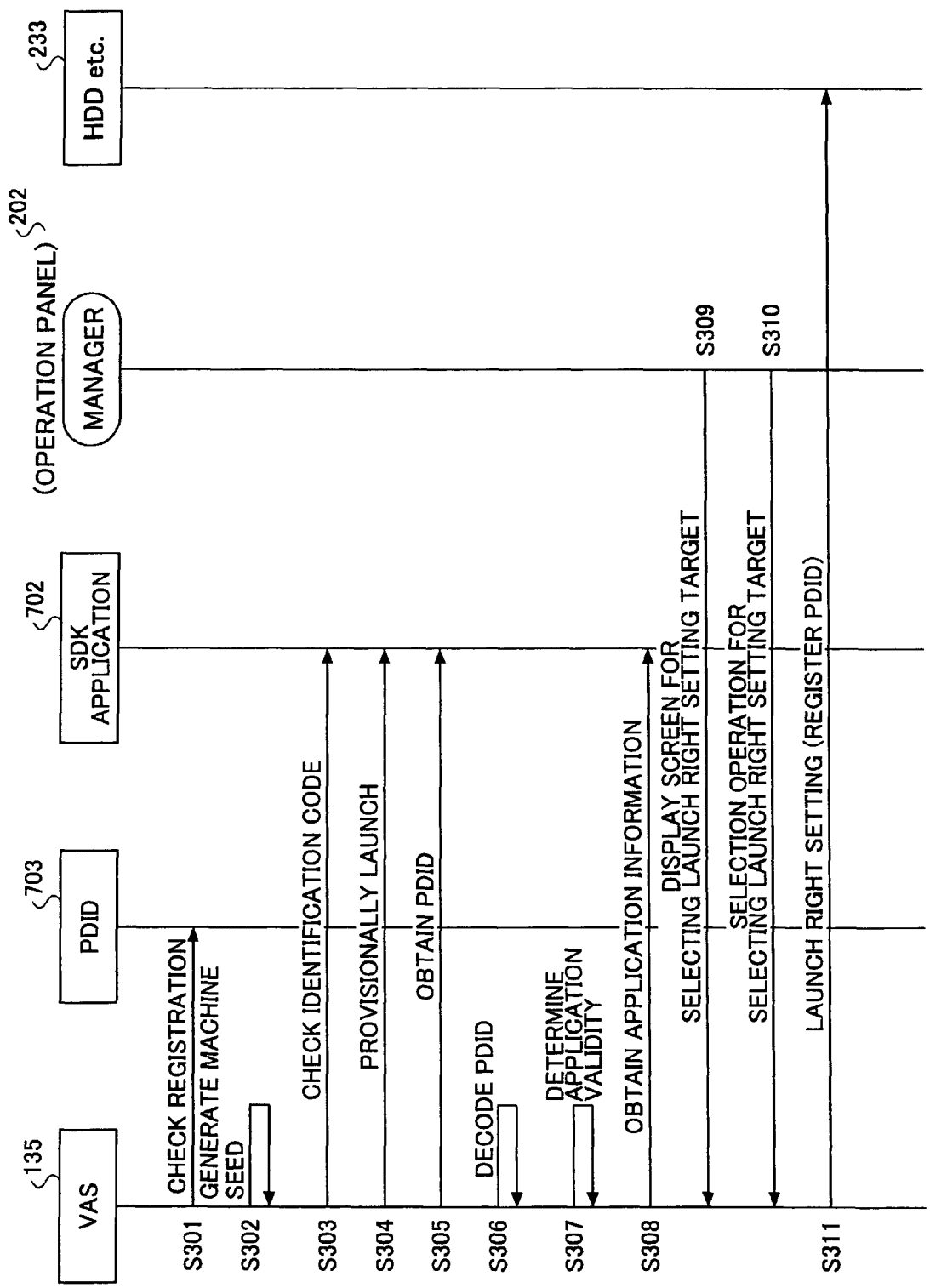

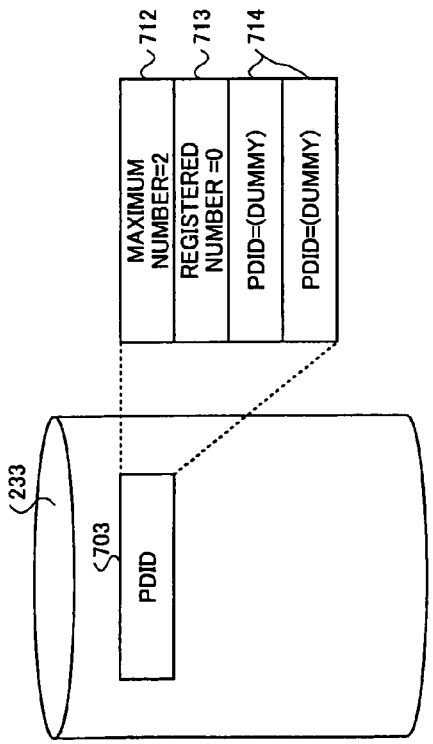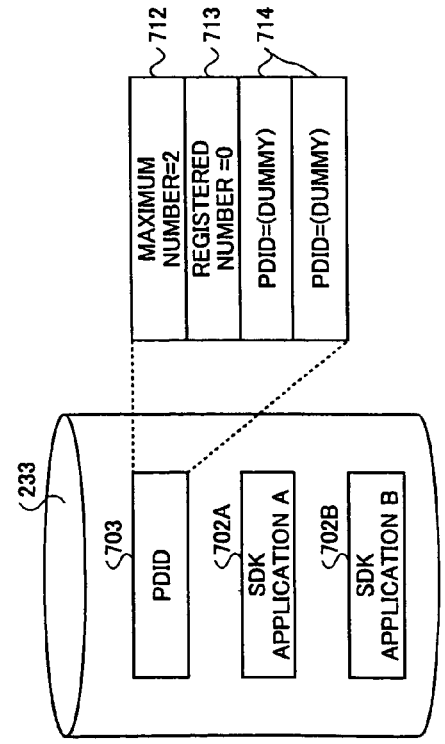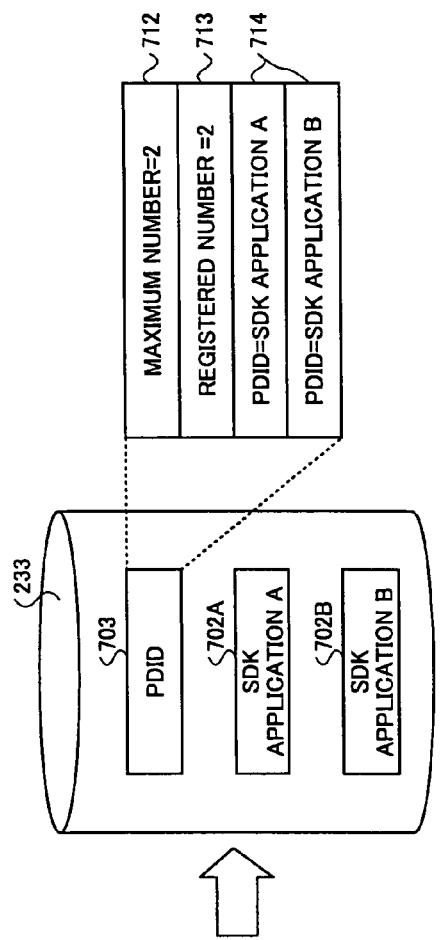

RECORDING MEDIUM, STORAGE UNIT, INFORMATION PROCESSING APPARATUS, INFORMATION PROCESSING METHOD, INFORMATION PROCESSING PROGRAM AND COMPUTER READABLE MEDIUM

BACKGROUND OF THE INVENTION

1. Field of the Invention

The present invention relates to a recording medium such as a memory card, a storage unit such as a hard disk drive. In addition, the present invention relates to an information processing apparatus such as an information technology apparatus that includes an information processing function as a main function and an electrical apparatus that includes an information processing function as a secondary function. The present invention further relates to an information processing method, an information processing program and a recording medium relating to the information processing apparatus. An example of the information technology apparatus that includes the information processing function as the main function is a personal computer, and an example of the electronic apparatus including the information processing function as the secondary function is an image forming apparatus such as copier/printer/scanner/facsimile/compound machine (to be also referred to as combined machine) whose information processing functions are remarkably advanced in recent years.

2. Description of the Related Art

In recent years, a compound machine that includes a copying function, a printer function and a scanner function is coming onto the market. When the compound machine functions as a copier or a printer, an image is to be printed on a printing paper. When the compound machine functions as a copier or a scanner, an image is read from a document. When the compound machine functions as a facsimile, the compound machine receives or sends an image via a telephone line. Japanese laid-open patent application No.2002-84383 discloses a technology relating to the compound machine.

The compound machine executes various information processing by using various programs such as applications or platforms. The programs are usually preinstalled in the compound machine. If the programs can be executed by using a memory card or if the programs can be installed into a hard disk drive of the compound machine even after the compound machine has been shipped, the convenience of customers can be improved. But on the other hand, there is a danger that the memory card may be illicitly copied and illicitly used in a compound machine. In addition, there is a danger that a hard disk drive of a compound machine may be replaced by a hard disk drive of another compound machine so that the programs may be illicitly provided to compound machines.

SUMMARY OF THE INVENTION

An object of the present invention is to reduce the danger that a recording medium such as a memory card is illicitly copied and a program is illicitly used, wherein the recording medium is used for loading the program into an information processing apparatus such as an image forming apparatus.

Another object of the present invention is to reduce the danger that a program is illicitly provided to an information processing apparatus due to fraud on a storage unit such as a hard disk drive, wherein a program can be added to the storage unit of the information processing apparatus such as an image forming apparatus.

The above-object is achieved by a recording medium used for inputting, into an information processing apparatus, a program for causing the information processing apparatus to perform information processing,
wherein the recording medium includes an ID file used for storing an ID of the program in which the ID is encrypted by a key specific to the recording medium or specific to the information processing apparatus.

In the recording medium, the ID file may include the ID that is encrypted by the key. In addition, the recording medium may include a program file storing the program.

The recording medium may further include a checking file used for the information processing apparatus to check whether the recording medium is valid as a medium used for inputting the program into the information processing apparatus.

In the recording medium, the program file may store an identification code used for the information processing apparatus to identify the program file.

The ID file may further include an upper limit number of IDs that can be stored in the ID file, and a number of IDs stored in the ID file. In addition, when the ID is stored in the ID file, information that is originally stored in an area used for storing the ID is replaced by the ID.

The key specific to the recording medium can be generated by using a serial ID of the recording medium or by using data based on the serial ID. The key specific to the information processing apparatus may be generated by using a machine number of the information processing apparatus, a MAC address of the information processing apparatus, or an IP address of the information processing apparatus.

The above object is also achieved by a storage unit used for storing a program for causing an information processing apparatus that is equipped with the storage unit to perform information processing, wherein the storage unit includes an ID file used for storing an ID of the program in which the ID is encrypted by a key specific to the storage unit or specific to the information processing apparatus.

The present invention can be also configured as an information processing apparatus, comprising an information processing part for executing a program to perform information processing, wherein the program is loaded into the information processing apparatus by using a recording medium that includes an ID file that stores an ID of the program in which the ID is encrypted by a key specific to the recording medium or specific to the information processing apparatus.

In the information processing apparatus, the recording medium stores the program, and the program is loaded into the information processing apparatus from the recording medium, the information processing apparatus further including: an ID storing part for encrypting the ID with the key and storing the encrypted ID.

The present invention can be also configured as an information processing method performed in the information processing apparatus, and an information processing program that causes a computer to perform a function of the information processing apparatus.

According to the present invention, the danger that a recording medium such as a memory card is illicitly copied and a program is illicitly used can be reduced, and the danger that a program is illicitly provided to an information processing apparatus due to fraud on a storage unit can be reduced.

BRIEF DESCRIPTION OF THE DRAWINGS

Other objects, features and advantages of the present invention will become more apparent from the following detailed description when read in conjunction with the accompanying drawings, in which:

FIG. 9 is a functional block diagram of functions realized by the VAS;

FIG. 10 is a sequence diagram for explaining a PDID registration process;

FIG. 11 is a sequence diagram for explaining an application validity determination process;

FIGS. 12A-12D are figures for explaining a second example;

FIG. 16 is a sequence diagram for explaining an application validity determination process;

FIGS. 17A-17D2 are figures for explaining a third example;

FIGS. 22A-22E2 are figures for explaining a fourth example;

FIG. 27 is a sequence diagram for explaining an application validity determination process;

FIGS. 28A-28C are figures for explaining a fifth example;

DETAILED DESCRIPTION OF THE PREFERRED EMBODIMENTS

In the following, embodiments of the present invention are described with reference to figures.

Figure 39:
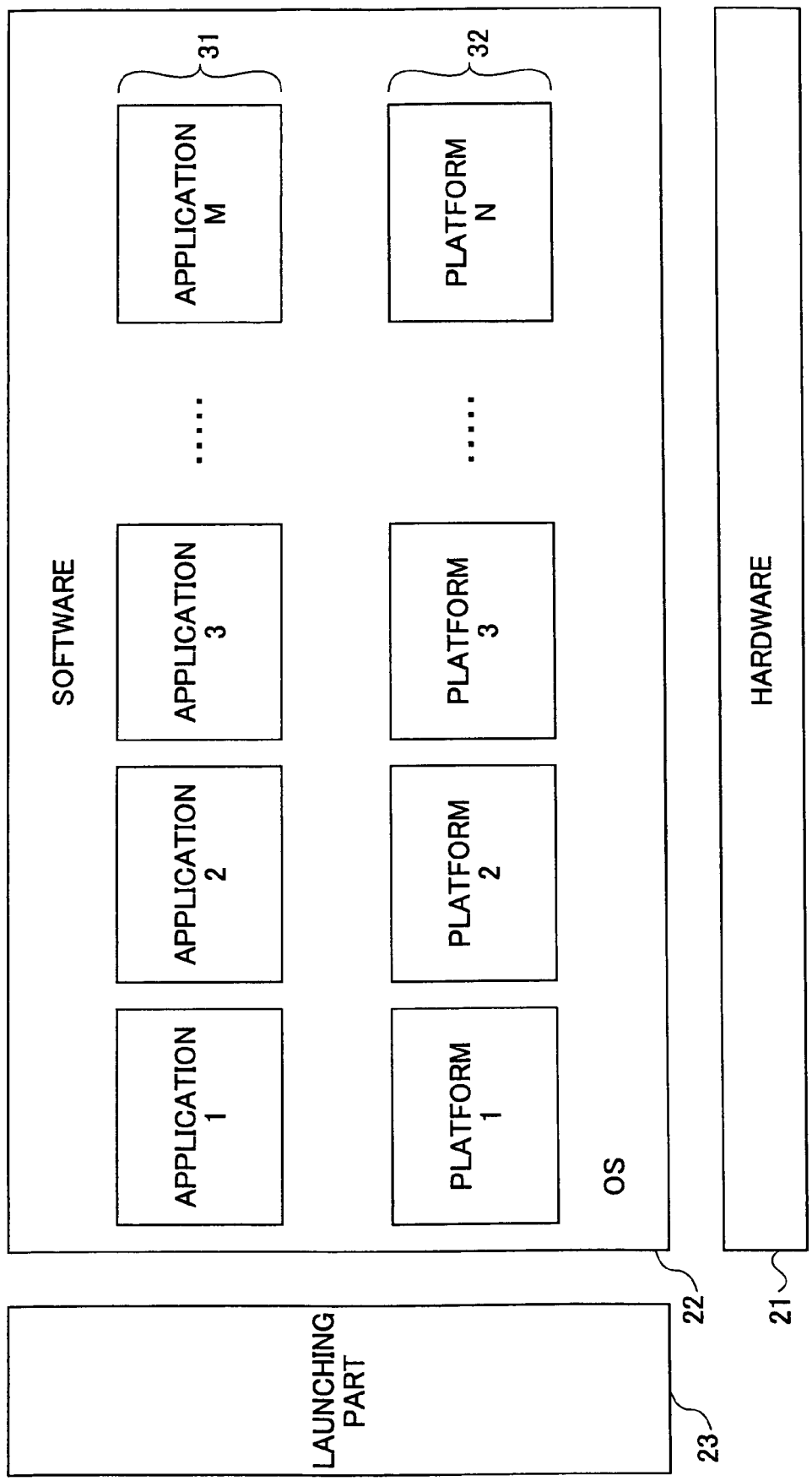
FIG. 39 shows an information processing apparatus of an embodiment of the present invention.

FIG. 39 shows an information processing apparatus 11 of an embodiment of the present invention. The information processing apparatus 11 includes hardware 21, software 22 and a launching part 23.

The hardware of the information processing apparatus 11 includes an information processing part, a communication part and an operation display part. The information processing part includes a CPU, a ROM, a RAM and a HDD, the communication part includes a MODEM and a NIC, and the operation display part includes a keyboard, a mouse and a display.

The software 22 of the information processing apparatus includes applications 31 and platforms 32. The platforms 32 include a module for controlling the information processing part, a module for controlling the communication part, a module for controlling the operation display part, a module for controlling the authentication processing, a module for management of user information, and a module for performing system management. The programs are performed in parallel process by process by an OS (operating system) such as UNIX.

The launching part 23 is initially executed when the power of the information processing apparatus 11 is turned on. Accordingly, the OS is launched and the applications 31 and the platforms 32 are launched. The programs are stored in the HDD or in the memory card, and are loaded from the HDD or in the memory card into a RAM so that the programs are executed.

Examples of the information processing apparatus 11 shown in FIG. 39 are an information technology apparatus that includes an information processing function as a main function and an electrical apparatus including an information processing function as a secondary function. An example of the information technology apparatus is a personal computer, and an example of the electronic apparatus is an image forming apparatus such as copier/printer/scanner/facsimile/compound machine (to be also referred to as combined machine) whose information processing functions are remarkably advanced in recent years. In the following, an compound machine 101 that is an example of the information processing apparatus 11 is described.

Figure 1:
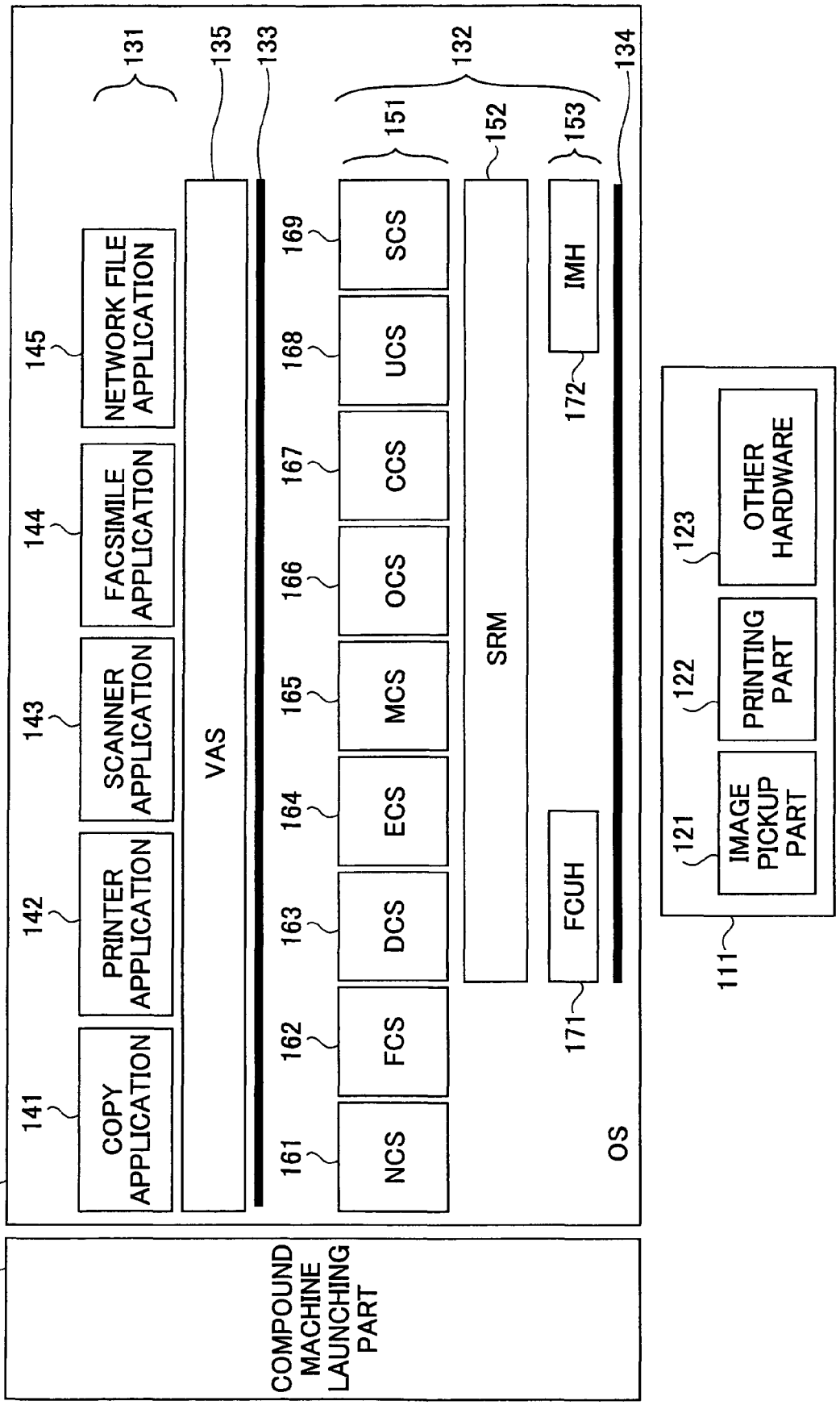
FIG. 1 shows a compound machine of an embodiment of the present invention.

FIG. 1 shows the compound machine 101 of an embodiment of the present invention. The compound machine 101 shown in FIG. 1 includes various hardware 111, various software 112 and a compound machine launching part 113.

The hardware 111 of the compound machine 101 includes an image pickup part 121, a printing part 122, and other hardware 123. The image pickup part 121 is hardware for reading an image (image data) from a document. The printing part 122 is hardware for printing the image on a printing paper.

The software 112 of the compound machine 101 includes various applications 131 and various platforms 132. These programs are executed in parallel as processes by an OS (operating system) such as UNIX.

The applications 131 include a copy application 141 that is an application for copying, a printer application 142 that is an application for printing, a scanner application 143 that is an application for scanning, a facsimile application 144 that is an application for facsimile, and a network file application 145 that is an application for network file.

An application 131 can be developed by using a dedicated SDK (software development kit). An application developed by using the SDK is called a SDK application. The SDK includes executable files of the platforms 132, dedicated function libraries of the platforms 132, a C language standard function library, a compiler for compiling a source file of the application 131 to generate an object file of the application 131, and a linker for linking the object file with the dedicated function libraries and the standard function library to generate an executable file of the application.

The platforms 132 include control services 151, a system resource manager 152, and handlers 153. The control services 151 include a network control service (NCS) 161, a facsimile control service (FCS) 162, a delivery control service (DCS) 163, an engine control service (ECS) 164, a memory control service (MCS) 165, an operation panel control service (OCS) 166, a certification control service (CCS) 167, a user directory control service (UCS) 168, and a system control service (SCS) 169. The handlers 153 include a facsimile control unit handler (FCUH) 171 and an image memory handler (IMH) 172.

The process of the NCS 161 intermediates network communications. The process of FCS 162 provides APIs for facsimile. The process of DCS 163 controls delivery processes of stored documents. The process of ECS 164 performs control for the image pickup part 121 and the printing part 122. The process of MCS 165 performs control for the memory and the hard disk drive. The process of the OCS 166 performs control of the operation panel. The process of CCS 167 performs control for an authentication process and a billing process. The process of the UCS 168 performs control relating to management of user information. The process of the SCS 169 performs control of management of the system.

A virtual application service (VAS) 135 exists as software for performing mediation between the applications 131 and the platforms 132. The VAS 135 operates as a server process for the application that functions as a client, and operates as a client process for the platform that functions as a server. The VAS 135 has a wrapping function for hiding the platform 132 from the application 131. In addition, the VAS has a function for absorbing version differences between the platforms 132 and APIs of the applications.

The compound machine launching part 113 is executed first when the power of the compound machine 101 is turned on. Accordingly, the OS such as UNIX is launched, and the applications 131 and the platforms 132 are launched. These programs are stored in the hard disk drive or in the memory card, and are read from the hard disk drive or from the memory card, and are loaded into a memory.

Figure 2:
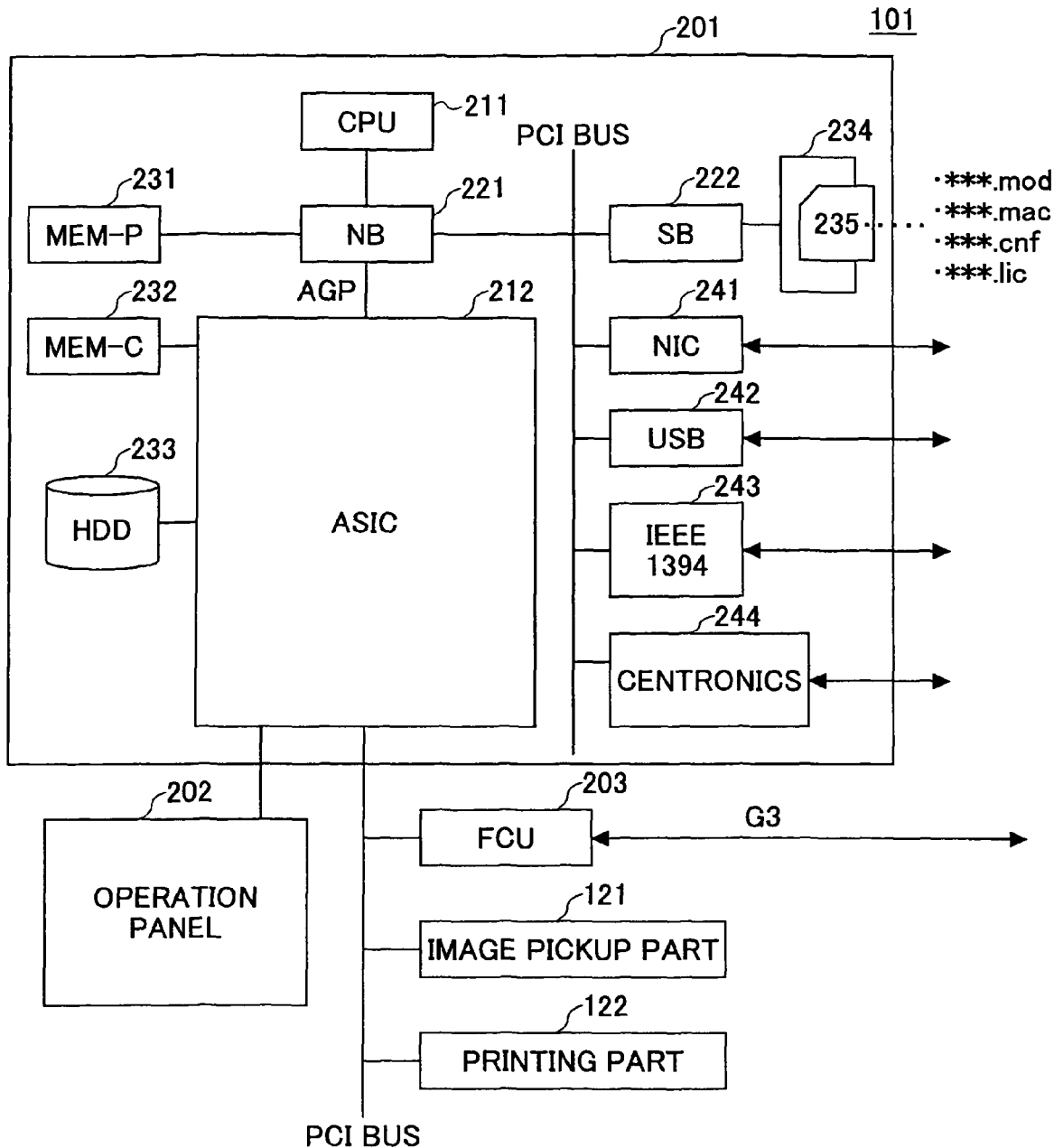
FIG. 2 is a hardware block diagram of the compound machine shown in FIG. 1.

FIG. 2 is a hardware block diagram of the compound machine 101 shown in FIG. 1. The hardware 111 of the compound machine 101 includes a controller 201, an operation panel 202, a facsimile control unit (FCU) 203, an image pickup part 121 and a printing part 122.

The controller 201 includes a CPU 211, an ASIC 212, a NB 221, a SB 222, a MEM-P 231, a MEM-C 232, a HDD (hard disk drive) 233, a memory card slot 234, a NIC (network interface controller) 241, a USB device 242, an IEEE 1394 device 243 and a Centronics device 244.

The CPU 211 is an IC for various information processing. The ASIC 212 is an IC for various image processing. The NB 221 is a north bridge for the controller 201. The SB 222 is a south bridge for the controller 201. The MEM-P 231 is a system memory for the compound machine 101. The MEM-C 232 is a local memory of the compound machine 101. The HDD 233 is a storage of the compound machine. 101. The memory card slot 234 is a slot for setting the memory card 235. The NIC 241 is a controller for network communications by MAC addresses. The USB device 242 is a device for providing connection terminals of IEEE 1394 standard. The Centronics device 244 is a device for providing connection terminals of Centronics.

The operation panel 202 is hardware (operation part) by which the user inputs data into the compound machine 101, and also hardware (display part) for obtaining output data from the compound machine 101.

Figure 3:
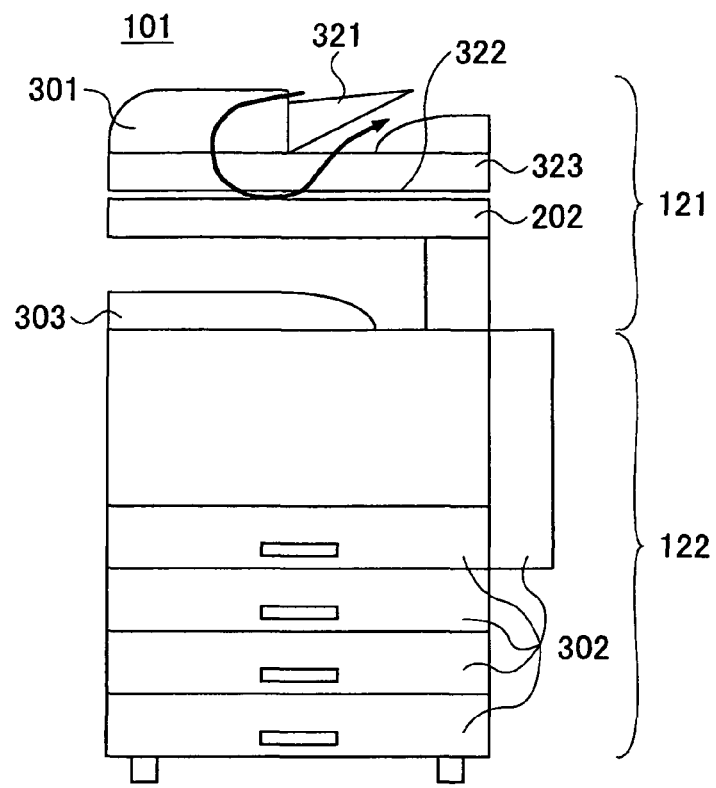
FIG. 3 is an external view of the compound machine of FIG. 1.

FIG. 3 is an external view of the compound machine 101 of FIG. 1. FIG. 3 shows a position of the image pickup part 121, a position of the printing part 122 and a position of the operation panel 202. FIG. 3 further shows a document setting part 301 on which the documents are set, a paper feed part 302 for feeding papers, and a paper ejecting part 303 for ejecting a printing paper.

Figure 4:
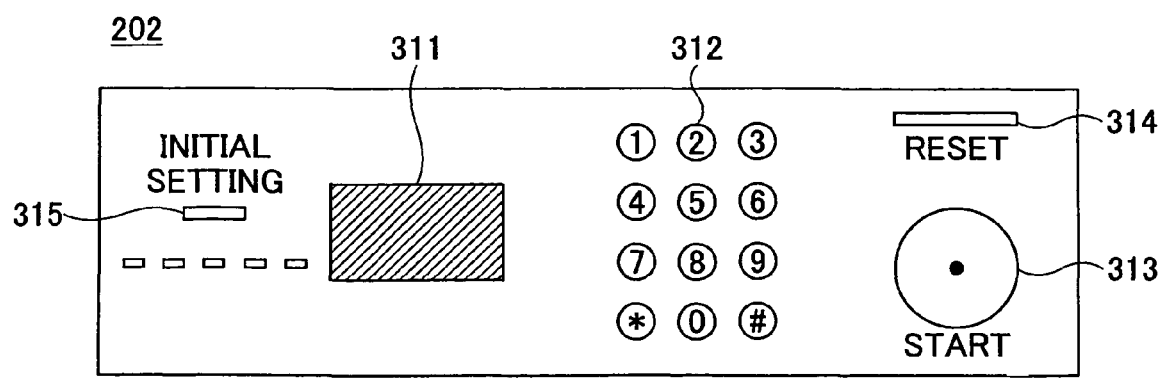
FIG. 4 shows an operation panel of the compound machine.

As shown in FIG. 4, the operation panel 202 includes a touch panel 311, ten keys 312, a start button 313, a reset button 314, an initial setting button 315. The touch panel 311 is hardware (touch operation part) for inputting data by touch operation, and is also hardware (image display part) for displaying image. The ten keys 312 are hardware for input numbers by key operations. The start button 313 is hardware for performing start operation by button operation. The reset button 314 is hardware for performing reset operation by button operation. The initial setting button 315 is hardware for displaying an initial setting screen by button operation.

The document setting part 301 includes an ADF (automatic document feeder) 321, a flat bed 322, and a flat bed cover 323. The paper feeding part 302 includes four feeding trays. The paper ejecting part 303 includes one ejecting tray.

(Compound Machine Launching Part)

In the following, the compound machine launch part 113 of FIG. 1 is described.

Figure 5:
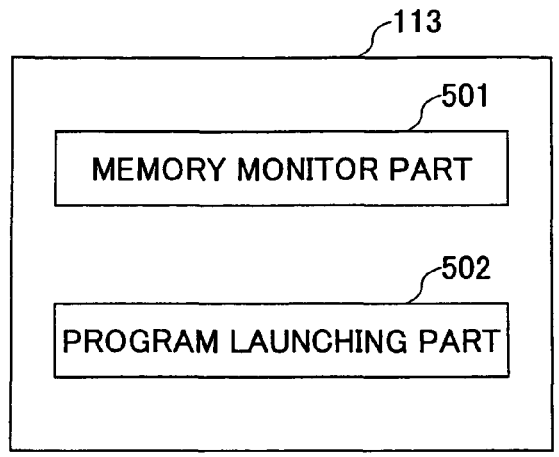
FIG. 5 shows a compound machine launch part.

As shown in FIG. 5, the compound machine launch part 113 includes a memory monitoring part 501 and a program launch part 502.

When the power of the compound machine 101 is turned on, BIOS and boot loader that form the memory monitoring part 501 are launched, so that the OS that is the UNIX and the like is launched. Next, a launch processing program that forms the program launch part 502 is launched, so that the applications and the platforms 132 are launched. When the UNIX is launched, a kernel of the UNIX is launched, a root file system is unfolded, so that file systems relating to the applications and the platforms are mounted on the root system file.

In the following, mount processes and launch processes for the applications and the platforms 132 are described. The program launch part 502 reads a master setting file "init.conf" in "etc" in a root file system, so that the program launch part 502 performs mount processes and launch processes according to commands in the master setting file. Further, the program launch part 502 reads setting files "init.conf" and "init.cnf" in the mounted file system to perform mount processes and launch processes according to commands in the setting file. In addition, the program launch part 502 reads setting files "*.conf" and "*.cnf" in a setting directory "init.d" in the mounted file system to perform mount processes and launch processes according to commands in the setting files. By providing an authentication file "*.lic" in which an electronic signature of the setting file is written, the program launch part 502** can check the electronic signature of the setting file before performing mount processes and launch processes.

(Memory Card)

In the following, the memory card slot 234 and the memory card 235 shown in FIG. 2 are described. The memory card slot 234 is a slot to which the memory card 235 is inserted, in which the memory card 235 stores programs such as the applications 131 or the platforms 132. The programs stored in the memory card 235 are read and loaded in the MEM-P 231 or the MEM-C 232.

In one embodiment, the memory card 235 stores each module of the applications and the platforms 132 as a mod file "*.mod" having an extension "mod". In addition, the memory card 235 stores the electronic signature of each mod file as a mac file "*.mac" having an extension "mac".

In addition, the memory card 235 stores a setting file as a cnf file "*.cnf" having an extension "cnf", and the memory card 235 stores an authentication file including the electronic signature of the setting file as a lic file "*.lic" having an extension "lic".

The electronic signature of each file is one obtained by generating a message digest from the file and encrypting the message digest with a secret key, in which the message digest is generated by using a hash function such as MD5 and SHA1. For example, the electronic signature of the mod file or the cnf file is obtained by encrypting a message digest generated from the mod file or the cnf file.

The electronic signature can be checked by comparing a message digest obtained from the file by the hash function with a message digest that is obtained by decoding the electronic signature by using a public key. For example, the electronic signature of the mod file can be checked by comparing a message digest generated from the mod file with a message digest obtained by decrypting the electronic signature in the mac file. In the same way, the electronic signature of the cnf file can be checked by comparing a message digest generated from the cnf file with a message digest obtained by decrypting the electronic signature in the lic file. The check of the signature may be performed by the program launch part 502 while performing the mount processes or the launch processes.

When a SD memory card is used as the memory card 235, the electronic signature of the cnf file may be obtained by encrypting a message digest generated from the cnf file and a SD serial ID. Since the SD serial ID of the SD memory card is specific to the SD memory card, the lic file stored in the SD memory card becomes a file specific to the SD memory card. Thus, this configuration is useful for preventing illegal copy of the SD memory card. In this case, the electronic signature of the cnf file can be checked by comparing a message digest generated from the cnf file and the SD serial ID with a message digest obtained by decrypting the electronic signature in the lic file. Each SD serial ID is stored in each memory card.

As the memory card 235, an SD (Secure Digital) memory card that is a kind of a flash memory card is used. By using the SD memory card, there is a merit in that large capacity memories can be obtained at a low cost. For the SD memory card, a SD memory card slot is used as the memory card slot 234.

Figure 6:
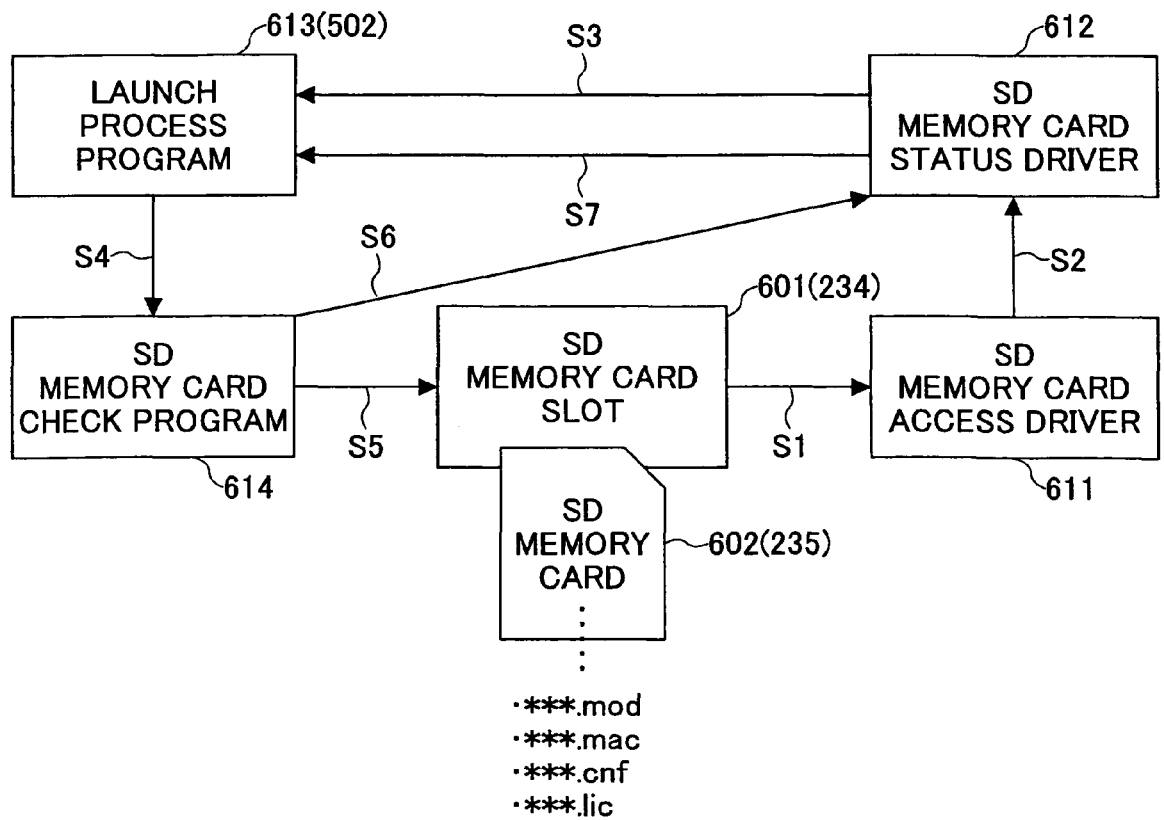
FIG. 6 shows software relating to a SD memory card slot and a SD memory card.

As shown in FIG. 6, the compound machine 101 includes a SD memory card access driver (SD access) 611, a SD memory card status driver (SD status) 612, a launch processing program 613, and a SD memory cad check program (SD check) 614 as software relating to the SD memory card slot 601 and the SD memory card 602 (corresponding to memory card slot 234 and memory card 235).

The SD access 611 is a driver for performing access control for the SD memory card 602. More specifically, the SD access 611 detects insert/eject of the SD memory card 602, for example. The SD status 612 is a driver for managing information of insert/eject/mount/unmount for the SD memory card 602. The launch processing program 613 is a program forming the program launch part 502 of FIG. 5. The SD check 614 is a program for performing mount/unmount of the SD memory card 602.

When the SD memory card 602 is inserted into the SD memory card slot 601, the SD access 611 detects that the SD memory card 602 is inserted in step 1, and the SD access 611 notifies the SD status 612 of the event in step 2. In response to that, the SD status 612 manages information that indicates that the SD memory card 602 has been inserted, and notifies the launch processing program 613 that the SD memory card 602 has been inserted in step 3. In response to that, the launch processing program 613 launches the SD check 614 to mount the SD memory card 602. In response to that, the SD check 614 mounts the SD memory card 602 in step 5, and notifies the SD status 612 of the event in step 6. In response to that, the SD status 612 manages information indicating that the SD memory card 602 is mounted, and notifies the launch processing program 613 that the SD memory card 602 has been mounted in step 7.

When the SD memory card 602 is pulled out from the SD memory card slot 601, the SD access 611 detects that the SD memory card 602 has been pulled out in step 1, and SD access 611 notifies the SD status 612 that the SD memory card 602 has been pulled out in step 2. In response to that, the SD status 612 manages information that indicates that the SD memory card 602 has been pulled out, and notifies the launch processing program 613 that the SD memory card 602 has been pulled out in step 3. In response to that, the launch processing program 613 launches the SD check 614 to unmount the SD memory card 602 in step 4. In response to that, the SD check 614 unmounts the SD memory card 602 in step 5, and notifies the SD status 612 of the event in step 6. In response to that, the SD status 612 manages information indicating that the SD memory card 602 is unmounted, and notifies the launch processing program 613 that the SD memory card 602 has been unmounted in step 7.

By adopting the SD memory card, so-called hot insertion and removal of the card can be realized. That is, an operation for inserting the SD memory card 602 into the SD memory card slot 601 and an operation for removing the SD memory card 602 from the SD memory card slot 601 can be performed after the compound machine 101 is launched.

EXAMPLES OF USAGE OF SD MEMORY CARD AND HDD

In the following, examples of usage of the SD memory card 602 of FIG. 6 (corresponding to the memory card 235 of FIG. 2) and the HDD 233 of FIG. 2 are described.

(1) First Example

The first example is described with reference to FIGS. 7A-7D. In this example, an example of a business model is described in which a maker distributes, to a vendor, a SD memory card 602 used for inputting a SDK application to a compound machine 101 and the vendor develops a SDK application so that a user inputs the SDK application into the compound machine 101 by using the SD memory card 602.

Figure 7A:
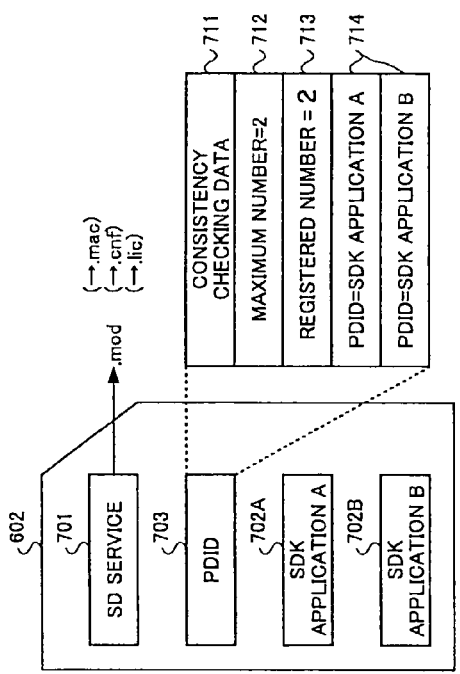
FIGS. 7A-7D are figures for explaining a first example.

The SD memory card 602 shown in FIG. 7A is a SD memory card on the market.

Figure 7B:
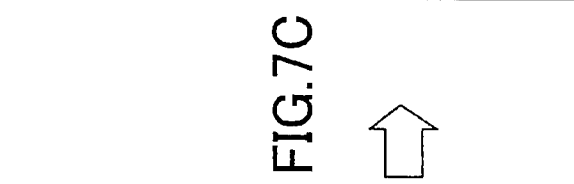

The SD memory card shown in FIG. 7B is one provided to a vendor of the compound machine 101 from a maker of the compound machine 101. The SD memory card 602 shown in FIG. 7B stores a SD memory card service file (SD service file) 701 and a PDID file 703.

Figure 7C:
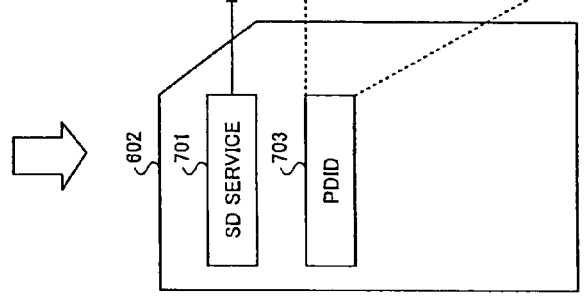

The SD memory card of FIG. 7C is one to be provided to a user of the compound machine 101 from the vendor of the compound machine 101. The SD memory card 602 of FIG. 7C further stores two SDK applications 702A and 702B.

Figure 7D:
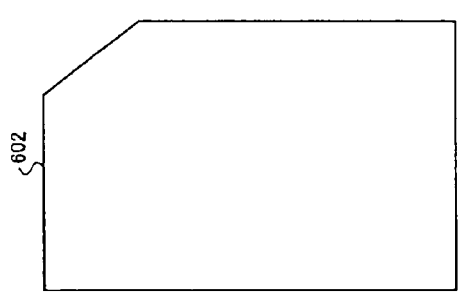

The SD memory card 602 of FIG. 7D is one on which a PDID registration process has been performed by the user of the compound machine 101. In the SD memory card 602 of FIG. 7D, values of PDID of the SDK applications are registered in a PDID file 703.

The SD service file 701 is a file for the compound machine 101 to check validity of the SD memory card 602. More specifically, the SD service file 701 is a file for the compound machine 101 to check if the SD memory card 602 is valid as a SD memory card used for inputting a SDK application into the compound machine 101. The SD service file 701 stores a SD memory card service program (SD service). The compound machine 101 checks if the SD memory card 602 is valid or not by checking if the SD service is launched successfully. The SD service file 701 is an executable file of the SD service.

The SD service file 701 corresponds to a mod file. Thus, the SD memory card 602 includes, in addition to the SD service file 701, a mac file storing a digital signature of the SD service file 701, and a cnf file and a lic file relating to the SD service file 701. Accordingly, tampering of the SD service file 701 can be prevented. Further, the lic file is generated by using a SD serial ID of the SD memory card 602. Thus, unauthorized copy of the SD service file 701 can be prevented. Even if an invalid SD memory card in which the SD service file 701 is illicitly copied is used, the illicit use can be detected by checking the electronic signature in the lic file since SD serial IDs between the original SD memory card and the invalid SD memory card are different.

The SDK application files 702A and 702B store a SDK application. As mentioned before, the SDK application is an application (131) generated by a dedicated SDK (software developing kit). In this example, the SDK application file 702 stores an SDK application developed by the vendor. The SD memory card 602 is configured such that the vendor can write the SDK application file 702 into the SD memory card 602. The SDK application file 702 is an executable file of the SDK application.

The SDK application file 702 includes an identification code used by the compound machine 101 to identify that the SDK application file 702 is a SDK application. The identification code is stored in a predetermined area in the SDK application file 702, for example, the identification code is stored in first several bytes of the file. The compound machine 101 identifies that the SDK application file 702 is a SDK application by checking if the file includes the identification code. In this example, a dedicated tool for storing the identification code in the SDK application file 702 is provided to the vendor by the maker such that the vendor can write the identification code into the SDK application file 702.

The PDID file 703 is a file for storing a PDID (product ID) of a SDK application, wherein the PDID is an ID (identification information) of the SDK application. More specifically, the PDID file 703 is a file for registering the PDID of the SDK application stored in the SDK application file 702 in the SD memory card 602. The compound machine 101 performs a PDID registration process for registering the PDID in the PDID file 703 in the SD memory card 602. In addition, the compound machine 101 performs an application validity determination process for determining the validity of the SDK application in the SDK application file 702 by checking if the PDID of the SDK application is registered in the PDID file 703 in the SD memory card 602. If the SDK application is determined to be valid by the application validity determination process, the compound machine 101 performs a launch process and a launch right setting process for the SDK application. The PDID of the SDK application can be obtained from the SDK application file 702.

For storing the PDID in the PDID file 703, the PDID is encrypted by using a key (seed) specific to the SD memory card 602. In this example, the key (encryption data) is generated by using a lic file (lic file relating to the SD service file 701, for example) in the SD memory card 602. For example, the key is a checksum (8 bits) of the lic file. In addition, the key is used not only for encryption but also for decoding. As mentioned above, the lic file is generated by using the SD serial ID of the SD memory card 602. Encryption for the PDID is performed by performing EOR (exclusive OR) operation, byte by byte, for the PDID and the key. As mentioned above, by encrypting the PDID of the SDK application with the key, tampering of the PDID file 703 can be prevented. Further, by encrypting the PDID of the SDK application with a key specific to the SD memory card 602, illicit copy of the PDID file 703 can be prevented.

The PDID file 703 includes consistency checking data 711, a maximum application number 712, registered application number 713 and the PDID 714.

The consistency checking data 711 (several bytes data) is used by the compound machine 101 for checking consistency between the SD memory card 602 and the PDID file 703. The consistency checking data 711 is generated by using a lic file (for example, lic file relating to the SD service file 701) in the SD memory card 602. For example, the consistency checking data 711 is a check sum of the lic file.

The maximum application number 712 is a maximum number (upper limit) of PDIDs that can be registered in the PDID file 703. That is, the maximum application number 712 is a maximum number (upper limit) of SDK applications (SDK application files 702) that can be validly written in the memory card 602. In this example, the maximum application number 712 is determined and set by the maker to limit the number of SDK applications written in the SD memory card by the vendor. The maximum application number 712 in the PDID file 703 shown in FIGS. 7B-7D is 2. The maximum application number 712 is encrypted by the seed (key) and stored.

The registered application number 713 is a number of PDIDs registered in the PDID file 703. That is, the registered application number 713 is a number of valid SDK applications already written in the SD memory card 602. In the PDID registration process, the compound machine 101 registers a number of PDIDs registered in the PDID file 703 as the registered application number 713. The registered application number 713 is used for managing a number of SDK applications written by the vendor to limit the number. The registered application number 713 in the PDID file 703 in FIGS. 7B and 7c is 0, and the registered application number 713 in the PDID file 703 in FIG. 7D is 2. The registered application number 713 is encrypted by the seed (key) and is registered. A status in which the registered application number 713 is 0 is called "initial state", and a status in which the registered application number 713 is other than 0 is called "registered state".

The PDID 714 is a registration field for registering a PDID (product ID) of the SDK application. More specifically, the PDID 714 is a registration field for registering a PDID (product ID) of the SDK application stored in the SDK application file 702 in the SD memory card 602. Any PDID is not yet registered in the PDID 714 shown in FIGS. 7B and 7C. In the PDID 714 in FIG. 7D, PDIDs of SDK applications (PDID of the SDK application A stored in the SDK application file A 702 A and PDID of the SDK application B stored in the SDK application file B 702 B) are registered. In the PDID 714 in the PDID file 703 in FIGS. 7B and 7C stores an dummy ID instead of the actual PDID wherein the data amount of the dummy ID is the same as that of the PDID. When a PDID is stored in the PDID file 703, the dummy ID is replaced by the PDID. By adopting this configuration, it can be prevented that the existence of the PDID registration process is detected due to a difference between data amounts before storing the PDID and after storing the PDID. The PDID registered in the PDID 714 is encrypted by the seed (key) as mentioned before.

In the following, examples of the PDID registration process and the application validity determination process are described.

Figure 8:
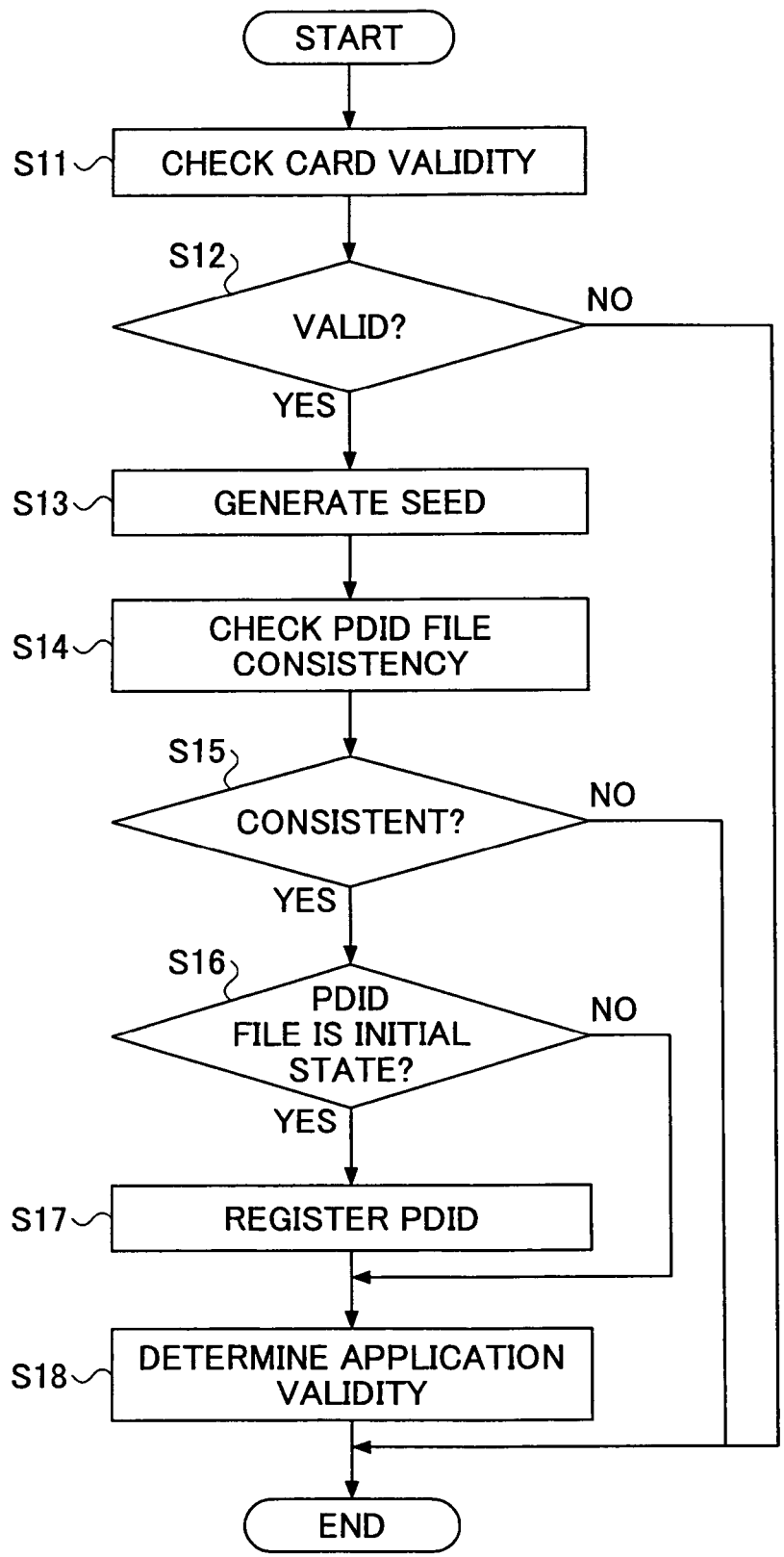
FIG. 8 shows a flowchart of processes performed by a VAS.

These processes are performed by the VAS 135. FIG. 8 shows a flowchart of the processes performed by the VAS 135. FIG. 9 is a functional block diagram of functions realized by the VAS 135. As shown in FIG. 9, the compound machine 101 includes a card validity checking part 901, a seed generation part 802, a PDID file consistency checking part 903, a PDID encryption part 911, a PDID registration part 912, a PDID decoding part 921 and an application validity determination part 922.

In a state where the SD memory card 601 is inserted in the SD memory card slot 601 in the compound machine 101, when the power of the compound machine 101 is turned on, the process of FIG. 8 is performed by the VAS 135.

First, the card validity checking part 901 checks validity of the SD memory card 602 in step 11. More specifically, the card validity checking part 901 checks whether the SD memory card 602 is valid as a SD memory card for inputting a SDK application into the compound machine 101 on the basis of the SD service file 701 in the SD memory card 602. As mentioned above, the SD service file 701 stores the SD service. The card validity checking part 901 checks the validity of the SD memory card 602 checking whether the SD service is launched successfully. As to how to check the successful launch, the SD service may notify the VAS 135 of the launch, or the VAS 135 may access the SD service. Alternatively, the SD service may write data into the HDD 233 so that the VAS 135 may read the data.

When the SD memory card is determined to be valid in step 11, the process moves to step 13 (in step 12). When the SD memory card 602 is not determined to be valid in step 11, the PDID registration process or the application validity determination process is not performed and the whole process of FIG. 8 by the VAS 135 ends.

Next, the seed generation part 902 generates a key (seed) specific to the SD memory card 602 in step 13. The key is generated by using a lic file (lic file relating to SD service file 701, for example) in the SD memory card 602. For example, the key is a check sum (8 bits) of the lic file. The key is for encrypting and for decoding. In this example, the seed generation part 902 generates the key (seed) 931 by using a predetermined lic file 932. The lic file 932 is a lic file generated by using the SD serial ID of the SD memory card 602.

Next, the PDID file consistency checking part 903 checks consistency between the SD memory card 602 and the PDID file 703 in the SD memory card 602 on the basis of the consistency checking data in the PDID file 703 in step 14.

Next, when it is checked that the SD memory card 602 is consistent with the PDID file 703 in step 14, the process moves to step 16 (step 15). When the SD memory card 602 is not consistent with the PDID file 703 in step 14, the PDID registration process or the application validity determination process is not performed so that the whole process of the VAS 135 ends.

Next, the VAS 135 checks whether the PDID file 703 in the SD memory card 602 is in an initial state or in a registered state on the basis of the registered application number in the PDID file 703 in step 16. When it is checked that the PDID 703 is in an initial state, the PDID registration process (step 17) and the application validity determination process (step 18) are performed in this order. When it is checked that the PDID file 703 is in a registered state, the PDID registration process is not performed but the application validity determination process (step 18) is performed. Instead of adopting the conditional branch based on the initial state or the registered state, the conditional branch may be based on whether the registered application number 713 is less than the maximum application number or not.

In the following, the PDID registration process (step 17) is described. After the step 16, the PDID registration part 912 registers an PDID of the SDK application stored in the SDK application file 702 into the PDID file 703 in the SD memory card 602. The PDID of the SDK application is encrypted by the PDID encryption part 911 with the seed 931 generated by the seed generation part 902. The encrypted PDID is registered in the PDID file 703 by using the PDID registration part 912.

In the PDID registration process (step 17), the PDID registration part 912 registers a number of PDIDs in the PDID file 703 as the registered application number 713 in the PDID file 703. As mentioned above, the PDID file 703 enters the registered state from the initial state. Apparent from the description of the step 16, the PDID registration process will not be performed at a next power-on.

In the following, the application validity determination process (step 18) is described. Next to the step 16, the application validity determination part 922 determines the validity of the SDK application stored in the SDK application file 702 by determining whether the PDID of the SDK application is registered in the PDID file 703 in the SD memory card 602. Since the PDID of the SDK application in the PDID file 703 is encrypted with the seed (key) 931, the encrypted PDID is to be decoded with the seed 931 by the PDID decoding part 921.

The compound machine 101 performs a launch process or a launch right setting process for the application on condition that the SDK application in the SDK application file 702 is determined to be valid by the application validity determination process. That is, it is restricted to load, into the MEM-P 231 or the MEM-C 232, a SDK application on which the application validity determination process is not performed or a SDK application that is determined to be invalid by the application validity determination process. As mentioned above, it can be prevented that data in the SD memory card 602 is invalidly copied and used so that a program is thereby not invalidly input into a compound machine 101.

An example of merits for performing the PDID registration process and the application validity determination process is to prevent unauthorized replacement of the SDK application file 702 in the SD memory card 602. For example, even if a user who bought a SD memory card storing an inexpensive SDK application file replaces the SDK application with an expensive SDK application by unauthorized copying, the user cannot use the expensive SDK application. This is because PDIDs of the applications are different so that the expensive SDK application cannot pass the application validity determination. The same merit can be obtained for adding an unauthorized SDK application to the SD memory card.

The above-mentioned merit can be obtained regardless of whether the maximum application number 712 of the PDID file 703 is one or more than one, wherein the maximum application number 712 is a maximum number of SDK applications that can be written into the SD memory card 602. Thus, for example, a business model can be realized in which more than one vendors are allowed to write applications in one SD memory card while the above-mentioned merit is obtained. For example, a vendor A is allowed to write two SDK applications in a SD memory card, and a vendor B is allowed to write one SDK application in the SD memory card, wherein the maker sets the maximum application number 712 as three.

In the above-mentioned configuration, the SDK application is loaded in the compound machine 101 from the SD memory card. Alternatively, the SDK application may be downloaded via a network into the compound machine 101 by using the SD memory card 602. That is, in this case, the SD memory card is used as a key for download permission. In this case, it is not necessary to store any SDK application file in the SD memory card 602, but the SD memory card 602 stores the SD service 701 and the PDID file 703.

In the following, details of the PDID registration process (step 17) are described with reference to a sequence diagram of FIG. 10.

As described in step 11, when the SD service in the SD service file 701 is launched in step 101, the SD service notifies the VAS 135 of the launch in step 102. Next, as explained in step 13, the VAS 135 generates the seed in step 103. Next, as explained in step 14, the VAS 135 checks consistency between the SD memory card 602 and the PDID file 703 in step 104. The before mentioned conditional branch processes in steps 12, 15 and 16 are also performed as described.

Next, the VAS 135 checks the identification code stored in the SDK application file 702 in step 105. The VAS 135 determines whether a file is the SDK application file 702 by determining whether the file stores the identification code. As to a file that does not include the identification code, the PDID registration process and the application validity determination process are not performed.

Next, the VAS 135 provisionally launches the SDK application stored in the SDK application file 702 in step 106. Accordingly, the VAS 135 obtains the PDID of the SDK application from the SDK application in step 107. Next, as described in step 17, the VAS 135 encrypts the PDID with the seed in step 108 and registers the encrypted PDID in the PDID file 703 in step 109. Then, the VAS 135 ends the provisional launch of the SDK application in step 110.

In the following, details of the application validity determination process (step 18) are described with reference to a sequence diagram of FIG. 11.

As described in step 11, when the SD service stored in the SD service file 701 is launched in step 201, the SD service notifies the SD service of the launch in step 202. Next, as described in step 13, the VAS 135 generates a seed in step 203. Next, as described in step 14, the VAS 135 checks consistency between the SD memory card 602 and the PDID file 703 in step 204. The before mentioned conditional branch processes in steps 12, 15 and 16 are also performed.

Next, the VAS 135 checks the identification code stored in the SDK application file 702 in step 205. The VAS 135 determines whether a file is the SDK application file 702 by determining whether the file stores the identification code. As to a file that does not include the identification code, the PDID registration process and the application validity determination process are not performed.

Next, the VAS 135 provisionally launches the SDK application stored in the SDK application file 702 in step 206. Accordingly, the VAS 135 obtains the PDID of the SDK application from the SDK application in step 207. Next, as described in step 18, the VAS 135 decodes the PDID registered in the PDID file 703 in step 208, and determines validity of the SDK application by comparing the PDID obtained in step 207 and the PDID obtained in step 208 in step 209.

Next, the VAS 135 obtains application information of the SDK application from the SDK application that has been determined to be valid in step 210. At this time, a manager of the compound machine 101 can operate the compound machine 101 to display a selection screen on the operation panel 202 for selecting a SDK application to which a launch right is to be set among SDK applications determined to be valid in step 211. The manager of the compound machine 101 can select a target SDK application by operating the operation panel in step 212. Then, the VAS 135 registers the PDID of the selected SDK application in the HDD 233 (or a nonvolatile memory (flash memory and the like)) so that launching right of the SDK application can be set in step 213. When a launch right is set for a SDK application in the SD memory card inserted in the SD memory card slot 601, the compound machine 101 launches the SD application from the SD memory card 602 in which the SDK application is loaded into the MEM-P 231 or the MEM-C 232.

(2) Second Example

In this example, an example of a business model is described in which a maker distributes, to a vendor, a SD memory card 602 used for inputting a SDK application to the compound machine 101 and the vendor develops a SDK application so that a user inputs the SDK application into the compound machine 101 by using the SD memory card 602.

The SD memory card 602 shown in FIG. 12A is a SD memory card on the market.

The SD memory card shown in FIG. 12B is one provided to a vendor of the compound machine 101 from a maker of the compound machine 101. The SD memory card 602 shown in FIG. 12B stores a SD memory card service file (SD service file) 701 and a PDID file 703.

The SD memory card of FIG. 12C is one to be provided to the user of the compound machine 101 from the vendor of the compound machine 101. In the SD memory card 602 of FIG. 12C, two SDK applications 702A and 702B are added to the SD memory card 602 of FIG. 12B.

The SD memory card 602 of FIG. 12D is one on which a PDID registration process has been performed in the user side. In the SD memory card 602 of FIG. 12D, values of PDID of the SDK applications are registered in the PDID file 703 in the SD memory card 602 of FIG. 12C.

Like the first example, the SD service file 701 is a file for the compound machine 101 to check validity of the SD memory card 602, and the SDK application file 702 stores a SDK application. In addition, like the first example, the PDID file 703 is a file for storing a PDID (product ID) of a SDK application, wherein the PDID is an ID (identification information) of the SDK application.

For storing the PDID in the PDID file 703, the PDID is encrypted by using a key (seed) specific to the compound machine 101. In this example, the key (encryption data) is generated by using a machine number of the compound machine 101. For example, the key is a checksum (8 bits) of the machine number. In addition, the key is used not only for encryption but also for decoding. Instead of using the machine number, information specific to each machine such as a MAC address or an IP address can be used. Encryption for the PDID is performed by performing an EOR (exclusive OR) operation on the PDID by using the key in units of byte. As mentioned above, by encrypting the PDID of the SDK application with the key, tampering of the PDID file 703 can be prevented. Further, by encrypting the PDID of the SDK application with a key specific to each compound machine 101, it is restricted to use the SD memory card in another compound machine that may be the same model of the compound machine 101 or may be a related model of the compound machine 101. The same configuration can be also adopted for an image forming apparatus (information processing apparatus) other than the compound machine such as a copier, a printer, a scanner, a facsimile and the like.

In the same way as the first example, the PDID file 703 stores the consistency checking data 711, the maximum application number 712, the registered application number 713 and the PDID 714.

In the following, examples of the PDID registration process and the application validity determination process are described.

Figure 13:
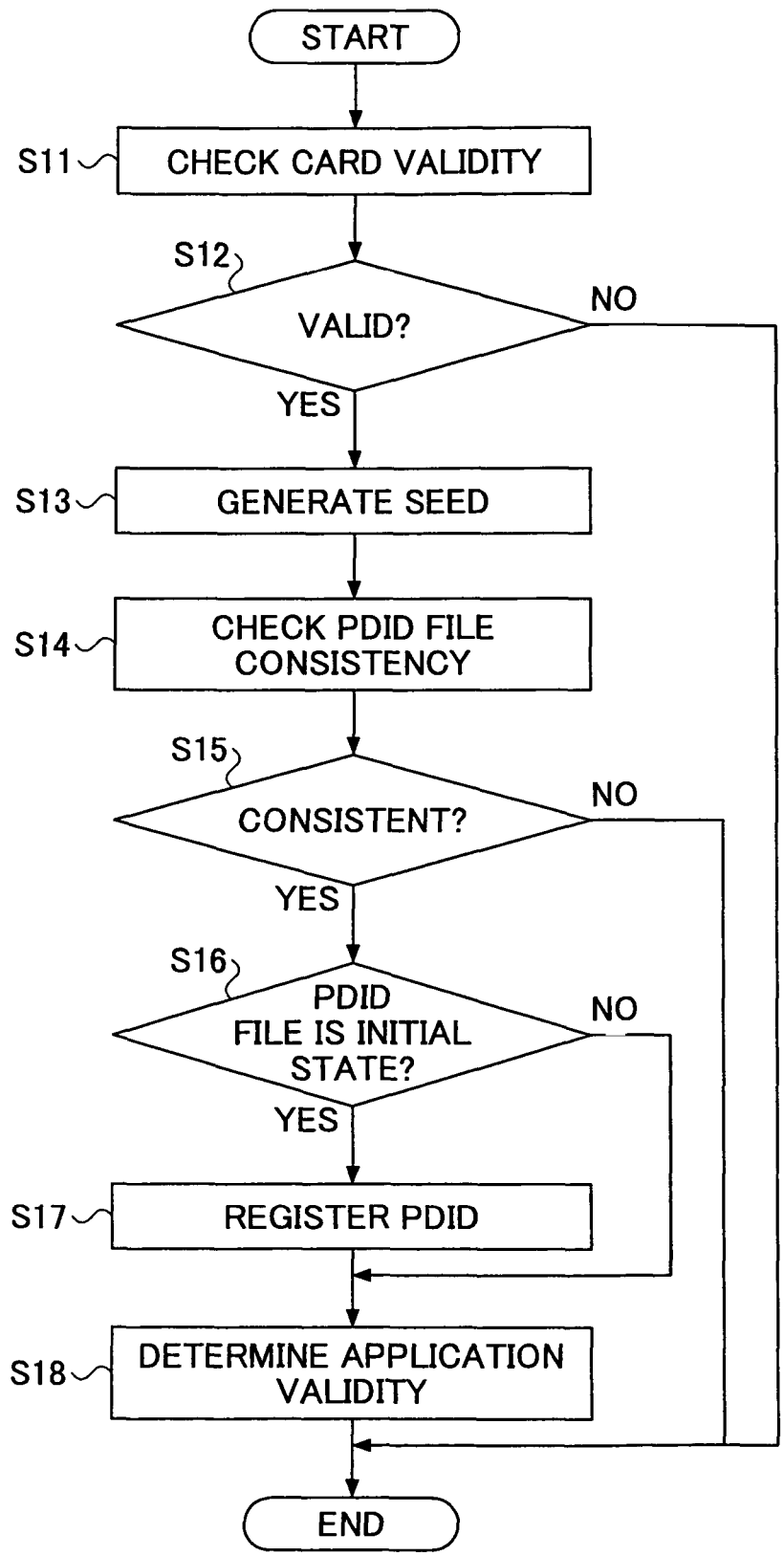
FIG. 13 shows a flowchart of processes performed by the VAS.
Figure 14:
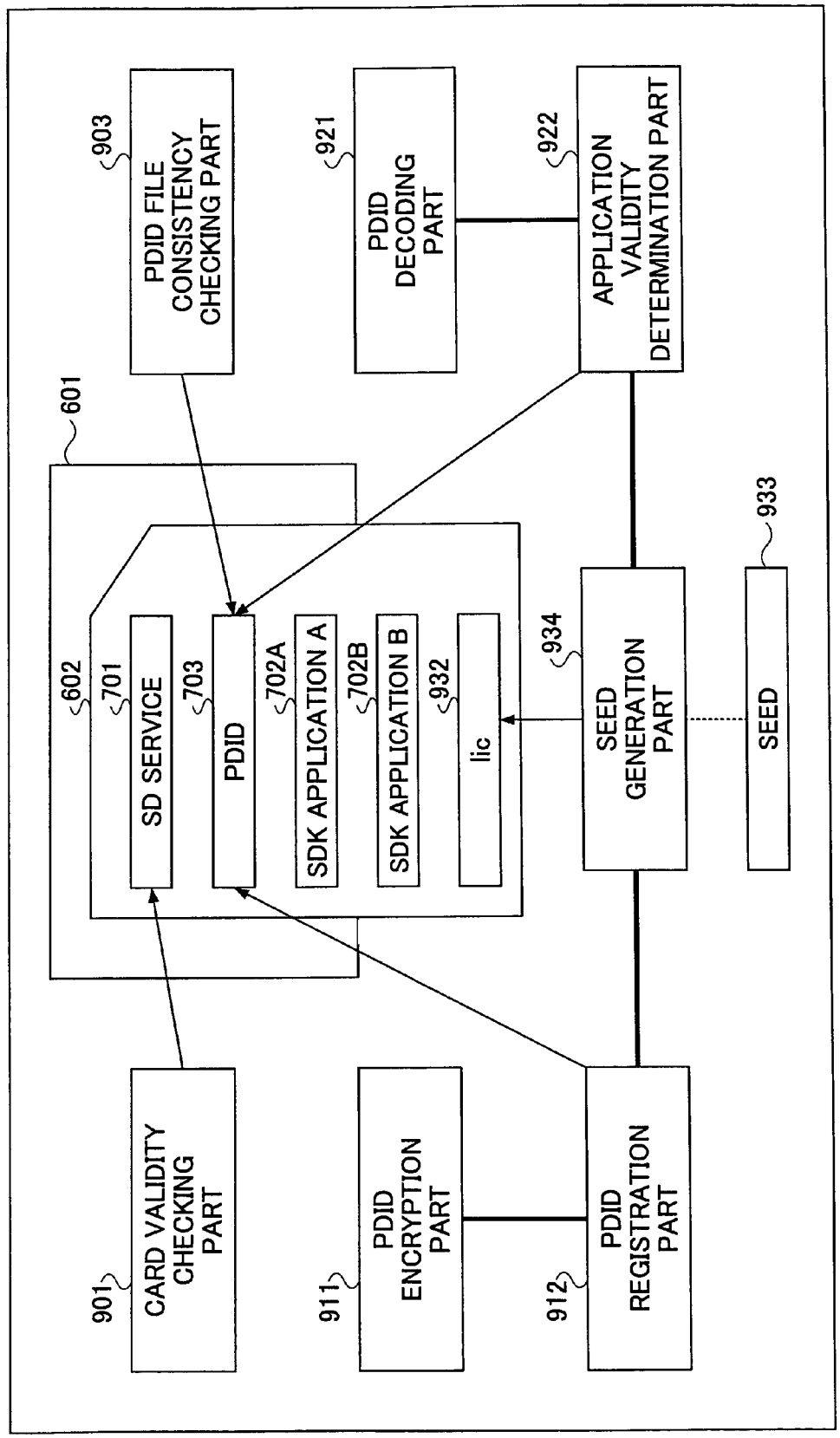
FIG. 14 is a functional block diagram of functions realized by the VAS.

These processes are performed by the VAS 135. FIG. 13 shows a flowchart of the processes performed by the VAS 135. FIG. 14 is a functional block diagram of functions realized by the VAS 135. As shown in FIG. 14, the compound machine 101 includes a card validity checking part 901, a seed generation part 902, a PDID file consistency checking part 903, a PDID encryption part 911, a PDID registration part 912, a PDID decoding part 921 and an application validity determination part 922.

In a state where the SD memory card 602 is inserted in the SD memory card slot 601 in the compound machine 101, when the power of the compound machine 101 is turned on, the process of FIG. 13 is performed by the VAS 135.

First, in the same way as the first example, the card validity checking part 901 checks validity of the SD memory card 602 in step 11, and when the SD memory card is determined to be valid in step 11, the process moves to step 13 (in step 12).

Next, the seed generation part 902 generates a key (seed) specific to the compound machine 101 in step 13. The key is generated by using a machine number of the compound machine 101. For example, the key is a check sum (8 bits) of the machine number. The key is used for both of encrypting and decoding. As mentioned before, instead of the machine number, information such as a MAC address or an IP address specific to the compound machine 101 can be used. In this example, the seed generation part 902 generates the key (seed) 933 by using the machine number 934 of the compound machine 101.

Next, in the same way as the first example, the PDID file consistency checking part 903 checks consistency between the SD memory card 602 and the PDID file 703 in the SD memory card 602 on the basis of the consistency checking data 711 in step 14. When it is checked that the SD memory card 602 is consistent with the PDID file 703 in step 14, the process moves to step 16 (step 15) like the first embodiment.

Next, also like the first embodiment, the VAS 135 checks whether the PDID file 703 in the SD memory card 602 is in an initial state or in a registered state on the basis of the registered application number 713 in the PDID file 703 in step 16. When it is checked that the PDID 703 is in an initial state, the PDID registration process (step 17) and the application validity determination process (step 18) are performed in this order. When it is checked that the PDID file 703 is in the registered state, the PDID registration process is not performed but the application validity determination process (step 18) is performed.

In the following, the PDID registration process (step 17) is described. After the step 16, the PDID registration part 912 registers an PDID of the SDK application stored in the SDK application file 702 into the PDID file 703 in the SD memory card 602. The PDID of the SDK application stored in the SDK application file 702 is encrypted by the PDID encryption part 911 with the seed 933 generated by the seed generation part 902. The encrypted PDID is registered in the PDID file 703 by using the PDID registration part 912 in the same way as the first example.

In the following, the application validity determination process (step 18) is described. Next to the step 16, the application validity determination part 922 determines the validity of the SDK application stored in the SDK application file 702 by determining whether the PDID of the SDK application is registered in the PDID file 703 in the SD memory card 602. Since the PDID of the SDK application in the PDID file 703 is encrypted with the seed (key) 933, the encrypted PDID can be decoded with the seed 933 by the PDID decoding part 921 like the first embodiment.

Figure 15:
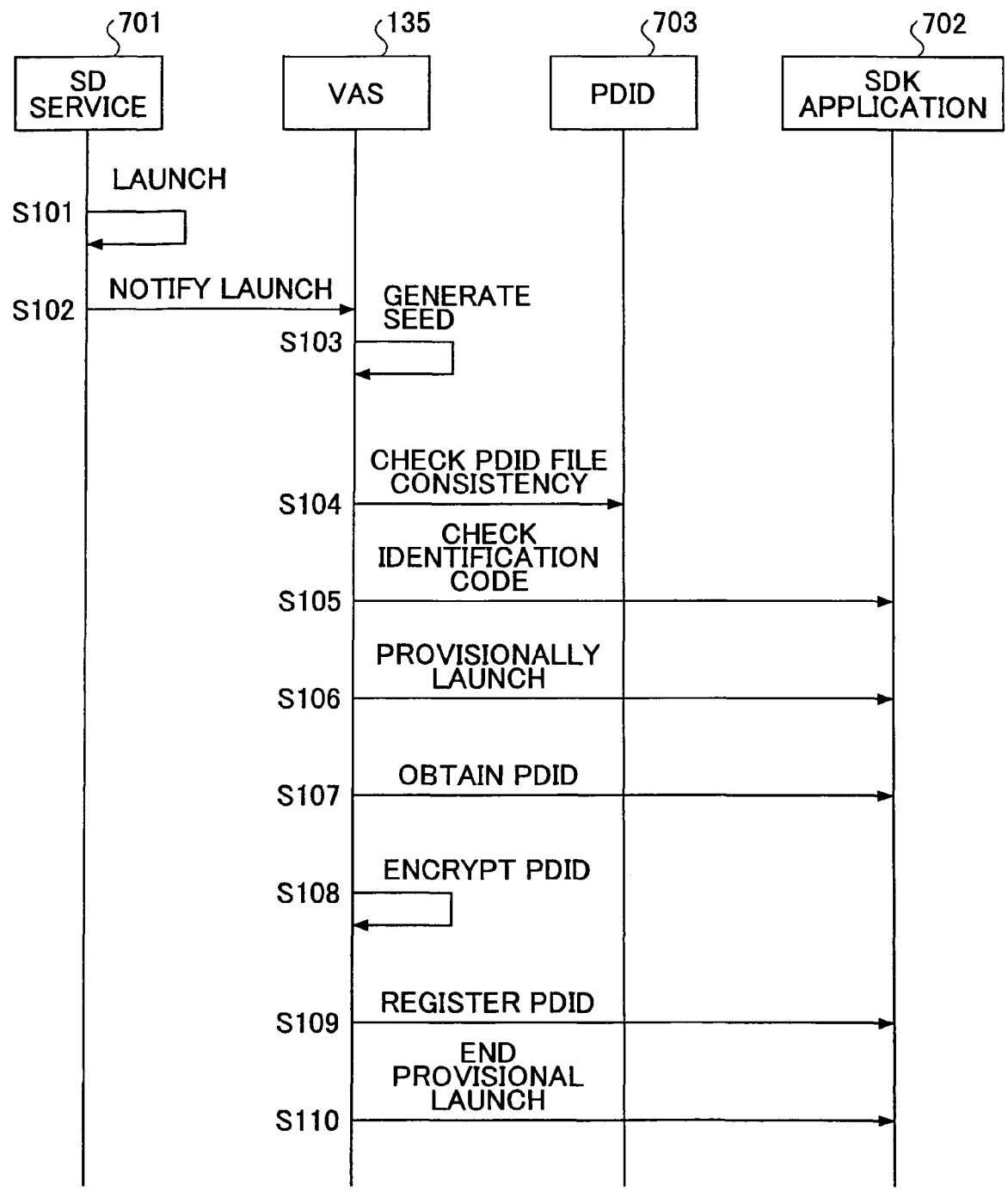
FIG. 15 is a sequence diagram for explaining a PDID registration process.

In the following, details of the PDID registration process (step 17) are described with reference to a sequence diagram of FIG. 15.

As described in step 11, when the SD service in the SD service file 701 is launched in step 101, the SD service notifies the VAS 135 of the launch of the SD service in step 102. Next, as explained in step 13, the VAS 135 generates the seed in step 103. Next, as explained in step 14, the VAS 135 checks consistency between the SD memory card 602 and the PDID file 703 in step 104. The before mentioned conditional branch processes in steps 12, 15 and 16 are also performed.

Next, the VAS 135 checks the identification code stored in the SDK application file 702 in step 105. The VAS 135 determines whether a file is the SDK application file 702 by determining whether the file stores the identification code. As to a file that does not include the identification code, the PDID registration process and the application validity determination process are not performed.

Next, the VAS 135 provisionally launches the SDK application stored in the SDK application file 702 in step 106. Accordingly, the VAS 135 obtains the PDID of the SDK application from the SDK application in step 107. Next, as described in step 17, the VAS 135 encrypts the PDID with the seed in step 108 and registers the encrypted PDID in the PDID file 703 in step 109. Then, the VAS 135 ends the provisional launch of the SDK application in step 110.

In the following, details of the application validity determination process (step 18) are described with reference to a sequence diagram of FIG. 16.

As described in step 11, when the SD service stored in the SD service file 701 is launched in step 201, the SD service notifies the VAS 135 of the launch in step 202. Next, as described in step 13, the VAS 135 generates a seed in step 203. Next, as described in step 14, the VAS 135 checks consistency between the SD memory card 602 and the PDID file 703 in step 204. The before mentioned conditional branch processes in steps 12, 15 and 16 are also performed as described.

Next, the VAS 135 checks the identification code stored in the SDK application file 702 in step 205. The VAS 135 determines whether a file is the SDK application file 702 by determining whether the file stores the identification code. As to a file that does not include the identification code, the PDID registration process and the application validity determination process are not performed.

Next, the VAS 135 provisionally launches the SDK application stored in the SDK application file 702 in step 206. Accordingly, the VAS 135 obtains the PDID of the SDK application from the SDK application in step 207. Next, as described in step 18, the VAS 135 decodes the PDID registered in the PDID file 703 in step 208, and determines validity of the SDK application by comparing the PDID obtained in step 207 and the PDID obtained in step 208 in step 209.

Next, the VAS 135 obtains application information of the SDK application from the SDK application that has been determined to be valid in step 210. At this time, a manager of the compound machine 101 can operate the compound machine 101 to display a selection screen on the operation panel 202 for selecting a SDK application to which a launch right is to be set among SDK applications determined to be valid in step 211. The manager of the compound machine 101 can select a target SDK application by operating the operation panel in step 212. Then, the VAS 135 registers the PDID of the selected SDK application in the HDD 233 (or a nonvolatile memory (flash memory and the like)) so that launching right of the SDK application can be set in step 213. If a launch right is set in a SDK application in the SD memory card inserted in the SD memory card slot 601, the compound machine 101 launches the SD application from the SD memory card 602 in which the SDK application is loaded in the MEM-P 231 or the MEM-C 232.

(3) Third Example

In this example, an example of a business model is described in which a vendor instead of a maker develops a SDK application for the compound machine 101, and the vendor distributes the SD memory card to a user, so that the user inputs the SDK application into the compound machine 101 by using the SD memory card 602.

The SD memory card 602 shown in FIG. 17A is a SD memory card on the market.

Two SDK applications (SDK application file A 702A and SDK application file B 702B) and a PDID file 703 are stored by the vendor of the compound machine 101 in the SD memory card 602 shown in FIGS. 17B and 17C. As to the SD memory card 602 of FIG. 17B, the PDID registration process has not yet been performed. As to the SD memory card 602 of FIG. 17C, the PDID registration process has been performed.

As mentioned later, the PDID registration process can be performed by the compound machine 101. The PDID registration process may be performed by a compound machine 101 at a location of the vendor of the compound machine 101 or may be performed by a compound machine 101 at a location of a user of the compound machine 101. In this example, the PDID registration process is performed by the compound machine 101 at the location of the vendor. Therefore, the SD memory cord distributed by the vendor to the user is one shown in FIG. 17C.

The SDK application file 702 is one developed by the vendor of the compound machine 101, and the PDID file 703 shown in FIG. 17B is one provided from the maker of the compound machine 101 to the vendor. In the PDID file 703 shown in FIG. 17C, the PDIDs of the SDK applications are included.

The SD memory cards 602 shown in FIGS. 17D1 and 17D2 are described later.

In the same way as the first example, the SDK application file 702 is a file storing the SDK application. The PDID file 703 is a file for storing a PDID (product ID) of the SDK application, wherein the PDID is an ID (identification information) of the SDK application. The SD memory card 602 is configured such that the vendor can write a PDID file 703 (provided from the maker to the vendor) into the SD memory card 602. In this example of the business model, the PDID registration process is to be performed in a compound machine 101 at the location of the vendor, and the application validity determination process is performed in a compound machine at a location of the user.

For storing the PDID in the PDID file 703, the PDID is encrypted by using a key (seed) specific to the SD memory card 602. In this example, the key (encryption data) is generated by using a SD serial ID of the SD memory card 602. For example, the key is a checksum (8 bits) of the SD serial ID. In addition, the key is used not only for encryption but also for decryption. Encryption for the PDID is performed by performing EOR (exclusive OR) operation for the PDID and the key byte by byte. As mentioned above, by encrypting the PDID of the SDK application with a key, tampering of the PDID file 703 can be prevented. Further, by encrypting the PDID of the SDK application with a key specific to the SD memory card 602, unauthorized copy of the PDID file 703 can be prevented.

For example, as shown in FIG. 17D1, if all files in a first SD memory card on which the PDID registration process has been performed are copied to a second SD memory card, the second SD memory card is determined to be invalid in the application validity determination process since the SD serial IDs are deferent between the first SD memory card and the second SD memory card so that the keys are different. Therefore, it is prevented to use the second SD memory card in any compound machine 101.

In addition, for example, as shown in FIG. 17D2, if only SDK application files 702 in a first SD memory card 602 on which the PDID registration process has been performed are copied to a second SD memory card 602, the application validity determination process is not performed for the second SD memory card since the second SD memory card does not include the PDID file 703. Thus, it is restricted to use the second SD memory card in the compound machine 101.

The PDID file 703 includes registration checking data 711, a registered application number 713 and the PDID 714.

The registration checking data 711 is used by the compound machine 101 for checking whether the PDID registration process has already been performed or not yet performed. The registration checking data 711 in the PDID file 703 of FIG. 17B indicates "not-yet-performed", and the registration checking data 711 in the PDID file 703 of FIG. 17C indicates "performed".

In the following, examples of the PDID registration process and the application validity determination process are described.

Figure 18:
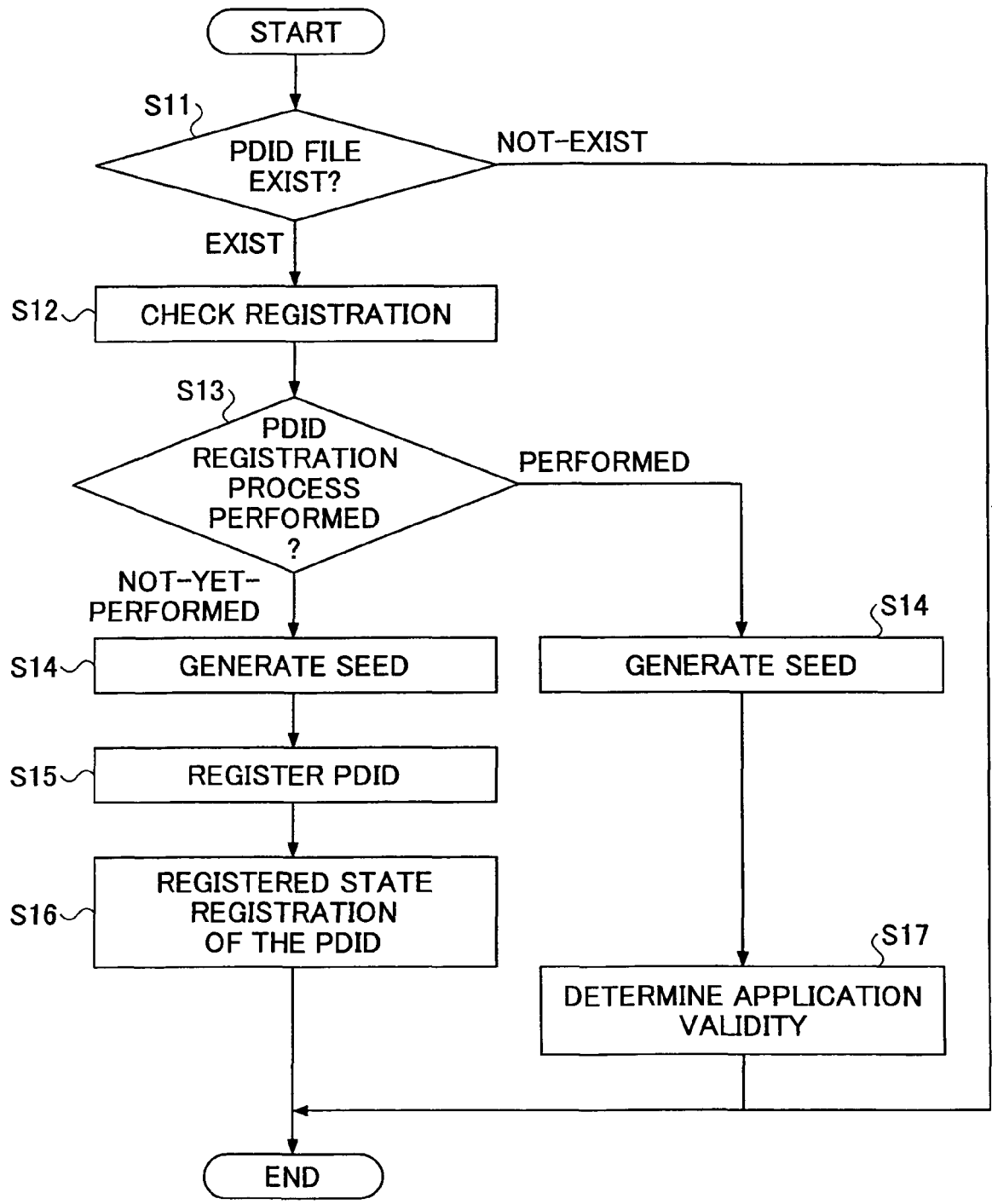
FIG. 18 shows a flowchart of processes performed by the VAS.
Figure 19:
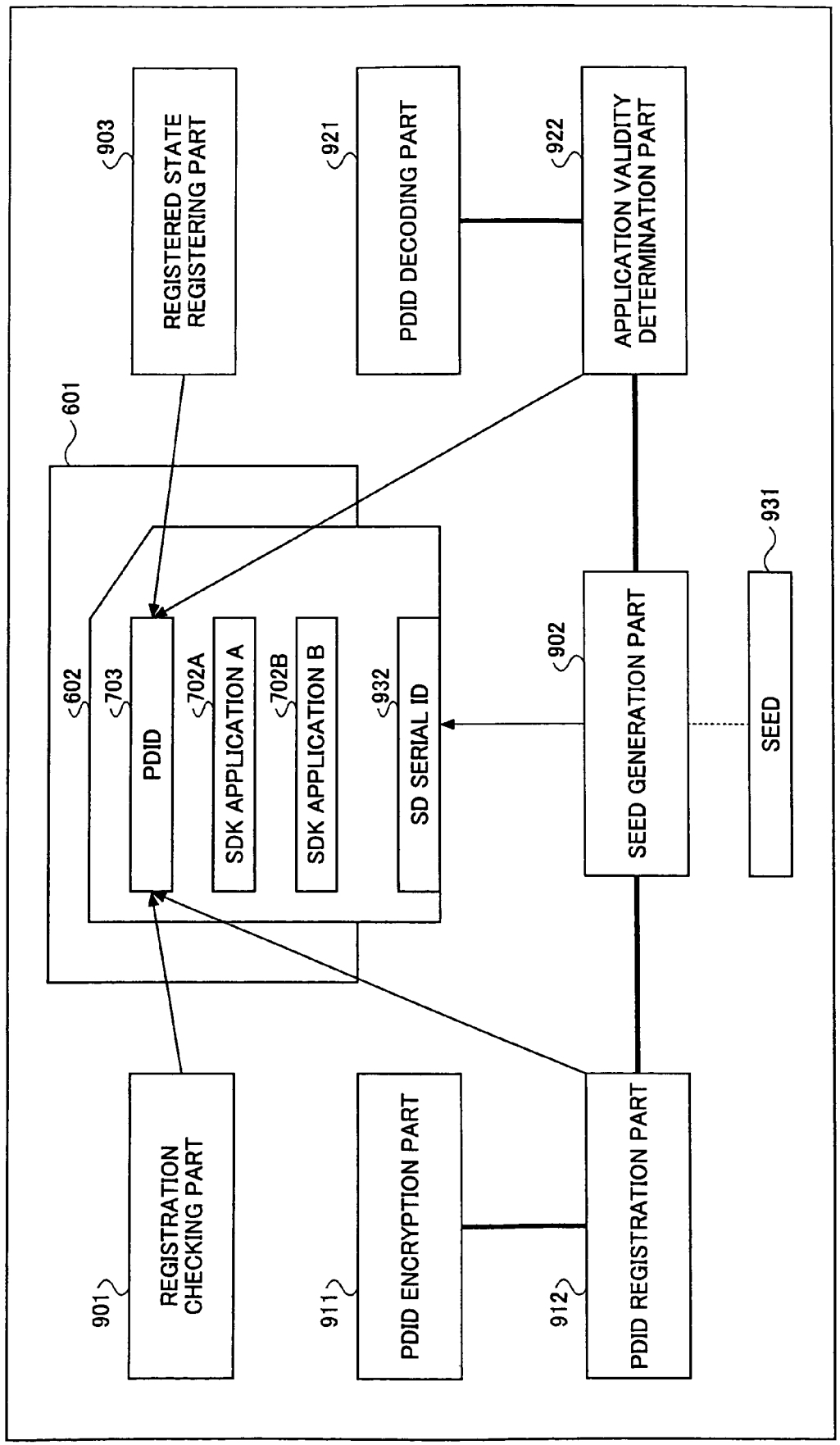
FIG. 19 is a functional block diagram of functions realized by the VAS.

These processes are performed by the VAS 135. FIG. 18 shows a flowchart of the processes performed by the VAS 135. FIG. 19 is a functional block diagram of functions realized by the VAS 135. As shown in FIG. 19, the compound machine 101 includes a registration checking part 901, a seed generation part 902, a registered state registering part 903, a PDID encryption part 911, a PDID registration part 912, a PDID decoding part 921 and an application validity determination part 922.

In a state where the SD memory card 602 is inserted in the SD memory card slot 601 in the compound machine 101, when the power of the compound machine 101 is turned on, the process of FIG. 18 is performed by the VAS 135.

First, the VAS 135 checks whether the PDID file 703 exists in the SD memory card 602 in step 11. When the PDID file 703 exists in the SD memory card 602, the process goes to step 12. When the PDID file 703 does not exist in the SD memory card 602, the PDID registration process or the application validity determination process is not performed so that the whole process of FIG. 18 ends.

Next, the registration checking part 901 checks whether the PDID registration process has been performed or has not been performed for the SD memory card 602 on the basis of the registration checking data 711 in the PDID file 703 in the SD memory card 602 in step 12. When it is determined that the PDID registration process has not been performed in step 13, the seed generation process (step 14), the PDID registration process (step 15) and the registered state registering process (step 16) will be performed in this order. When it is determined that the PDID registration process has been performed, the seed generation process (step 14) and the application validity determination process (step 17) will be performed in this order. In this example of the business model, the former steps 14, 15 and 16 are performed in the compound machine 101 at the location of the vendor, and the latter steps 14 and 17 are performed in the compound machine 101 at the location of the user.

The seed generation process is described in the following.

After step 13, the seed generation part 902 generates a key (seed) specific to the SD memory card 602. The key is generated by using the SD serial ID of the SD memory card 602. For example, the key is a check sum (8 bits) of the SD serial ID. The key is for encrypting and for decoding. In this example, the seed generation part 902 generates the key (seed) 931 by using the SD serial ID 932.

The PDID registration process is described in the following. Subsequent to step 14, the PDID registration part 912 registers a PDID of the SDK application stored in the SDK application file 702 into the PDID file 703 in the SD memory card 602. The PDID of the SDK application stored in the SDK application file 702 is encrypted by the PDID encryption part 911 with the seed 931 generated by the seed generation part 902. The encrypted PDID is registered in the PDID file 703 by using the PDID registration part 912.

In the following, the registered state registering process is described. After step 15, the registered state registering part 903 registers, as the registration checking data 711, information indicating that the PDID registration process has been performed for the SD memory card 602. In this way, when the registration checking data 711 in the PDID file 703 changes from "not-yet-performed" to "performed", the PDID registration process will not be performed at a next power-on of the compound machine 101.

In the following, the application validity determination process (step 17) is described. After the step 14, the application validity determination part 922 determines the validity of the SDK application stored in the SDK application file 702 by determining whether the PDID of the SDK application is registered in the PDID file 703 in the SD memory card 602. Since the PDID of the SDK application in the PDID file 703 is encrypted with the seed (key) 931, the encrypted PDID is to be decoded with the seed 931 by the PDID decoding part 921.

Figure 20:
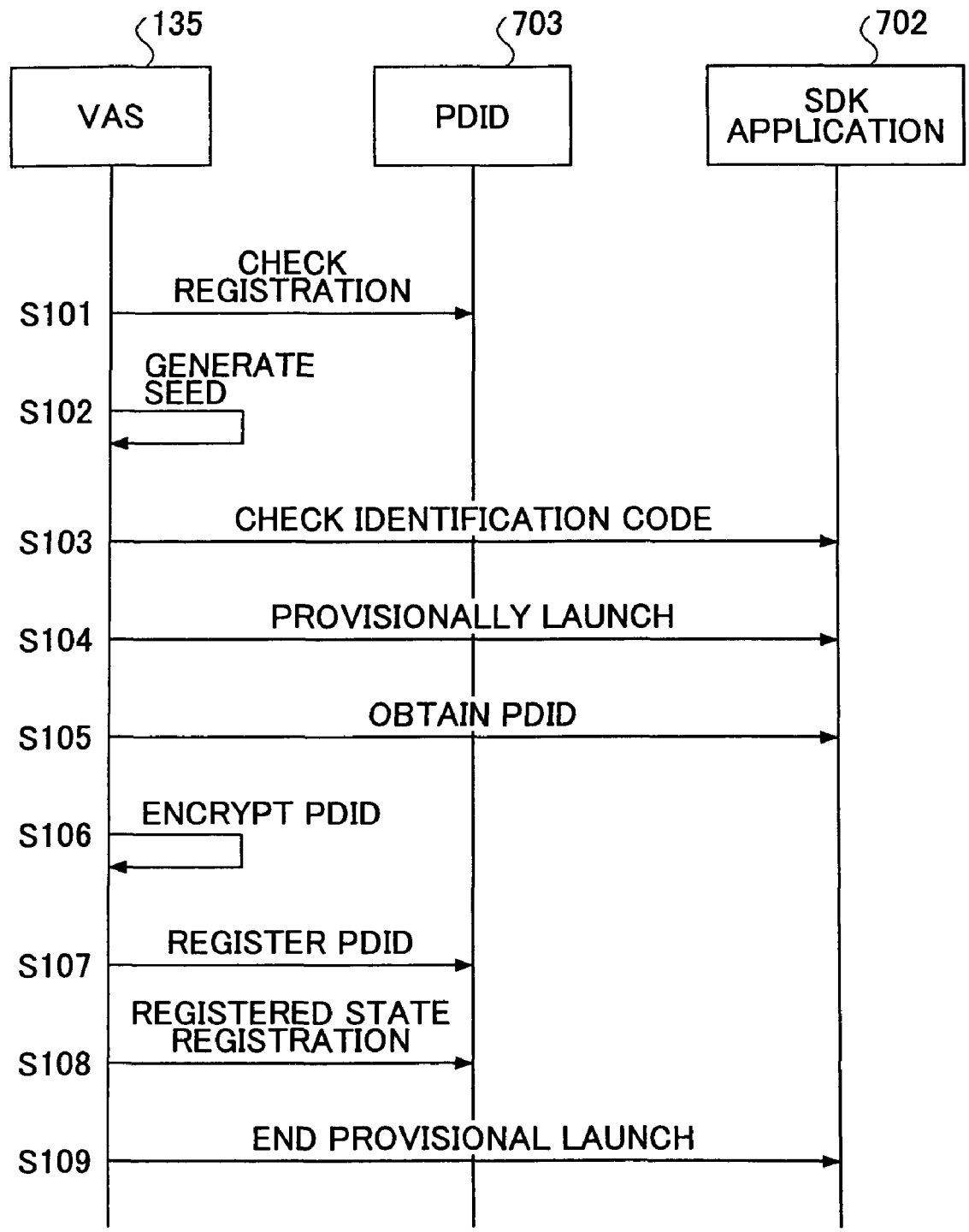
FIG. 20 is a sequence diagram for explaining a PDID registration process.

In the following, details of the PDID registration process (step 15) are described with reference to FIG. 20.

As described in step 12, when the PDID file 703 exists in the SD memory card 602, the VAS 135 checks whether the PDID registration process has not yet been performed or has been already performed in step 101. Next, as described in step 14, the VAS 135 generates a seed in step 102. The before mentioned conditional branch processes in steps 11 and 13 are also performed as described.

Next, the VAS 135 checks the identification code stored in the SDK application file 702 in step 103. The VAS 135 determines whether a file is the SDK application file 702 by determining whether the file stores the identification code. As to a file that does not include the identification code, the PDID registration process and the application validity determination process are not performed.

Next, the VAS 135 provisionally launches the SDK application stored in the SDK application file 702 in step 104. Accordingly, the VAS 135 obtains the PDID of the SDK application from the SDK application in step 105. Next, as described in step 15, the VAS 135 encrypts the PDID with the seed in step 106 and registers the encrypted PDID in the PDID file 703 in step 107. Next, as described in step 16, the VAS 135 registers information indicating that the PDID registration process has been performed as the registration checking data in the PDID file 703 in step 108. Then, the VAS 135 ends the provisional launch of the SDK application in step 109.

Figure 21:
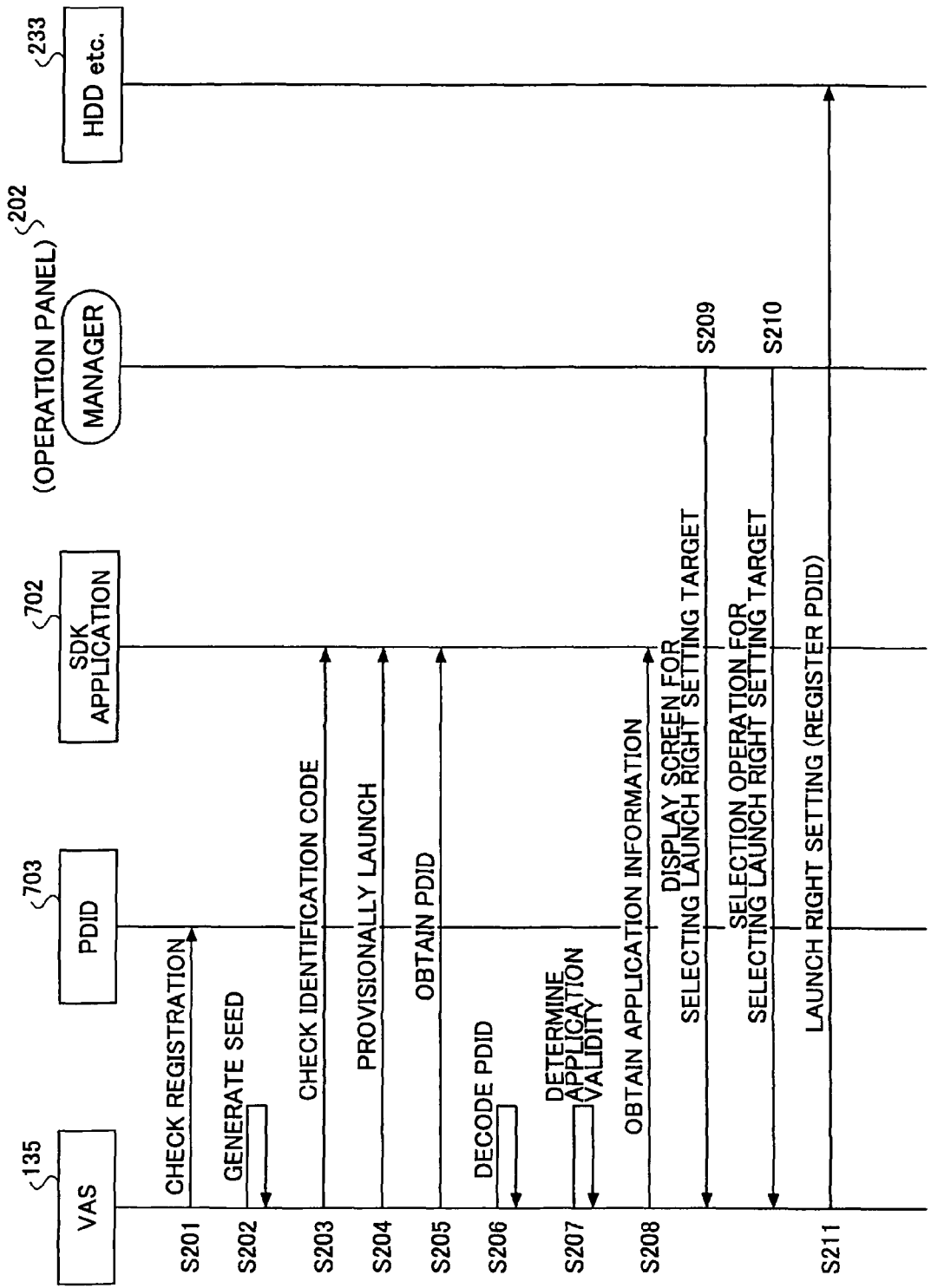
FIG. 21 is a sequence diagram for explaining an application validity determination process.

In the following, details of the application validity determination process (step 17) are described with reference to a sequence diagram of FIG. 21.

As described in step 12, when the PDID file 703 exists in the SD memory card 602, the VAS 135 checks whether the PDID registration process has not been performed or has been performed in step 201. Next, as described in step 14, the VAS 135 generates a seed in step 202. The before mentioned conditional branch processes in steps 11 and 13 are also performed as described.

Next, the VAS 135 checks the identification code stored in the SDK application file 702 in step 203. The VAS 135 determines whether a file is the SDK application file 702 by determining whether the file stores the identification code. As to a file that does not include the identification code, the PDID registration process and the application validity determination process are not performed.

Next, the VAS 135 provisionally launches the SDK application stored in the SDK application file 702 in step 204. Accordingly, the VAS 135 obtains the PDID of the SDK application from the SDK application in step 205. Next, as described in step 17, the VAS 135 decodes the PDID registered in the PDID file 703 in step 206, and determines validity of the SDK application by comparing the PDID obtained in step 205 and the PDID obtained in step 206 in step 207.

Next, the VAS 135 obtains application information of the SDK application from the SDK application that has been determined to be valid in step 208. At this time, a manager of the compound machine 101 can operate the compound machine 101 to display a selection screen on the operation panel 202 for selecting a SDK application to which a launch right is to be set among SDK applications determined to be valid in step 209. The manager of the compound machine 101 can select a target SDK application by operating the operation panel in step 210. Then, the VAS 135 registers the PDID of the selected SDK application in the HDD 233 (or a nonvolatile memory (flash memory and the like)) so that launching right of the SDK application can be set in step 211. When a launch right is set in a SDK application in the SD memory card inserted in the SD memory card slot 601, the compound machine 101 launches the SD application from the SD memory card 602 in which the SDK application is loaded in the MEM-P 231 or the MEM-C 232.

(4) Fourth Example

Figure 22:
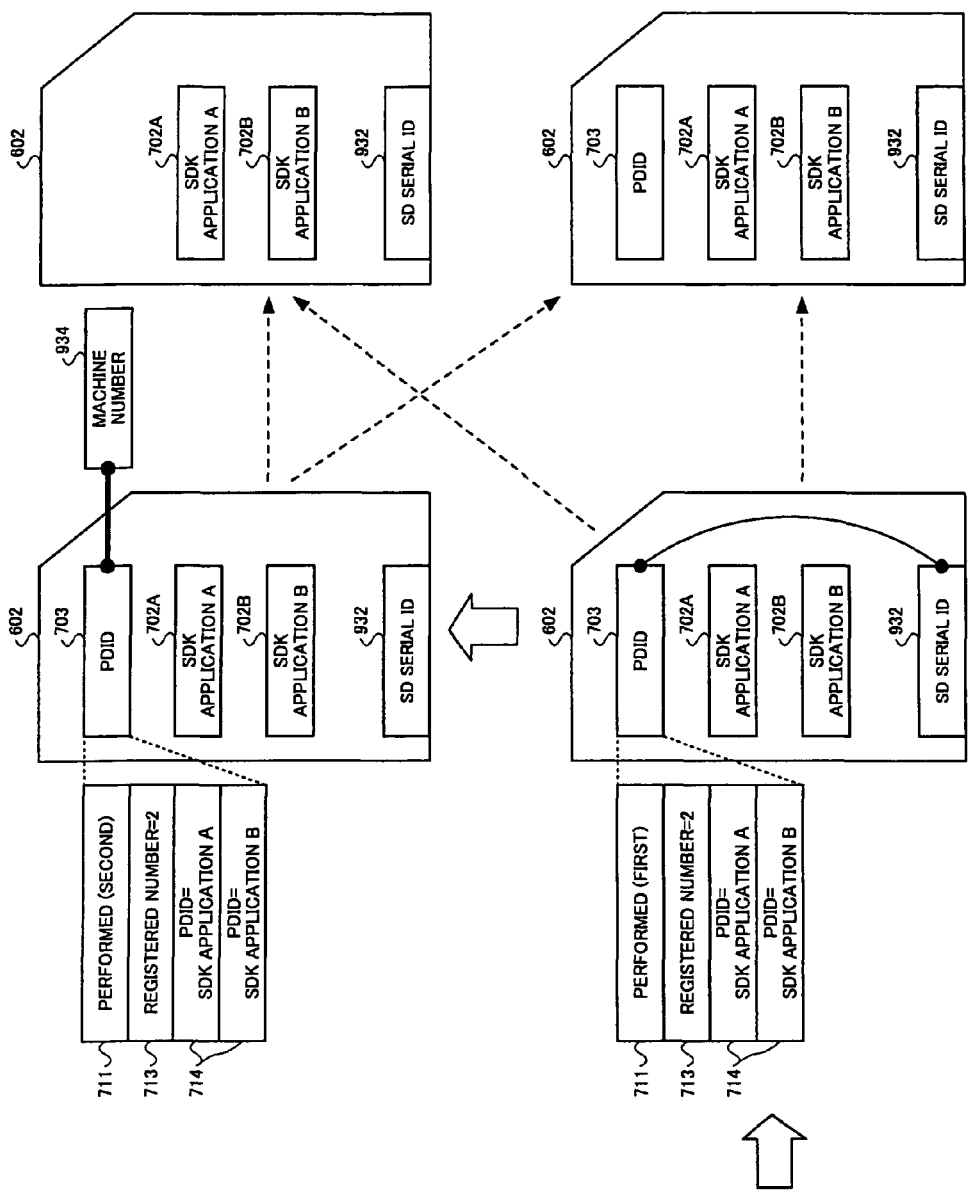

In this example, with reference to FIGS. 22A-22E2, an example of a business model is described in which a vendor instead of a maker develops a SDK application, and distributes the SD memory card to a user, so that the user inputs the SDK application into the compound machine 101 by using the SD memory card 602.

The SD memory card 602 shown in FIG. 22A is a SD memory card on the market.

Two SDK applications (SDK application file A 702A and SDK application file B 702B) and a PDID file 703 are stored by the vendor of the compound machine 101 in each of the SD memory card 602 shown in FIGS. 22B, 22C and 22D. As to the SD memory card 602 of FIG. 22B, the PDID registration process has not yet been performed. As to the SD memory card 602 of FIG. 22C, a first PDID registration process (PDID registration process by using SD seed) has been performed. As to the SD memory card 602 of FIG. 22D, a second PDID registration process (PDID registration process by using machine seed) has been performed.

As mentioned later, the PDID registration process includes the first PDID registration process and the second PDID registration process, and the PDID registration process can be performed by the compound machine 101. The PDID registration process may be performed by a compound machine 101 at a location of the vendor of the compound machine 101 or may be performed by a compound machine 101 at a location of a user of the compound machine 101. In this example, the first PDID registration process is performed by the compound machine 101 at the location of the vendor, and the second PDID registration process is performed by the compound machine 101 at the location of the user. Therefore, the SD memory cord distributed by the vendor to the user is one shown in FIG. 22C.

The SDK application file 702 is one developed by the vendor of the compound machine 101, and the PDID file 703 shown in FIG. 22B is one provided from the maker of the compound machine 101 to the vendor. In the PDID file 703 shown in FIGS. 22C and 22D, the PDID values of the SDK applications are registered.

The SD memory cards 602 shown in FIGS. 22E1 and 22E2 are described later.

In the same way as the first example, the SDK application file 702 is a file storing the SDK application. The PDID file 703 is a file for storing a PDID (product ID) of the SDK application, wherein the PDID is an ID (identification information) of the SDK application. The SD memory card 602 is configured such that the vendor can write a PDID file 703 (provided from the maker to the vendor) into the SD memory card 602. In this example of the business model, the first PDID registration process is performed by the compound machine 101 at the location of the vendor, and the second PDID registration process is performed by the compound machine 101 at the location of the user.

For storing the PDID in the PDID file 703, the PDID is encrypted by using a key (seed) specific to the SD memory card 602 in the first PDID registration process, and the encrypted PDID is registered. In addition, the PDID is encrypted by using a key (seed) specific to the body of the compound machine 101 in the second PDID registration process, and the encrypted PDID is registered. In the following, a seed specific to the SD memory card 602 is referred to as "SD seed" and a seed specific to the compound machine 101 is referred to as "machine seed". The SD seed (encryption data) is a key generated by using a SD serial ID of the SD memory card 602. For example, the key is a checksum (8 bits) of the SD serial ID. The key is used not only for encryption but also for decryption. The machine seed (encryption data) is a key generated by using a machine number of the compound machine 101. For example, the key is a checksum (8 bits) of the machine number. The key is used not only for encryption but also for decryption. Instead of the machine number of the compound machine 101, other information specific to the body of the compound machine 101 can be used such as a MAC address or an IP address of the compound machine 101. Encryption is performed by performing EOR (exclusive OR) operation on the PDID and the key in units of byte. As mentioned above, by encrypting the PDID of the SDK application with a key, tampering of the PDID file 703 can be prevented. Further, by encrypting the PDID of the SDK application with a key specific to the SD memory card 602, unauthorized copy of the PDID file 703 can be prevented. Further, by encrypting the PDID of the SDK application with a key specific to each compound machine 101, it is restricted to use the SD memory card in another compound machine that may be the same model of the compound machine 101 or may be a relating model of the compound machine 101. The above-mentioned configuration can be adopted also to image forming apparatuses (information processing apparatuses) copiers, printers, scanners and facsimiles.

For example, as shown in FIG. 22E1, if all files in a first SD memory card on which the PDID registration process has been performed are copied to a second SD memory card, the second SD memory card is determined to be invalid in the application validity determination process since the SD serial IDs are deferent between the first SD memory card and the second SD memory card so that the keys are different. Therefore, it is prevented to use the second SD memory card in any compound machine 101.

In addition, for example, as shown in FIG. 22E2, if only SDK application files 702 in a first SD memory card 602 on which the PDID registration process has been performed are copied to a second SD memory card 602, the application validity determination process is not performed for the second SD memory card since the second SD memory card does not include the PDID file 703. Thus, it is restricted to use the second SD memory card in any compound machine 101.

Like the first example, the PDID file 703 includes registration checking data 711, a registered application number 713 and the PDID 714.

The registration checking data 711 is used by the compound machine 101 for checking whether the PDID registration process has not been performed or has been performed to the first PDID registration process or to the second PDID registration process. The registration checking data 711 in the PDID file 703 of FIG. 22B indicates "not-yet-performed", and the registration checking data 711 in the PDID file 703 of FIG. 22C indicates "performed (first)", and the registration checking data 711 in the PDID file 703 of FIG. 22D indicates "performed (second)".

In the following, examples of the PDID registration process and the application validity determination process are described.

Figure 23:
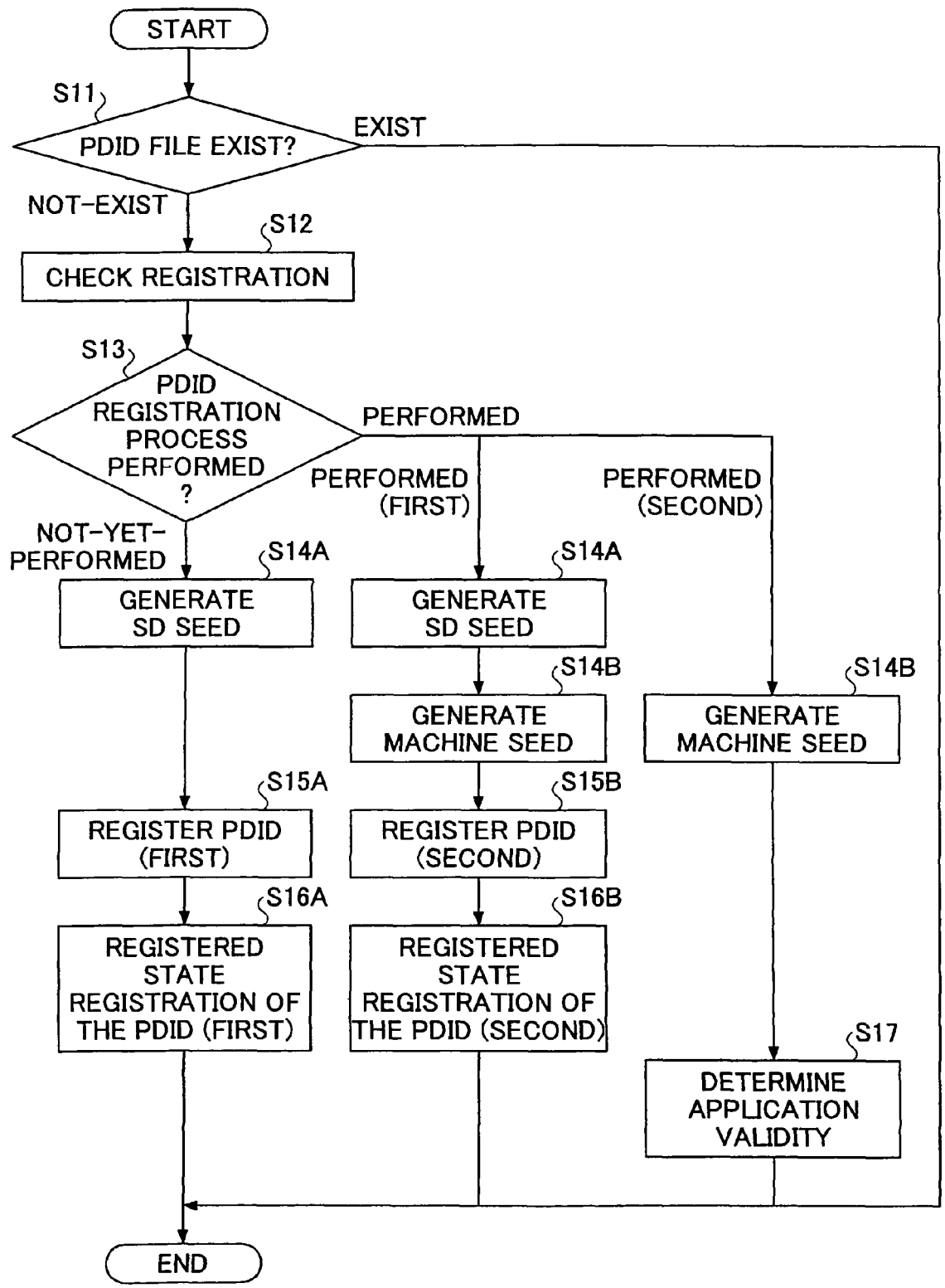
FIG. 23 shows a flowchart of processes performed by the VAS.
Figure 24:
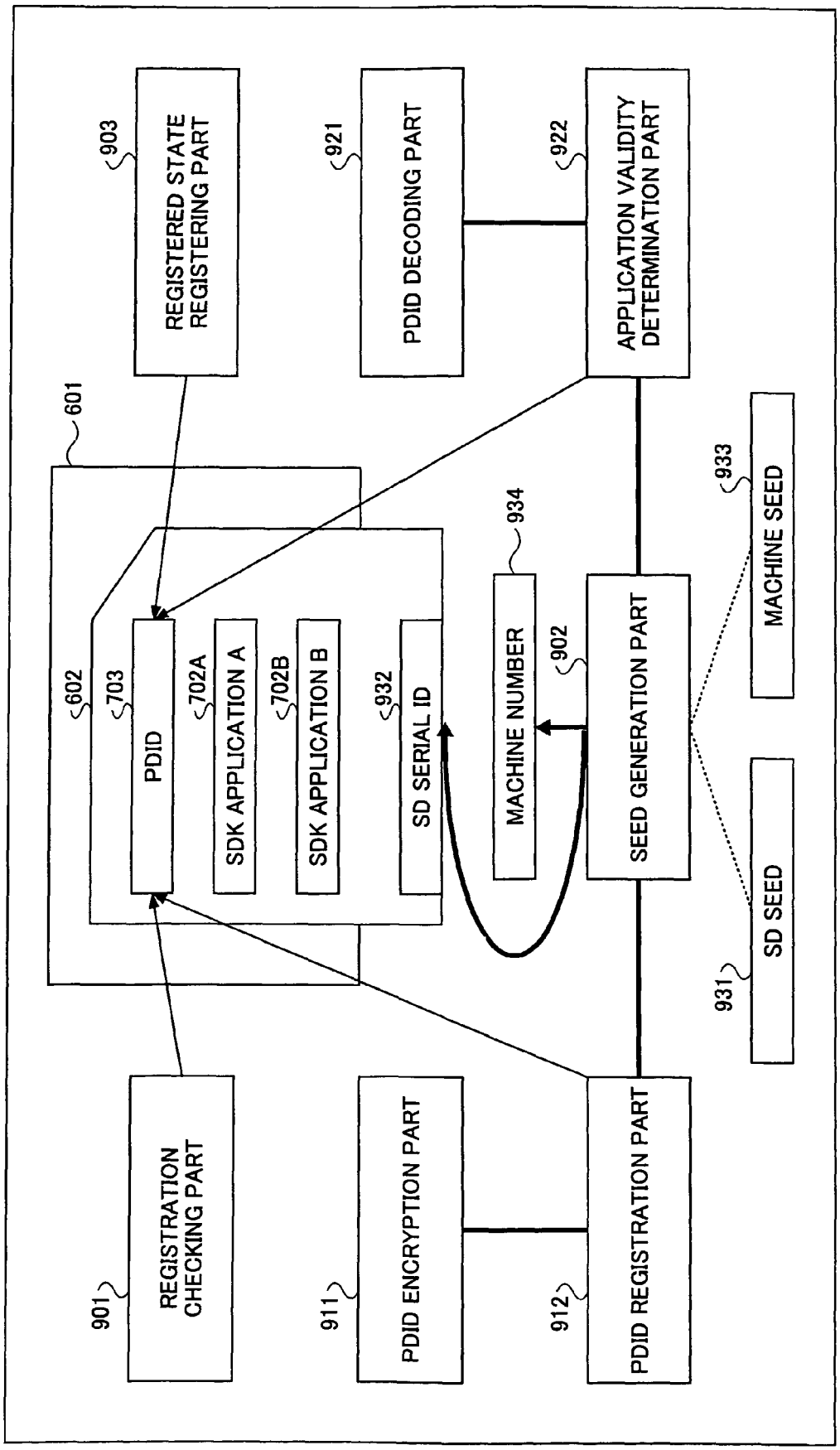
FIG. 24 is a functional block diagram of functions realized by the VAS.

These processes are performed by the VAS 135. FIG. 23 shows a flowchart of the processes performed by the VAS 135. FIG. 24 is a functional block diagram of functions realized by the VAS 135. As shown in FIG. 24, the compound machine 101 includes a registration checking part 901, a seed generation part 902, a registered state registering part 903, a PDID encryption part 911, a PDID registration part 912, a PDID decoding part 921 and an application validity determination part 922.

In a state where the SD memory card 601 is inserted in the SD memory card slot 601 in the compound machine 101, when the power of the compound machine 101 is turned on, the process of FIG. 23 is performed by the VAS 135.

First, the VAS 135 checks whether the PDID file 703 exists in the SD memory card 602 in step 11. When the PDID file 703 exists in the SD memory card 602, the process goes to step 12. When the PDID file 703 does not exist in the SD memory card 602, the PDID registration process or the application validity determination process is not performed so that the whole process of FIG. 23 ends.

Next, the registration checking part 901 checks whether the PDID registration process has not been performed or has been performed to the first PDID registration process or to the second PDID registration process on the basis of the registration checking data 711 in the PDID file 703 in the SD memory card 602 in step 12. When it is determined that the PDID registration process has not been performed in step 13, the seed generation process (step 14A), the first PDID registration process (step 15A) and a first registered state registering process (step 16A) will be performed in this order. When it is determined that the PDID registration process has been performed to the first PDID registration process, the seed generation process (step 14A), a machine seed generation process (step 14B), the second PDID registration process (step 15B) and a second registered state registering process (step 16B) are performed in this order. When it is determined that the PDID registration process has been performed to the second PDID registration process, the seed generation process (step 14A) and the application validity determination process (step 17) will be performed in this order. In this example of the business model, the steps 14A, 15A and 16A are performed in the compound machine 101 at the location of the vendor, and the steps 14A, 14B, 15B and 16B are performed in the compound machine 101 at the location of the user. The steps 14B and 17 are also performed in the compound machine 101 at the location of the user.

The seed generation process (step 14A) is described in the following.

After step 13, the seed generation part 902 generates a key (SD seed) specific to the SD memory card 602. The key is generated by using the SD serial ID of the SD memory card 602. For example, the key is a checksum (8 bits) of the SD serial ID. The key is for encrypting and for decoding. In this example, the seed generation part 902 generates the SD seed 931 by using the SD serial ID 932.

In the following machine seed generation process (step 14B) is described. After step 13, the seed generation part 902 generates a key (machine seed) specific to the compound machine 101. The key is generated by using the machine number of the compound machine. For example, the key is a checksum (8 bits) of the machine number. The key is for encrypting and for decoding. As mentioned before, instead of the machine number, the MAC address or the IP address of the compound machine 101 can be used. In this example, the seed generation part 902 generates the machine seed 933 by using the machine number 934.

The first PDID registration process (step 15A) is described in the following. Subsequent to step 14A, the PDID registration part 912 registers an PDID of the SDK application stored in the SDK application file 702 into the PDID file 703 in the SD memory card 602. The PDID of the SDK application is encrypted by the PDID encryption part 911 with the seed 931 generated by the seed generation part 902. The encrypted PDID is registered in the PDID file 703 by using the PDID registration part 912.

The second PDID registration process (step 15B) is described in the following. Subsequent to steps 14A and 14B, the PDID registration part 912 registers an PDID of the SDK application stored in the SDK application file 702 into the PDID file 703 in the SD memory card 602. The PDID of the SDK application stored in the SDK application file 702 is encrypted by the PDID encryption part 911 with the machine seed 933 generated by the seed generation part 902. The encrypted PDID is registered in the PDID file 703 by using the PDID registration part 912.

In the following, the first registered state registering process (step 16A) is described. After step 15A, the registered state registering part 903 registers, as the registration checking data 711 in the PDID file 703 in the SD memory card 602, information indicating that the first PDID registration process has been performed for the SD memory card 602. In this way, when the registration checking data 711 in the PDID file 703 changes from "not-yet-performed" to "performed (first)", the first PDID registration process will not be performed at a next power-on of the compound machine 101, but the second PDID registration process (step 15B) will be performed.

In the following, the second registered state registering process (step 16A) is described. After step 15B, the registered state registering part 903 registers, as the registration checking data 711 in the PDID file 703 in the SD memory card 602, information indicating that the second PDID registration process has been performed for the SD memory card 602. In this way, when the registration checking data 711 in the PDID file 703 changes from "performed (first)" to "performed (second)", the first and second PDID registration processes will not be performed at a next power-on of the compound machine 101.

In the following, the application validity determination process (step 17) is described. After the step 14B, the application validity determination part 922 determines the validity of the SDK application stored in the SDK application file 702 by determining whether the PDID of the SDK application is registered in the PDID file 703 in the SD memory card 602. Since the PDID of the SDK application in the PDID file 703 is encrypted with the machine seed (key) 933, the encrypted PDID is to be decoded with the machine seed 933 by the PDID decoding part 921.

Figure 25:
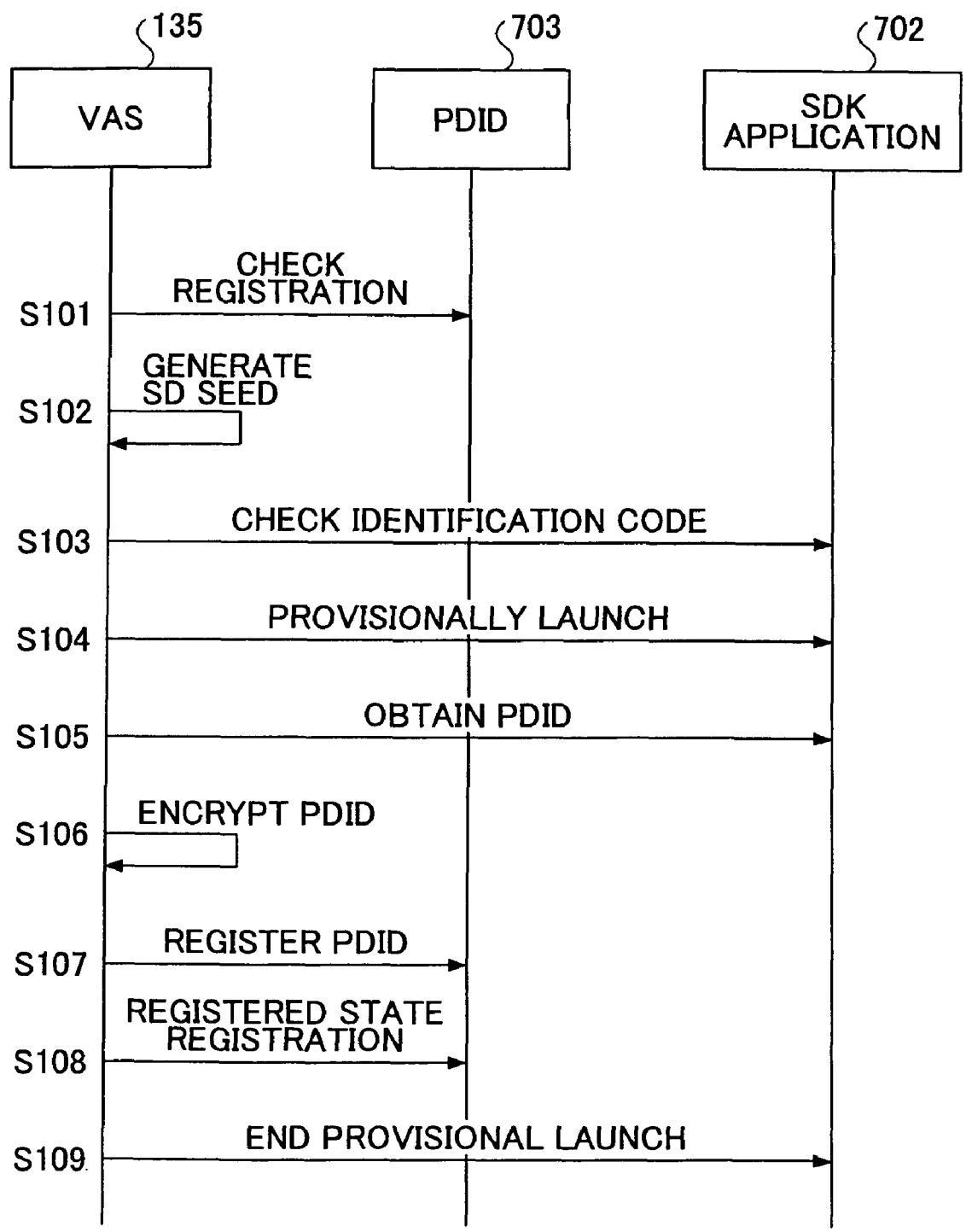
FIG. 25 is a sequence diagram for explaining a PDID registration process.

In the following, details of the first PDID registration process (step 15A) are described with reference to a sequence diagram of FIG. 25.

As described in step 12, when the PDID file 703 exists in the SD memory card 602, the VAS 135 checks whether the PDID registration process has not been performed or has been performed to the first PDID registration process or to the second PDID registration process in step 101. Next, as described in step 14A, the VAS 135 generates the SD seed in step 102. The before mentioned conditional branch processes in steps 11 and 13 are also performed as described.

Next, the VAS 135 checks the identification code stored in the SDK application file 702 in step 103. The VAS 135 determines whether a file is the SDK application file 702 by determining whether the file stores the identification code. As to a file that does not include the identification code, the PDID registration process and the application validity determination process are not performed.

Next, the VAS 135 provisionally launches the SDK application stored in the SDK application file 702 in step 104. Accordingly, the VAS 135 obtains the PDID of the SDK application from the SDK application in step 105. Next, as described in step 15A, the VAS 135 encrypts the PDID with the SD seed in step 106 and registers the encrypted PDID in the PDID file 703 in step 107. Next, as described in step 16A, the VAS 135 registers information indicating that the first PDID registration process has been performed as the registration checking data in the PDID file 703 in step 108. Then, the VAS 135 ends the provisional launch of the SDK application in step 109.

Figure 26:
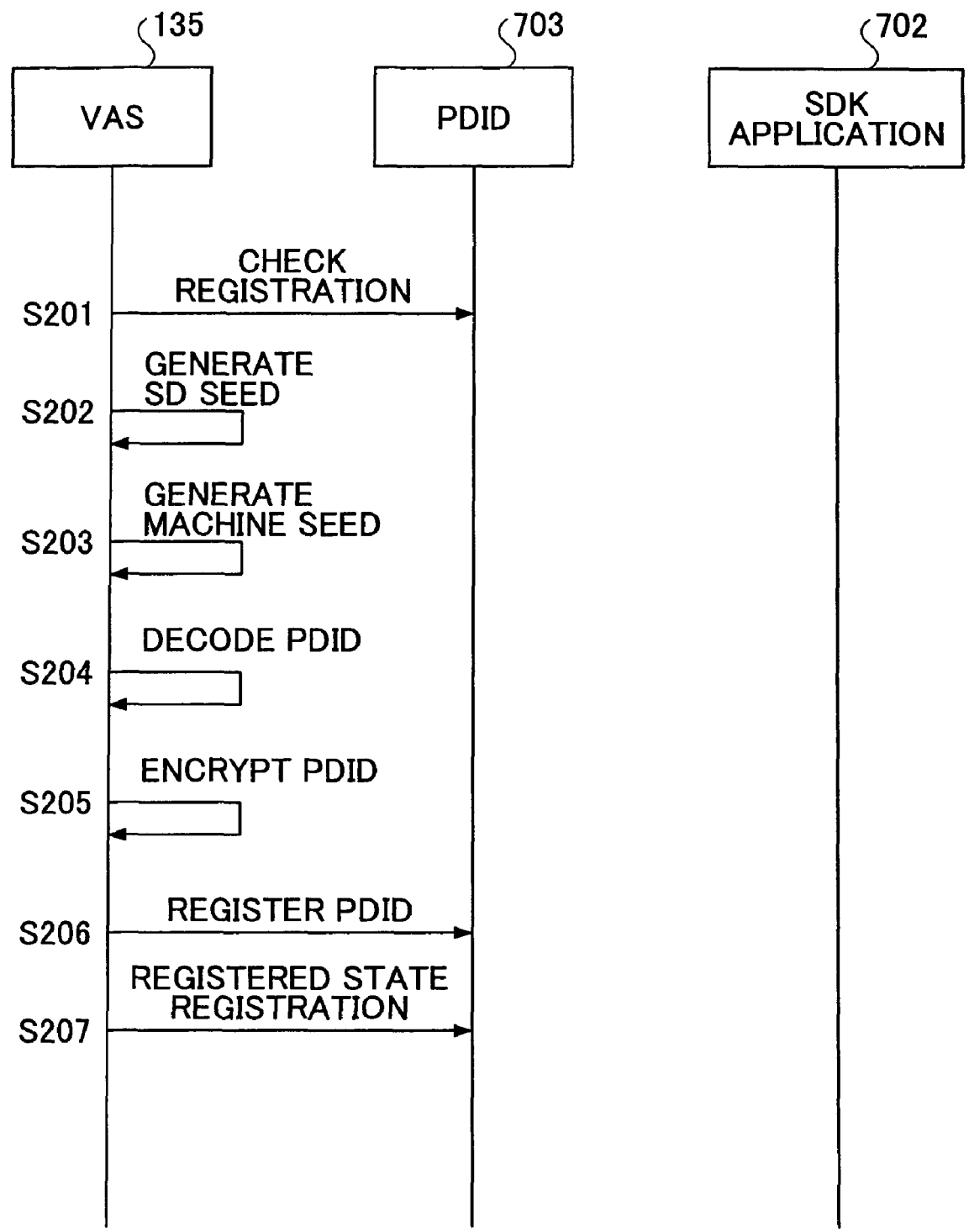
FIG. 26 is a sequence diagram for explaining a PDID registration process.

In the following, details of the second PDID registration process (step 15B) are described with reference to a sequence diagram of FIG. 26.

When the PDID file 703 exists in the SD memory card 602, the VAS 135 checks whether the PDID registration process has not been performed or has been performed to the first PDID registration process or to the second PDID registration process in step 201. Next, as described in steps 14A and 14B, the VAS 135 generates the SD seed in step 202, and the VAS 135 generates the machine seed in step 203. The before mentioned conditional branch processes in steps 11 and 13 are also performed as described.

Next, the VAS 135 (PDID decoding part 921) decodes the PDID encrypted by the SD seed with the SD seed in step 204. Accordingly, the VAS 135 obtains the PDID of the SDK application stored in the SDK application file 703. Next, as described in step 15B, the VAS 135 (PDID encryption part 921 and PDID registration part 922) encrypts the PDID with the machine seed in step 205, and registers the encrypted PDID in the PDID file 703 in step 206. Next, as described in step 16B, the VAS 135 (registered state registering part 903) registers information indicating that the second PDID registration process has been performed as the registration checking data 711 in the PDID file 703 in step 207.

In the following, details of the application validity determination process (step 17) are described with reference to a sequence diagram of FIG. 27.

As described in step 12, when the PDID file 703 exists in the SD memory card 602, the VAS 135 checks whether the PDID registration process has not been performed or has been performed to the first PDID registration process or to the second PDID registration process in step 301. Next, as described in step 14B, the VAS 135 generates the machine seed in step 302. The before mentioned conditional branch processes in steps 11 and 13 are also performed as described.

Next, the VAS 135 checks the identification code stored in the SDK application file 702 in step 303. The VAS 135 determines whether a file is the SDK application file 702 by determining whether the file stores the identification code. As to a file that does not include the identification code, the PDID registration process and the application validity determination process are not performed.

Next, the VAS 135 provisionally launches the SDK application stored in the SDK application file 702 in step 304. Accordingly, the VAS 135 obtains the PDID of the SDK application from the SDK application in step 305. Next, as described in step 17, the VAS 135 decodes the PDID registered in the PDID file 703 with the machine seed in step 306, and determines validity of the SDK application by comparing the PDID obtained in step 305 and the PDID obtained in step 306 in step 307.

Next, the VAS 135 obtains application information of the SDK application from the SDK application that has been determined to be valid in step 308. At this time, a manager of the compound machine 101 can operate the compound machine 101 to display a selection screen on the operation panel 202 for selecting a SDK application to which a launch right is to be set among SDK applications determined to be valid in step 309. The manager of the compound machine 101 can select a target SDK application by operating the operation panel in step 310. Then, the VAS 135 registers the PDID of the selected SDK application in the HDD 233 (or a nonvolatile memory (flash memory and the like)) so that launching right of the SDK application can be set in step 311. If a launch right is set in a SDK application in the SD memory card inserted in the SD memory card slot 601, the compound machine 101 launches the SD application from the SD memory card 602 in which the SDK application is loaded in the MEM-P 231 or the MEM-C 232.

(5) Fifth Example

In this example, a usage example is described in which a SDK application is added (stored) to the HDD 233 mounted in the compound machine 101 with reference to FIGS. 28A-28C. In other words, in this example, the HDD 233 is used as an adding destination (storing destination) of the SDK application.

FIG. 28A shows the HDD 233 before the SDK application is added. The HDD 233 shown in FIG. 28A stores the PDID file 703.

FIG. 28B shows the HDD 233 after the SDK applications are added. As shown in FIG. 28B, two SDK application files (SDK application file A 702A and SDK application file B 702B) are added to the HDD 233 of FIG. 28A. That is, the HDD 233 of FIG. 28B includes the two SDK application files 702 and the PDID file 703.

The HDD 233 shown in FIG. 28C is one on which the PDID registration process has been performed by the compound machine 101. In the HDD 233 of FIG. 28C, the PDIDs of the SDK applications are registered in the PDID file 703 in the HDD 233.

The SDK application file 702 is a file storing a SDK application. As mentioned before, the SDK application is an application (131) generated by a dedicated SDK (software developing kit). In this example, the SDK application file 702 is added to the HDD 233 by using a memory card 235 such as a SD memory card storing the SDK application file 702, wherein the memory card is inserted in a memory card slot 234. The SDK application file 702 is an executable file of the SDK application.

The SDK application file 702 includes an identification code used by the compound machine 101 to identify the SDK application file 702 is a SDK application file. The identification code is stored in a predetermined area in the SDK application file 702, for example, the identification code is stored in first several bytes of the file. The compound machine 101 identifies the SDK application file 702 by checking if the file includes the identification code.

The PDID file 703 is a file for storing a PDID (product ID) of a SDK application, wherein the PDID is an ID (identification information) of the SDK application. More specifically, the PDID file 703 is a file for registering the PDID of the SDK application stored in the SDK application file in the HDD 233. The compound machine 101 performs a PDID registration process for registering the PDID in the PDID file 703 in the HDD 233. In addition, the compound machine 101 performs an application validity determination process for determining the validity of the SDK application in the SDK application file 702 by checking if the PDID of the SDK application is registered in the PDID file 703 in the HDD 233. If the SDK application is determined to be valid by the application validity determination process, the compound machine 101 performs a launch process and a launch right setting process for the SDK application. The PDID of the SDK application stored in the SDK application file 702 can be obtained from the SDK application file 702.

For storing the PDID in the PDID file 703, the PDID is encrypted by using a key (seed) specific to the compound machine 101. In this example, the key (encryption data) is generated by using a machine number of the compound machine 101. For example, the key is a checksum (8 bits) of the machine number. As mentioned before, instead of the machine number, the MAC address or the IP address can be used. In addition, the key is used not only for encryption but also for decryption. Encryption for the PDID is performed by performing EOR (exclusive OR) operation for the PDID and the key in units of byte. As mentioned above, by encrypting the PDID of the SDK application with a key, tampering of the PDID file 703 can be prevented. Further, by encrypting the PDID of the SDK application with a key specific to the compound machine 101, it is restricted from using the HDD 233 in another compound machine that may be the same model of the compound machine 101 or may be a related model of the compound machine 101. The same configuration can be also adopted for an image forming apparatus (information processing apparatus) other than the compound machine such as a copier, a printer, a scanner, a facsimile and the like. In the same way as the first example and the third example, the PDID may be encrypted by a key (seed) specific to the HDD 233.

The PDID file 703 includes a maximum application number 712, a registered application number 713 and the PDID 714.

The maximum application number 712 is a maximum number (upper limit) of PDIDs that can be registered in the PDID file 703. That is, the maximum application number 712 is a maximum number (upper limit) of SDK applications (SDK application files 702) that can be validly written in the HDD 233. In this example, the maximum application number 712 in the PDID file 703 shown in FIGS. 28A-28C is 2. The maximum application number 712 is encrypted by the seed (key) and stored.

The registered application number 713 is a number of PDIDs registered in the PDID file 703. That is, the registered application number 713 is a number of valid SDK applications written in the HDD 233. In the PDID registration process, the compound machine 101 registers a number of PDIDs registered in the PDID file 703 as the registered application number 713. The registered application number 713 in the PDID file 703 in FIGS. 28B and 28C is 0, and the registered application number 713 in the PDID file 703 in FIG. 28C is 2. The registered application number 713 is encrypted by the seed (key) and is registered. A status in which the registered application number 713 is 0 is called "initial state", and a status in which the registered application number 713 is other than 0 is called "registered state".

The PDID 714 is a registration field for registering a PDID (product ID) of the SDK application. More specifically, the PDID 714 is a registration field for registering a PDID (product ID) of the SDK application stored in the SDK application file 702 in the HDD 233. Any PDID is not yet registered in the PDID 714 shown in FIGS. 28A and 28B. In the PDID 714 in FIG. 28C, PDIDs of SDK applications (PDID of the SDK application A stored in the SDK application file A 702 A and PDID of the SDK application B stored in the SDK application file B 702 B) are registered. In the PDID 714 in the PDID file in the PDID file 703 in FIGS. 28A and 28A stores dummy IDs instead of the PDIDs wherein the data amount of the dummy ID is the same as that of the PDID. When a PDID is stored in the PDID file 703, the dummy ID is replaced by the PDID. By adopting this configuration, it can be prevented that the existence of the PDID registration process is detected due to a difference between data amounts before storing the PDID and after storing the PDID. The PDID registered in the PDID 714 is encrypted by the seed (key) as mentioned before.

In the following, examples of the PDID registration process and the application validity determination process are described.

Figure 29:
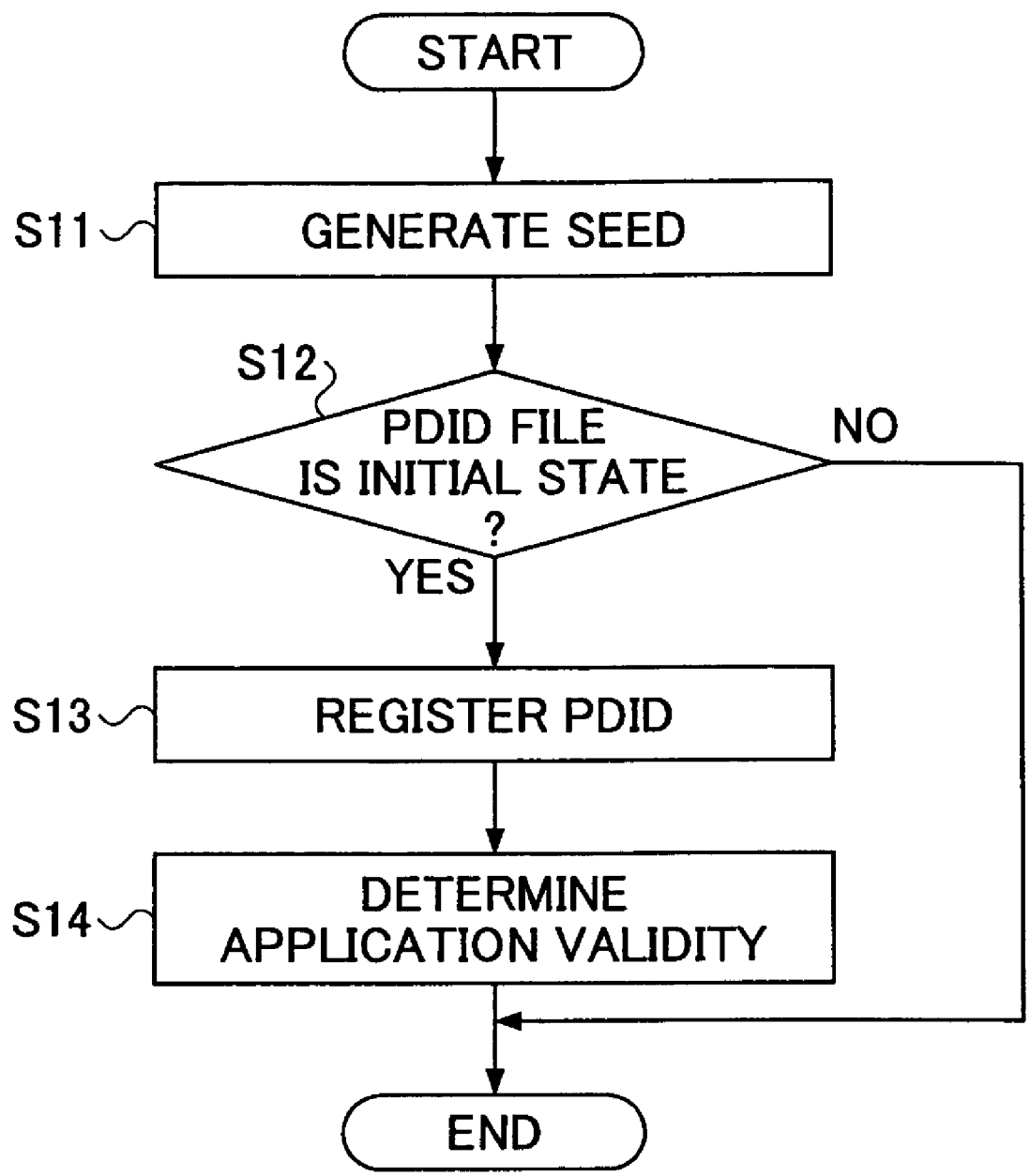
FIG. 29 shows a flowchart of processes performed by the VAS.
Figure 30:
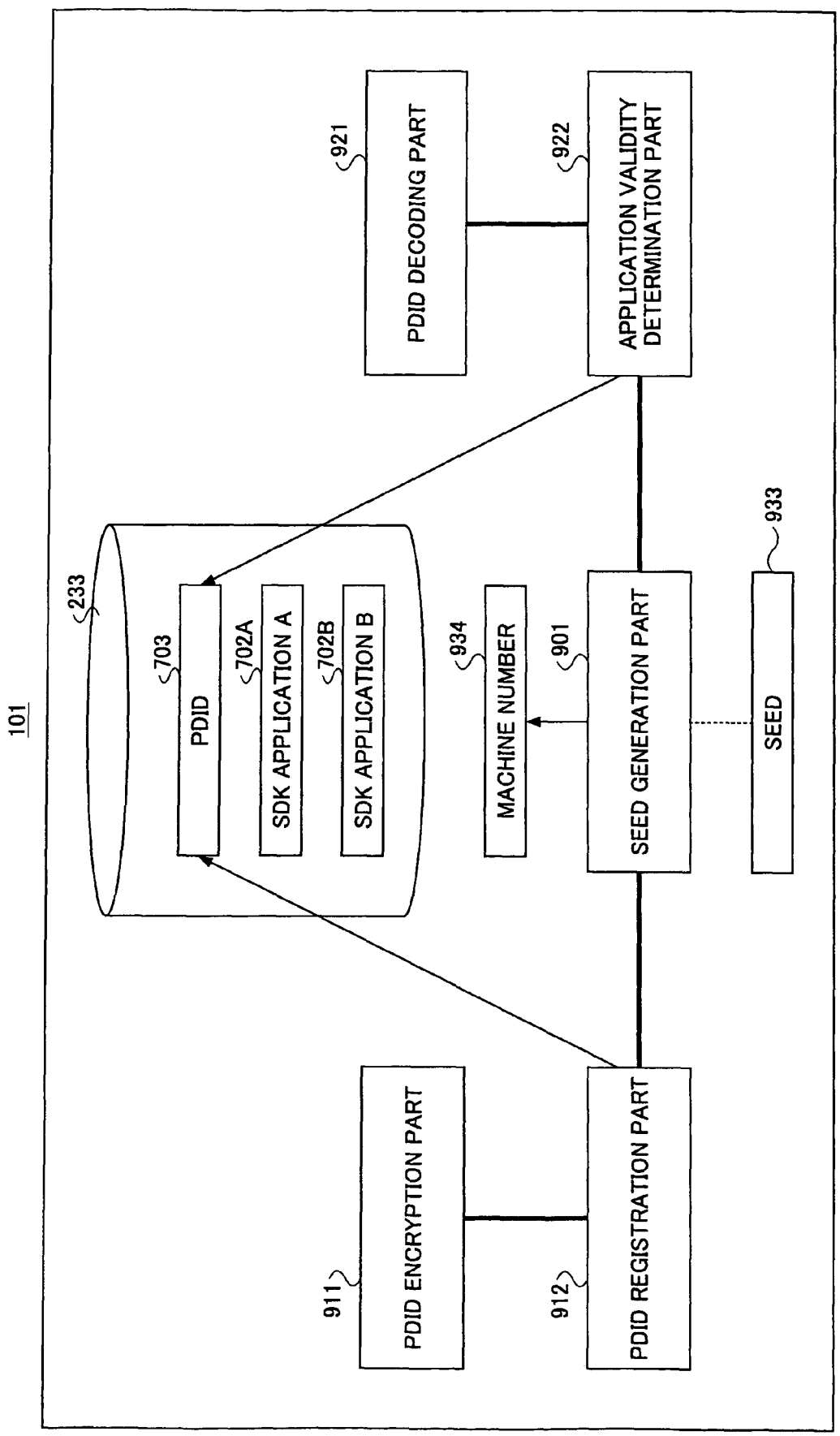
FIG. 30 is a functional block diagram of functions realized by the VAS.

These processes are performed by the VAS 135. FIG. 29 shows a flowchart of the processes performed by the VAS 135. FIG. 30 is a functional block diagram of functions realized by the VAS 135. As shown in FIG. 30, the compound machine 101 includes a seed generation part 902, a PDID encryption part 911, a PDID registration part 912, a PDID decoding part 921 and an application validity determination part 922.

In a state where the SDK application file 702 is added in the HDD 233 in the compound machine 101, when the power of the compound machine 101 is turned on, the process of FIG. 29 is performed by the VAS 135.

First, the seed generation part 902 generates a key (seed) specific to the compound machine 101 in step 11. The key is generated by using the machine number of the compound machine 101. For example, the key is a checksum (8 bits) of the machine number. The key is for encrypting and for decoding. Instead of the machine number, the MAC address or the IP address can be also used. In this example, the seed generation part 902 generates the key (seed) 933 by using the machine number 934 of the compound machine 101.

Next, the VAS 135 checks whether the PDID file 703 in the HDD 233 is in an initial state or in a registered state on the basis of the registered application number in the PDID file 703 in step 12. When it is determined that the PDID 703 is in an initial state, the PDID registration process (step 13) and the application validity determination process (step 14) are performed in this order. When it is determined that the PDID file 703 is in a registered state, the PDID registration process is not performed but the application validity determination process (step 14) is performed. Instead of performing the conditional branch based on the initial state or the registered state, the conditional branch may be based on whether the registered application number 713 is less than the maximum application number or not.

In the following the PDID registration process (step 13) is described. After the step 12, the PDID registration part 912 registers a PDID of the SDK application stored in the SDK application file 702 into the PDID file 703 in the HDD 233. The PDID of the SDK application stored in the SDK application file 702 is encrypted by the PDID encryption part 911 with the seed 933 generated by the seed generation part 902. The encrypted PDID is registered in the PDID file 703 by using the PDID registration part 912.

In the PDID registration process (step 13), the PDID registration part 912 registers a number of PDIDs in the PDID file 703 as the registered application number 713 in the PDID file 703. As mentioned above, the PDID file 703 enters the registered state from the initial state. Apparent from the step 12, the PDID registration process will not be performed at a next power-on.

In the following, the application validity determination process (step 14) is described. Next to the step 12, the application validity determination part 922 determines the validity of the SDK application stored in the SDK application file 702 by determining whether the PDID of the SDK application is registered in the PDID file 703 in the HDD 233. Since the PDID of the SDK application in the PDID file 703 is encrypted with the seed (key) 933, the encrypted PDID is to be decoded with the seed 933 by the PDID decoding part 921.

The compound machine 101 performs a launch process or a launch right setting process for the application on condition that the SDK application in the SDK application file 702 is determined to be valid by the application validity determination process. That is, it is restricted to load, into the MEM-P 231 or the MEM-C 232, a SDK application on which the application validity determination process is not performed or a SDK application that is determined to be invalid by the application validity determination process. As mentioned above, it can be prevented that data in the HDD 233 is invalidly copied and used so that a program is thereby not invalidly input into a compound machine 101.

An example of merits for performing the PDID registration process and the application validity determination process is to prevent unauthorized replacement of the SDK application file 702 in the HDD 233. For example, even if a user who bought an inexpensive SDK application file and added the application to the HDD 233 replaces the SDK application with an expensive SDK application by unauthorized copying, the user cannot use the expensive SDK application since the IDs of the applications are different so that the expensive application can not pass the application validity determination process.

The above-mentioned merit can be obtained regardless of whether the maximum application number 712 of the PDID file 703 is one or more than one.

Figure 31:
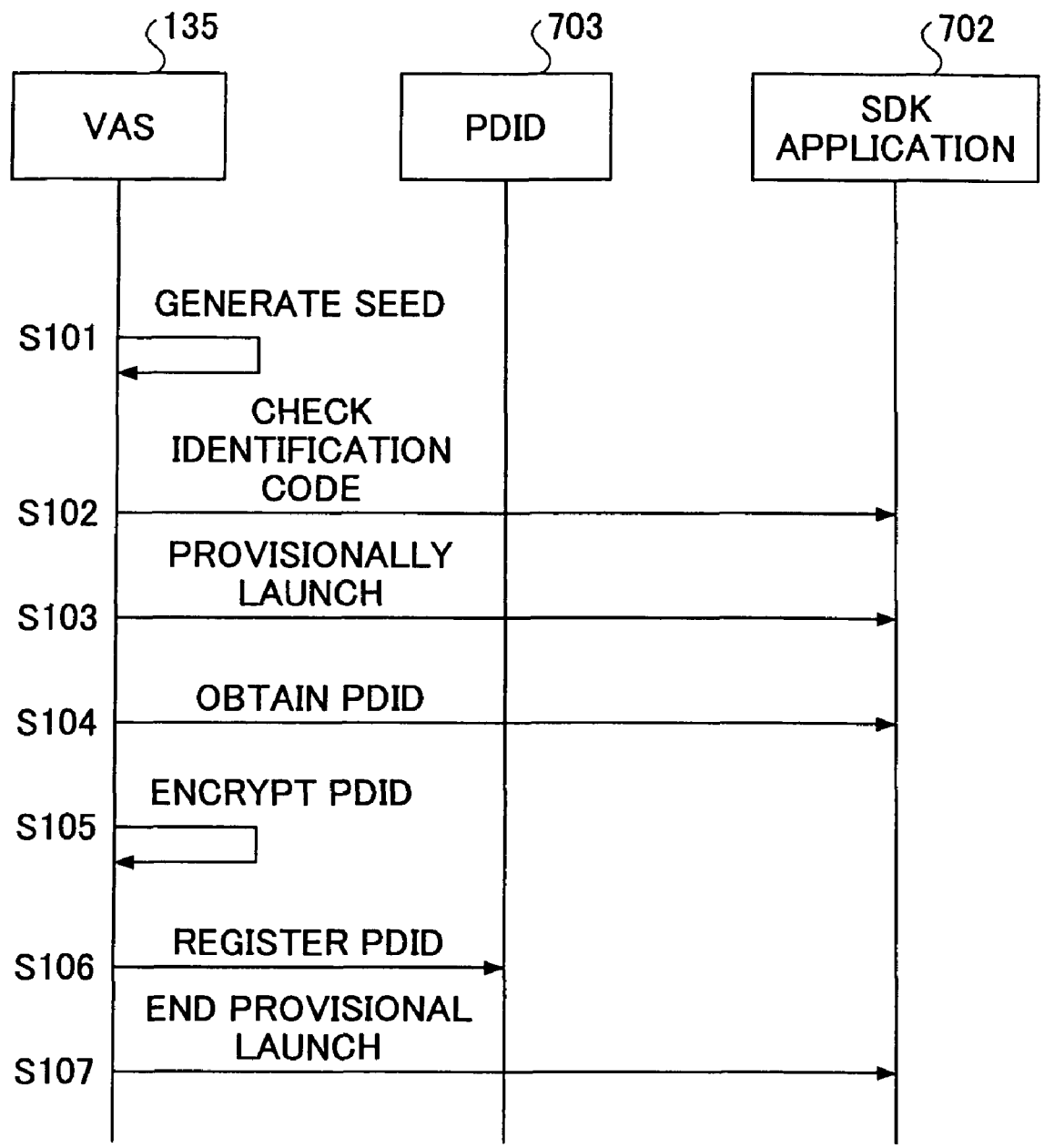
FIG. 31 is a sequence diagram for explaining a PDID registration process.

In the following, details of the PDID registration process (step 13) are described with reference to a sequence diagram of FIG. 31.

As described in step 11, the VAS 135 generates the seed in step 101. The before mentioned conditional branch process in step 12 is performed as described.

Next, the VAS 135 checks the identification code stored in the SDK application file 702 in step 102. The VAS 135 determines whether a file is the SDK application file 702 by determining whether the file stores the identification code. As to a file that does not include the identification code, the PDID registration process and the application validity determination process are not performed.

Next, the VAS 135 provisionally launches the SDK application stored in the SDK application file 702 in step 103. Accordingly, the VAS 135 obtains the PDID of the SDK application from the SDK application in step 104. Next, as described in step 13, the VAS 135 encrypts the PDID with the seed in step 105 and registers the encrypted PDID in the PDID file 703 in step 106. Then, the VAS 135 ends the provisional launch of the SDK application in step 107.

Figure 32:
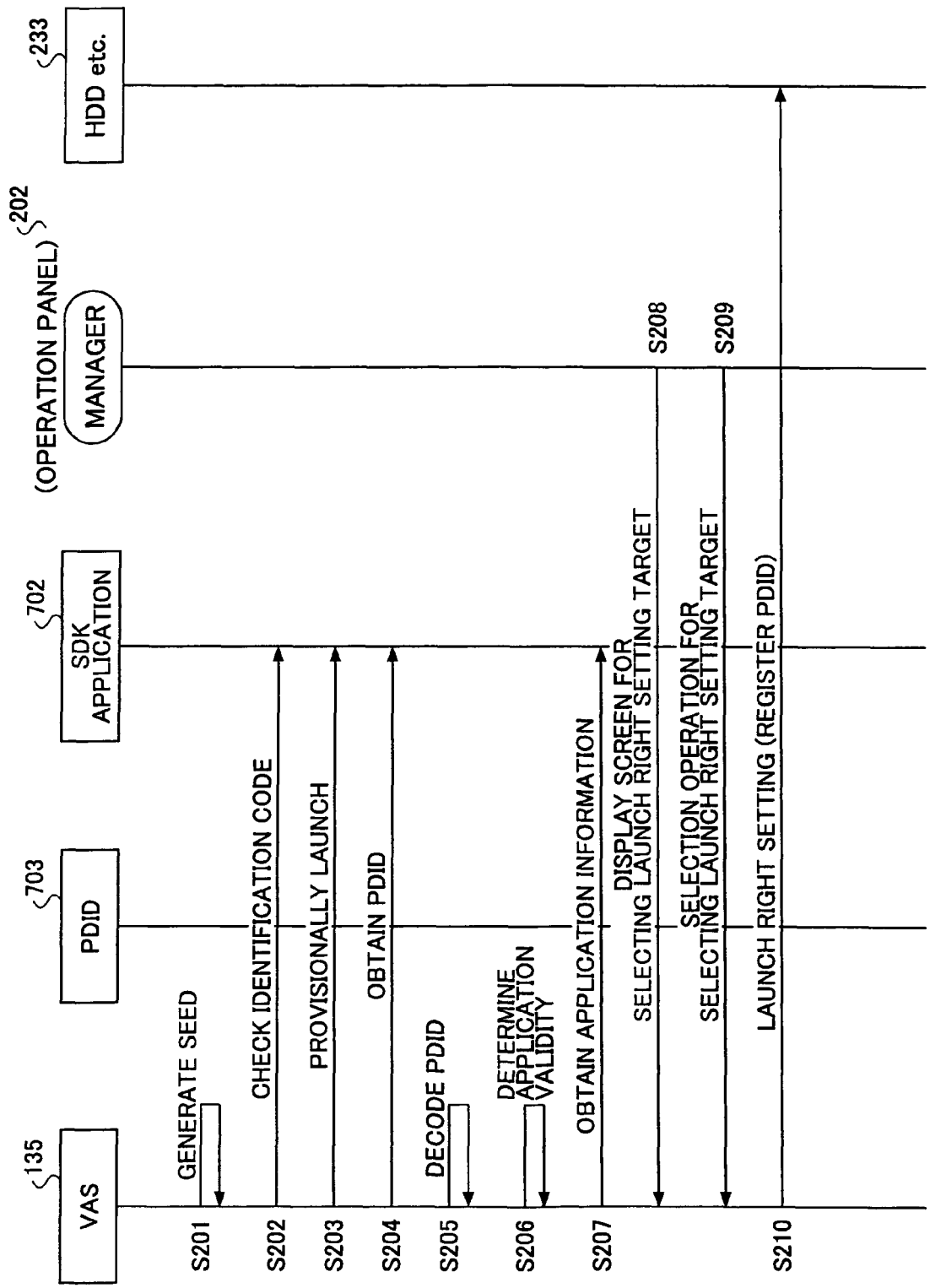
FIG. 32 is a sequence diagram for explaining an application validity determination process.

In the following, details of the application validity determination process (step 14) are described with reference to a sequence diagram of FIG. 32.

As described in step 11, the VAS 135 generates the seed in step 201. The before mentioned conditional branch process in steps 12 is also performed as described.

Next, the VAS 135 checks the identification code stored in the SDK application file 702 in step 202. The VAS 135 determines whether a file is the SDK application file 702 by determining whether the file stores the identification code. As to a file that does not include the identification code, the PDID registration process and the application validity determination process are not performed.

Next, the VAS 135 provisionally launches the SDK application stored in the SDK application file 702 in step 203. Accordingly, the VAS 135 obtains the PDID of the SDK application from the SDK application in step 204. Next, as described in step 14, the VAS 135 decodes the PDID registered in the PDID file 703 in step 205, and determines validity of the SDK application by comparing the PDID obtained in step 204 and the PDID obtained in step 205 in step 206.

Next, the VAS 135 obtains application information of the SDK application from the SDK application that has been determined to be valid in step 207. At this time, a manager of the compound machine 101 can operate the compound machine 101 to display a selection screen on the operation panel 202 for selecting a SDK application to which a launch right is to be set among SDK applications determined to be valid in step 208. The manager of the compound machine 101 can select a target SDK application by operating the operation panel in step 209. Then, the VAS 135 registers the PDID of the selected SDK application in the HDD 233 (or a nonvolatile memory (flash memory and the like)) so that launching right of the SDK application can be set in step 210. If a launch right is set in a SDK application in the HDD 233, the compound machine 101 can launch the SD application from the HDD 233 in which the SDK application is loaded in the MEM-P 231 or the MEM-C 232.

(6) Image Forming Process

Relating to the first to fifth examples, image forming processes performed in the compound machine 101 are described.

Figure 33:
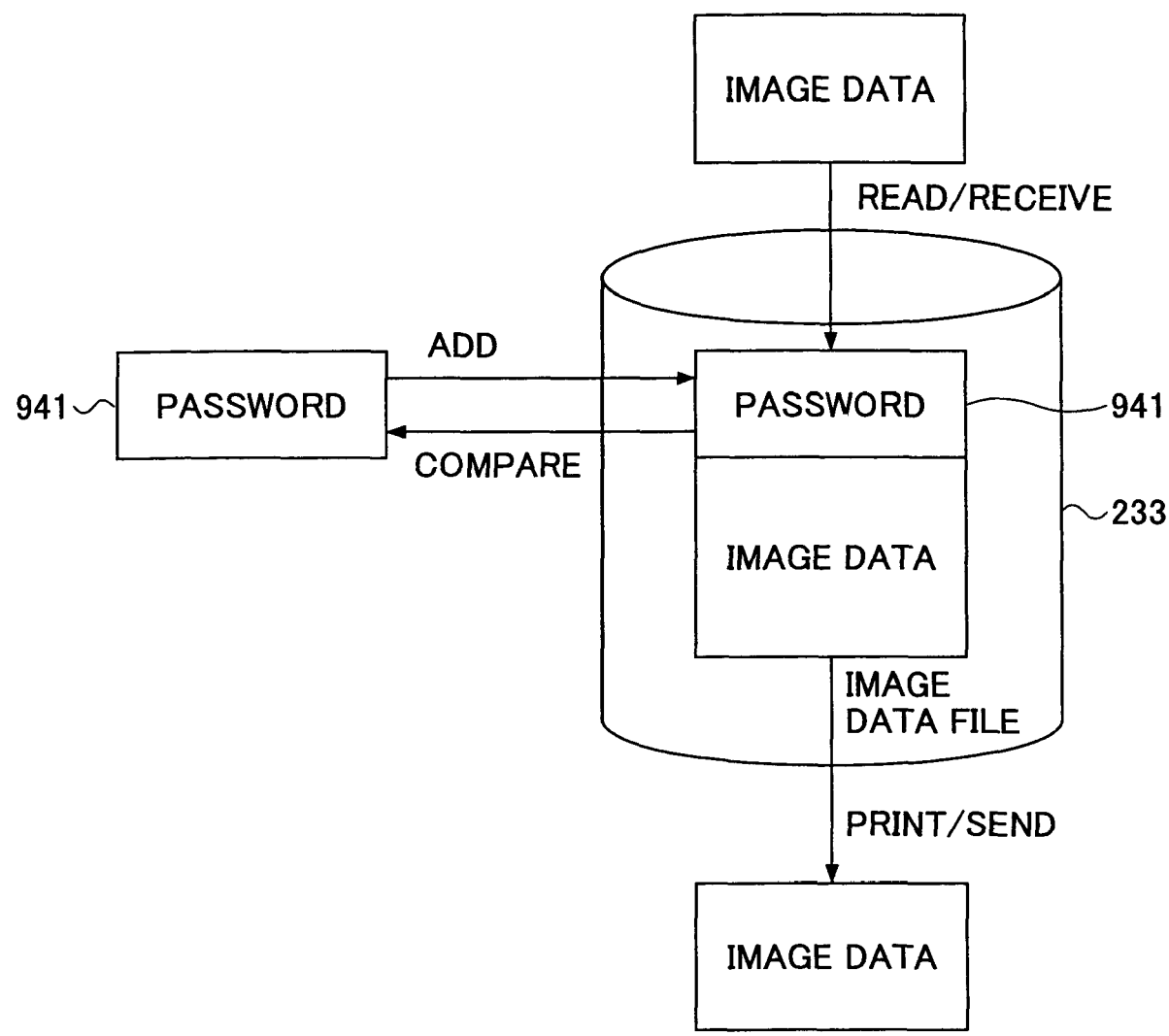
FIG. 33 is a figure for explaining a password for image forming processes.

FIG. 33 is a figure for explaining a password 941 generated by the VAS 135 for the image forming processes.

In this example, when reading image data to be stored in the compound machine from a document, the scanner application 143 adds the password 941 generated by the VAS 135 to the image data so that the image data is locked with the password (password lock). In the same way, when receiving image data from a network, each of the facsimile application 144 and the network file application 145 locks the image data with the password 941.

In this example, when printing the image data stored in the compound machine on a printing paper, the printer application 142 performs password check of the image data by comparing the password generated by the VAS 135 with the password attached to the image data. In the same way, when sending the image data stored in the compound machine 101 to a network, each of the facsimile application 144 and the network file application 145 performs password check of the image data by comparing the password generated by the VAS 135 with the password attached to the image data.

The password 941 may be specific to the SD memory card 602 set in the SD memory card slot 601 of the compound machine 101. In this case, if the SD memory card is changed to another SD memory card from an end of a reading process or a receiving process of image data to a start of a printing process or a sending process, the printing process or the sending process cannot be performed. Thus, by providing the unique password, the change of the SD memory card 602 can be prevented. The merits of the above-mentioned examples become more effective according to this configuration. For example, the password 941 is generated by using a SD serial ID. The above-mentioned mechanism can be applied to prevention of unauthorized replacement of the HDD 233.

The password 941 may be specific to the body of the compound machine 101. In this case, even when the HDD 233 that stores image data is moved from another machine to the compound machine 101, the compound machine 101 cannot perform a printing process or a sending process for the image data. Thus, replacement of the HDD 233 can be prevented. If there is a possibility that fraud may be performed for the HDD 233, the above-mentioned examples become more effective since even the image forming process can be limited in this configuration. For example, the password 941 is generated by using a machine number like the key 933. The above-mentioned mechanism can be applied to prevention of unauthorized replacement of a SD memory card 602 that stores image data.

Figure 34:
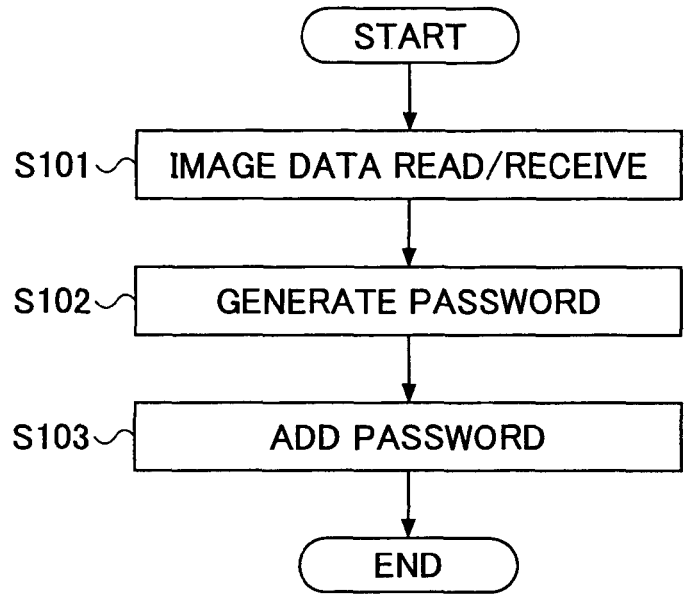
FIG. 34 shows a flowchart of a password adding process.

FIG. 34 shows a flowchart of the password adding process.

An application such as the printer application 142 reads a document to generate image data to be stored in the compound machine 101 or the application receives the data from a network in step 101. Then, the VAS 135 generates the password 941 in step 102. Next, the application (printer application 142 and the like) adds the password 941 to the image data to lock the image data in step 103. Next, the image data is stored in the compound machine 101.

Figure 35:
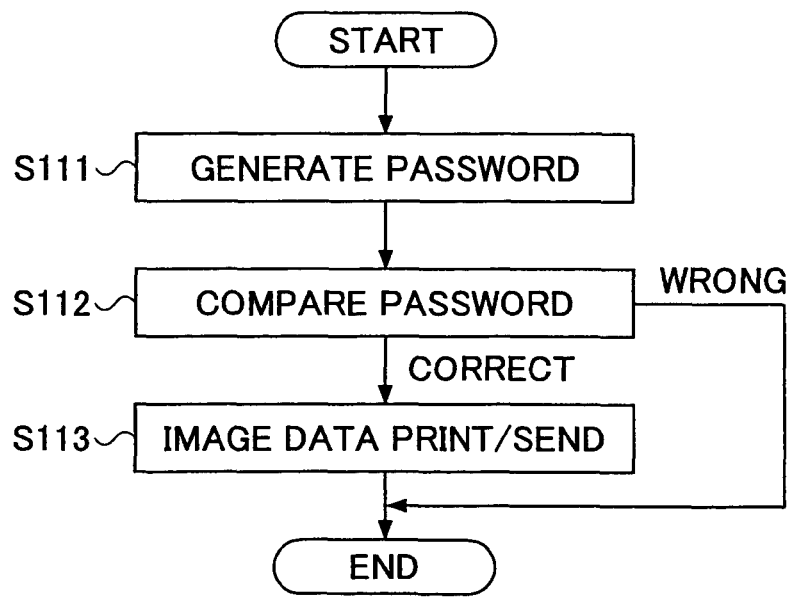
FIG. 35 is a flowchart of a password comparing process.

FIG. 35 is a flowchart of the password comparing process.

When a piece of image data to be printed or to be sent via a network is specified from pieces of image data stored in the compound machine 101, the VAS 135 generates the password 941 in step 111. Next, an application such as the printer application 142 compares the password generated by the VAS 135 with the password attached to the image data to check the validity of the password of the image data in step 112. Next, if the password check is successfully done, the application prints the image data or sends the image data via a network in step 113.

Figure 36:
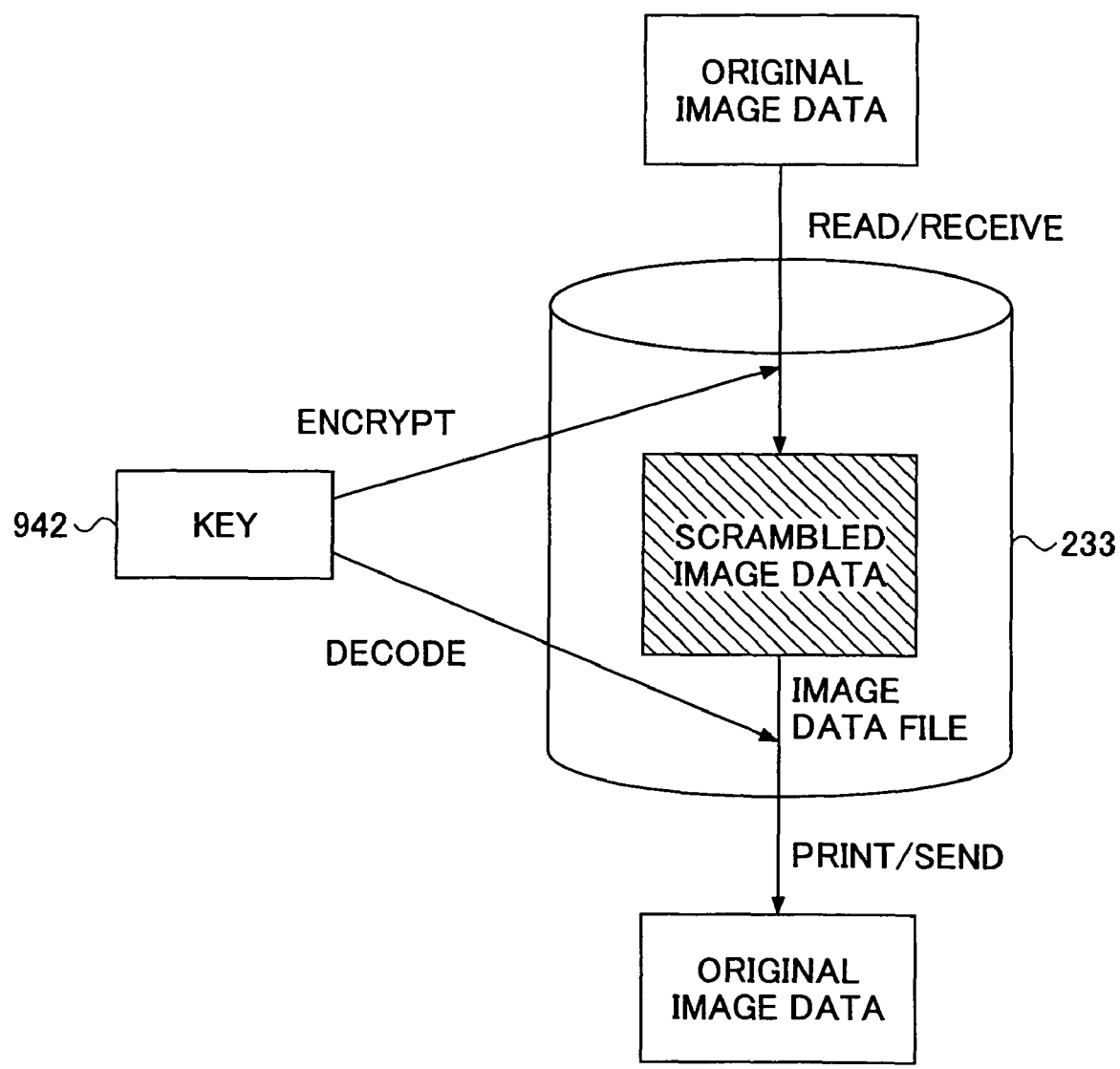
FIG. 36 is a figure for explaining a key used in image forming processes.

FIG. 36 is a figure for explaining a key 942 generated by the VAS 135 used for image forming processes.

In this example, when reading image data to be stored in the compound machine from a document, the scanner application 143 encrypts the original image data to a scrambled image data by using the key 942 generated by the VAS 135. In the same way, when receiving image data from a network, the facsimile application 144 or the network file application 145 encrypts the original image data into the scrambled image data by using the key 942.

When printing the image data stored in the compound machine 101, the printer application 142 decodes the scrambled image data into the original image data by using the key 941. In the same way, when sending the image data stored in the image forming apparatus 101 to the network, the facsimile application 144 or the network file application 145 decodes the scrambled data to the original image data by using the key 941.

The key 941 may be data specific to the SD memory card 602 set in the SD memory card slot 601 of the compound machine 101. In this case, if the SD memory card is changed to another SD memory card from an end of a reading process or a receiving process of image data to a start of a printing process or a sending process, the printing process or the sending process cannot be performed. Thus, by providing the unique password, the change of the SD memory card 602 can be prevented. For example, the key 942 is generated by using a SD serial ID like the key 931. The above-mentioned mechanism can be applied to prevention of unauthorized replacement of the HDD 233.

The key 942 may be specific to the body of the compound machine 101. In this case, even when the HDD 233 storing image data is moved from another machine to the compound machine 101, the compound machine cannot perform the printing process or the sending process for the image data. Thus, replacement of the HDD 233 can be prevented. For example, the key 942 is generated by using a machine number like the key 933. The above-mentioned mechanism can be applied to prevention of unauthorized replacement of a SD memory card 602.

Figure 37:
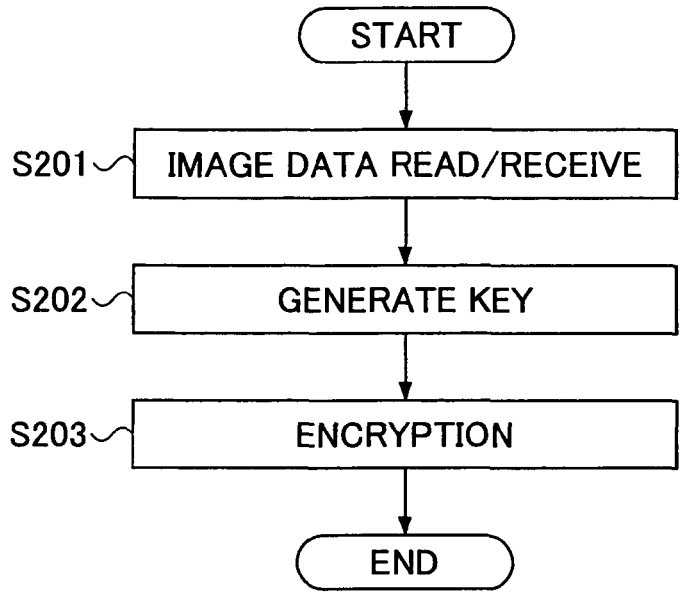
FIG. 37 shows a flowchart of an encryption process.

FIG. 37 shows a flowchart of the encryption process.

When an application such as the printer application 142 reads image data to be stored in the compound machine or receives the image data from a network in step 201, the VAS 135 generates a key 942 in step 202. Next, the application 142 encrypts the image data by using the key 942 in step 203. Next, the compound machine 101 stores the image data.

Figure 38:
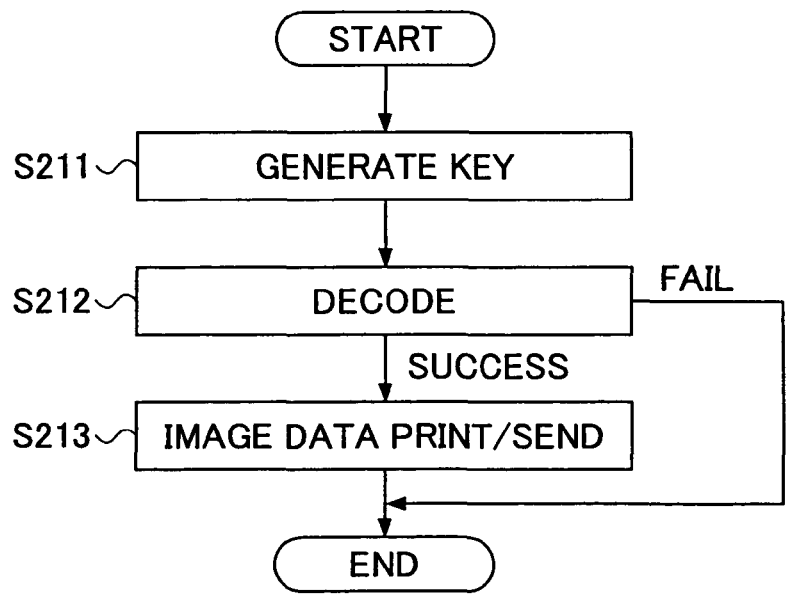
FIG. 38 shows a flowchart of a decoding process.

FIG. 38 shows a flowchart of the decoding process.

When image data to be printed or to be sent to a network is specified, the VAS 135 generates a key 942 in step 211. Next, the application decodes the image data by using the key 942 in step 212. Next, if the decoding process is successfully performed, the application prints the image data or sends the image data to the network in step 213.

In the above-mentioned image forming process, both of the password 941 and the key 942 can be used for the image data. In addition, in the image forming process, when more than one SD memory cards are set in the compound machine 101, the password 941 or the key 942 may be specific to a predetermined SD memory card 602.

The compound machine 101 is an example of the information processing apparatus of the present invention. Information processing performed in the compound machine 101 is an example of the information processing method of the present invention. The VAS 135 is an example of the information processing program of the present invention, and a SD memory card storing the VAS 135 is an example of the computer readable medium of the present invention.

The present invention is not limited to the specifically disclosed embodiments, and variations and modifications may be made without departing from the scope of the present invention.

The present application contains subject matter related to Japanese patent application No.2003-292012, filed in the JPO on Aug. 12, 2003, Japanese patent application No.2003-292013, filed in the JPO on Aug. 12, 2003, Japanese patent application No.2003-292014, filed in the JPO on Aug. 12, 2003, Japanese patent application No.2003-292015, filed in the JPO on Aug. 12, 2003, Japanese patent application No.2003-292016, filed in the JPO on Aug. 12, 2003, Japanese patent application No.2004-81476, filed in the JPO on Mar. 19, 2004, and Japanese patent application No.2004-230106, filed in the JPO on Aug. 6, 2004, the entire contents of which being incorporated herein by reference.

What is claimed is:

1. An information processing apparatus comprising:
   an information processing unit configured to execute an application program to perform information processing, wherein the application program is loaded into the information processing apparatus by using a non-transitory recording medium that includes:
      a program file storing a plurality of programs including an application program and a checking program, the application program including identification information of the application program,
      an encrypted identification information file storing an encrypted form of the identification information, of the application program stored in the program file, that is encrypted by a key data specific to the recording medium or specific to the information processing apparatus, and
      information for generating the key data;
   a checking program launch request unit configured to request launch of the checking program stored in the recording medium;
   a recording medium validity determination unit configured to check whether the recording medium is valid as a medium used for storing the application program into the information processing apparatus, wherein the recording medium validity determination unit determines that the recording medium is valid if the checking program requested to be launched by the checking program launch request unit is launched successfully;
   a unit configured to generate the key data using the information stored in the recording medium if the recording medium is determined to be valid;
   a unit configured to obtain the identification information from the application program stored in the recording medium;
   a unit configured to decrypt the encrypted form of the identification information by using the key data; and
   an application program validity determination unit configured to compare the identification information obtained from the application program with the identification information obtained by decrypting the encrypted form of the identification information to determine validity of the application program stored in the recording medium.

2. The information processing apparatus as claimed in claim 1, further comprising:
a unit configured to check if the application program is a specific application program developed by a dedicated software development environment by checking whether identification data indicating that the application program is the specific application program is stored in the recording medium.

3. The information processing apparatus as claimed in claim 1, wherein the information processing apparatus performs a launch process or a launch right setting process for the application program on condition that the application program is determined to be valid by the application program validity determination unit.

4. The information processing apparatus as claimed in claim 1, wherein the information processing apparatus is an image forming apparatus.

5. An information processing method performed in an information processing unit configured to execute an application program to perform information processing, wherein the application program is loaded into the information processing apparatus by using a non-transitory recording medium that includes:
a program file storing a plurality of programs including an application program and a checking program, the application program including identification information of the application program,
an encrypted identification information file storing an encrypted form of the identification information, of the application program stored in the program file, that is encrypted by a key data specific to the recording medium or specific to the information processing apparatus, and information for generating the key data;
the method comprising:
requesting launch of the checking program stored in the recording medium;
checking whether the recording medium is valid as a medium used for storing the application program into the information processing apparatus, wherein the recording medium validity checking determines that the recording medium is valid if the checking program requested to be launched by the checking program launch requesting is launched successfully;
generating the key data using the information stored in the recording medium if the recording medium is determined to be valid;
obtaining the identification information from the application program stored in the recording medium;
decrypting the encrypted form of the identification information by using the key data; and
comparing the identification information obtained from the application program with the identification information obtained by decrypting the encrypted form of the identification information to determine validity of the application program stored in the recording medium.

6. The information processing method as claimed in claim 5, further comprising:
checking if the application program is a specific application program developed by a dedicated software development environment by checking whether identification data indicating that the application program is the specific application program is stored in the recording medium.

7. The information processing method as claimed in claim 5, further comprising:
performing a launch process or a launch right setting process for the application program on condition that the application program is determined to be valid by the comparing.

8. The information processing method as claimed in claim 5, wherein the information processing apparatus is an image forming apparatus.

9. A non-transitory computer readable medium including computer executable instructions to cause an information processing unit to execute an application program to perform information processing, wherein the application program is loaded into the information processing apparatus by using a non-transitory recording medium that includes:
a program file storing a plurality of programs including an application program and a checking program, the application program including identification information of the application program,
an encrypted identification information file storing an encrypted form of the identification information, of the application program stored in the program file, that is encrypted by a key data specific to the recording medium or specific to the information processing apparatus, and information for generating the key data;
the computer executable instructions causing the information processing unit to perform operations comprising:
requesting launch of the checking program stored in the recording medium;
checking whether the recording medium is valid as a medium used for storing the application program into the information processing apparatus, wherein the checking determines that the recording medium is valid if the checking program requested to be launched by the checking program launch requesting is launched successfully;
generating the key data using the information stored in the recording medium if the recording medium is determined to be valid;
obtaining the identification information from the application program stored in the recording medium;
decrypting the encrypted form of the identification information by using the key data; and
comparing the identification information obtained from the application program with the identification information obtained by decrypting the encrypted form of the identification information to determine validity of the application program stored in the recording medium.

10. The non-transitory computer readable medium as claimed in claim 9, further comprising:
checking if the application program is a specific application program developed by a dedicated software development environment by checking whether identification data indicating that the application program is the specific application program is stored in the recording medium.

11. The non-transitory computer readable medium as claimed in claim 9, further comprising:
performing a launch process or a launch right setting process for the application program on condition that the application program is determined to be valid by the comparing.

12. The non-transitory computer readable medium as claimed in claim 9, wherein the information processing apparatus is an image forming apparatus.

* * * * *